US008601387B2

(12) United States Patent
Read et al.

(10) Patent No.: US 8,601,387 B2
(45) Date of Patent: Dec. 3, 2013

(54) PERSISTENT INTERFACE

(75) Inventors: Daniel J. Read, San Francisco, CA (US); Erik T. Collier, Livermore, CA (US)

(73) Assignee: IAC Search & Media, Inc., Oakland, CA (US)

( * ) Notice: Subject to any disclaimer, the term of this patent is extended or adjusted under 35 U.S.C. 154(b) by 1796 days.

(21) Appl. No.: 11/611,777

(22) Filed: Dec. 15, 2006

(65) Prior Publication Data

US 2008/0147670 A1    Jun. 19, 2008

(51) Int. Cl.
*G06F 3/048*    (2013.01)

(52) U.S. Cl.
USPC ........................................................ 715/780

(58) Field of Classification Search
USPC ......................................... 715/780, 781, 804
See application file for complete search history.

(56) References Cited

U.S. PATENT DOCUMENTS

| | | |
|---|---|---|
| 5,659,742 A | 8/1997 | Beattie et al. |
| 5,680,561 A | 10/1997 | Amro et al. |
| 5,719,471 A | 2/1998 | Shalit et al. |
| 5,913,215 A | 6/1999 | Rubinstein et al. |
| 6,025,843 A | 2/2000 | Sklar |
| 6,025,844 A | 2/2000 | Parsons |
| 6,070,176 A | 5/2000 | Downs et al. |
| 6,271,840 B1 | 8/2001 | Finseth et al. |
| 6,338,059 B1 | 1/2002 | Fields et al. |
| 6,353,448 B1 | 3/2002 | Scarborough et al. |
| 6,356,908 B1 | 3/2002 | Brown et al. |
| 6,366,906 B1 | 4/2002 | Hoffman |
| 6,496,206 B1 | 12/2002 | Mernyk et al. |
| 6,564,213 B1 | 5/2003 | Ortega et al. |
| 6,583,781 B1 | 6/2003 | Joshi et al. |
| 6,584,498 B2 | 6/2003 | Nguyen et al. |
| 6,594,654 B1 | 7/2003 | Salam et al. |
| 6,636,856 B2 | 10/2003 | Pasquali |
| 6,640,250 B1 | 10/2003 | Chang et al. |
| 6,643,641 B1 | 11/2003 | Snyder |
| 6,665,838 B1 | 12/2003 | Brown et al. |
| 6,667,751 B1 | 12/2003 | Wynn et al. |
| 6,731,312 B2 | 5/2004 | Robbin |
| 6,784,900 B1 * | 8/2004 | Dobronsky .................. 715/744 |
| 6,809,702 B2 | 10/2004 | Malamud et al. |
| 6,816,174 B2 | 11/2004 | Tiongson et al. |
| 6,826,729 B1 | 11/2004 | Giesen et al. |
| 6,845,485 B1 | 1/2005 | Shastri |
| 6,864,904 B1 | 3/2005 | Ran et al. |
| 6,907,425 B1 | 6/2005 | Barrera |
| 7,047,502 B2 | 5/2006 | Petropoulos et al. |
| 7,051,289 B1 | 5/2006 | Yoshida |
| 7,065,520 B2 | 6/2006 | Langford |
| 7,089,237 B2 | 8/2006 | Turnbull et al. |
| 7,100,123 B1 | 8/2006 | Todd et al. |

(Continued)

OTHER PUBLICATIONS

Yahoo! Search, Yahoo Product; 2005, (http://web.archive.org/web/20051231080328/http://search.yahoo.com/products).*

(Continued)

*Primary Examiner* — Rashawn Tillery
(74) *Attorney, Agent, or Firm* — Stephen M. De Klerk

(57) ABSTRACT

A user interface is described, having a search box for entering a search query. The search box and other components remain stationary when conducting a search. A toolbox is provided with links to different views for conducting category-specific searches, and the links are editable.

24 Claims, 53 Drawing Sheets

(56) References Cited

U.S. PATENT DOCUMENTS

| | | |
|---|---|---|
| 7,133,863 B2 | 11/2006 | Teng |
| 7,159,188 B2 | 1/2007 | Stabb et al. |
| 7,162,493 B2 | 1/2007 | Weiss et al. |
| 7,200,820 B1 | 4/2007 | Stephens |
| 7,225,407 B2 | 5/2007 | Sommerer et al. |
| 7,278,114 B2 | 10/2007 | Lapidous |
| 7,325,204 B2 | 1/2008 | Rogers |
| 7,353,246 B1 | 4/2008 | Rosen et al. |
| 7,353,460 B2 | 4/2008 | Tu |
| 7,409,646 B2 | 8/2008 | VedBrat et al. |
| 7,478,338 B2 | 1/2009 | Yanchar et al. |
| 7,490,288 B2 | 2/2009 | Undasan |
| 7,496,830 B2 | 2/2009 | Rubin et al. |
| 7,506,260 B2 | 3/2009 | Wada et al. |
| 7,552,400 B1 | 6/2009 | Sriver et al. |
| 7,596,760 B2 | 9/2009 | Sauve et al. |
| 7,620,911 B2 | 11/2009 | Webb |
| 7,716,569 B2 | 5/2010 | Ran et al. |
| 2002/0005867 A1 | 1/2002 | Gvily |
| 2002/0129114 A1 | 9/2002 | Sundaresan et al. |
| 2002/0147724 A1 | 10/2002 | Fries et al. |
| 2002/0152267 A1 | 10/2002 | Lennon |
| 2002/0163545 A1 | 11/2002 | Hii |
| 2003/0014415 A1 | 1/2003 | Weiss et al. |
| 2003/0067494 A1 | 4/2003 | Burns |
| 2003/0076322 A1 | 4/2003 | Ouzts et al. |
| 2003/0085919 A1 | 5/2003 | Burns |
| 2003/0146939 A1 | 8/2003 | Petropoulos et al. |
| 2004/0003351 A1 | 1/2004 | Sommerer et al. |
| 2004/0078224 A1 | 4/2004 | Schramm-Apple et al. |
| 2004/0205633 A1 | 10/2004 | Martinez et al. |
| 2004/0236736 A1 | 11/2004 | Whitman et al. |
| 2005/0010871 A1 | 1/2005 | Ruthfield et al. |
| 2005/0066018 A1 | 3/2005 | Whittle et al. |
| 2005/0071780 A1 | 3/2005 | Muller et al. |
| 2005/0076312 A1 | 4/2005 | Gardner et al. |
| 2005/0097089 A1 | 5/2005 | Nielsen et al. |
| 2005/0144162 A1 | 6/2005 | Liang |
| 2005/0198567 A1 | 9/2005 | Vermeulen et al. |
| 2005/0210416 A1 | 9/2005 | MacLaurin et al. |
| 2005/0234894 A1 | 10/2005 | Tenazas |
| 2005/0235203 A1 | 10/2005 | Undasan |
| 2005/0246660 A1 | 11/2005 | Fehrm |
| 2005/0251523 A1 | 11/2005 | Tenazas |
| 2006/0026147 A1 | 2/2006 | Cone et al. |
| 2006/0059434 A1 | 3/2006 | Boss et al. |
| 2006/0070004 A1 | 3/2006 | Miller et al. |
| 2006/0080292 A1 | 4/2006 | Alanzi |
| 2006/0085734 A1 | 4/2006 | Balnaves |
| 2006/0143568 A1 | 6/2006 | Milener et al. |
| 2006/0190441 A1 | 8/2006 | Gross et al. |
| 2006/0206454 A1 | 9/2006 | Forstall et al. |
| 2006/0218499 A1 | 9/2006 | Matthews et al. |
| 2006/0224951 A1* | 10/2006 | Burke et al. ............... 715/234 |
| 2006/0248060 A1 | 11/2006 | Silverberg |
| 2006/0277167 A1 | 12/2006 | Gross et al. |
| 2006/0282416 A1 | 12/2006 | Gross et al. |
| 2006/0294476 A1 | 12/2006 | Buckley |
| 2007/0022125 A1 | 1/2007 | Salam et al. |
| 2007/0027864 A1 | 2/2007 | Collins et al. |
| 2007/0027865 A1 | 2/2007 | Bartz et al. |
| 2007/0033103 A1 | 2/2007 | Collins et al. |
| 2007/0033105 A1 | 2/2007 | Collins et al. |
| 2007/0043706 A1 | 2/2007 | Burke et al. |
| 2007/0050727 A1 | 3/2007 | Lewis-Bowen et al. |
| 2007/0088680 A1 | 4/2007 | Sauve et al. |
| 2007/0088686 A1 | 4/2007 | Hurst-Hiller et al. |
| 2007/0130153 A1 | 6/2007 | Nachman et al. |
| 2007/0136674 A2 | 6/2007 | Schumacher et al. |
| 2007/0174244 A1 | 7/2007 | Jones |
| 2007/0186177 A1 | 8/2007 | Both et al. |
| 2007/0186189 A1* | 8/2007 | Schiller ..................... 715/838 |
| 2007/0198542 A1 | 8/2007 | Morris |
| 2007/0203906 A1 | 8/2007 | Cone et al. |
| 2007/0226210 A1 | 9/2007 | Walter |
| 2007/0226614 A1* | 9/2007 | Lorenzen et al. ......... 715/530 |
| 2007/0233685 A1 | 10/2007 | Burns et al. |
| 2007/0265999 A1 | 11/2007 | Amitay et al. |
| 2008/0005668 A1 | 1/2008 | Mavinkurve et al. |
| 2008/0010269 A1 | 1/2008 | Parikh |
| 2008/0033917 A1 | 2/2008 | Jones et al. |
| 2008/0034329 A1 | 2/2008 | Posner et al. |
| 2008/0052630 A1* | 2/2008 | Rosenbaum et al. ....... 715/738 |
| 2008/0059419 A1 | 3/2008 | Auerbach et al. |
| 2008/0072150 A1* | 3/2008 | Chan ......................... 715/708 |
| 2008/0109401 A1 | 5/2008 | Sareen et al. |
| 2008/0235594 A1 | 9/2008 | Bhumkar |

OTHER PUBLICATIONS

Ask Jeeves, Inc., The New Ask.com Unveiled: New Site, New Brand, New Tools, Innovative Search Tools, Advanced Search Technology and Sleek Design Help Users Search Faster, PR Newswire—News & Information (http://sev.prnewswire.com/computerelectronics/20060227/SFM06827022006-1.html), Feb. 27, 2006, Oakland, California.

* cited by examiner

PERSISTENT INTERFACE

BACKGROUND OF THE INVENTION

1. Field of the Invention

This invention relates to a user interface, typically of the kind used for conducting Internet searches, a method for conducting a search and interfacing with a client site, and a network system with associated computer systems and storage media.

2. Discussion of Related Art

Computer systems can be used for accessing and downloading pages and documents from remote sites over the Internet. These remote sites can be accessed by entering a uniform resource locator (URL) in an address box in a browser. An Extensible Markup Language (XML) file can also be specified in various RSS formats, such as Really Simple Syndication (RSS 2.0), or Rich Site Summary (RSS 0.91; RSS 1.0). RSS delivers its information as an XML file called an "RSS feed," "Web feed," "RSS stream," or "RSS channel." RSS readers are typically constructed as standalone programs or extensions to existing programs such as Web browsers and e-mail readers.

Search engines are often used to find Web pages, documents, and RSS feeds over the Internet. A server site crawler periodically collects data from remote sites over the Internet, and the data is indexed into a search database. A search engine provider provides an interface with a search box for entering a search query. The search query is transmitted from a client site to the server, and is used to parse or extract data from the search database. A search results page is then transmitted from the server to the client site, and lists a plurality of URLs that can be selected by a user and directs the user to selected ones of the remote sites.

SUMMARY OF THE INVENTION

The invention provides a user interface, comprising a plurality of views, a plurality of view links in each view, each being selectable to open a respective one of the views, and a respective search box in each one of the views, wherein at least one component is located in substantially the same location in each one of the views.

The search box may be in substantially the same location in each one of the views.

The search view links may be substantially in the same location in each one of the views.

The search view links may be located vertically below one another.

The user interface may further comprise a search button in substantially the same location in each view.

The user interface may further comprise a component in substantially the same location in each view.

The component may be a logo.

The component may be text.

The invention further provides a method of interfacing with a client site, comprising presenting a first view of a plurality of views to the client site, including a first search box and a first plurality of view links, each view link being selectable to open a respective view of the plurality of views, receiving a view link command, wherein one of the search view links of the first plurality of view links in the first view is selected, and in response to the search view link command, presenting a second view to the client site, including a search box and a second plurality of view links, each view link of the second plurality of view links being selectable to open a respective one of the views, wherein at least one component is located in substantially the same location in each one of the views.

The search box may be in substantially the same location in each one of the views.

The search view links may be substantially in the same location in each one of the views.

The search view links may be located vertically below one another.

The method may further comprise a search button in substantially the same location in each view.

The method may further comprise a component in substantially the same location in each view.

The component may be a logo.

The component may be text.

The invention further provides a computer-readable medium, having a set of instructions stored thereon, which, when executed by a processor of a computer carries out a method of interfacing with a client site, comprising presenting a first view of a plurality of views to the client site, including a first search box and a first plurality of view links, each view link being selectable to open a respective view of the plurality of views, receiving a view link command, wherein one of the search view links of the first plurality of view links in the first view is selected, and in response to the search view link command, presenting a second view to the client site, including a search box and a second plurality of view links, each view link of the second plurality of view links being selectable to open a respective one of the views, wherein at least one component is located in substantially the same location in each one of the views.

The search box may be in substantially the same location in each one of the views.

The search view links may be substantially in the same location in each one of the views.

The search view links may be located vertically below one another.

The method may further comprise a search button in substantially the same location in each view.

The method may further comprise a component in substantially the same location in each view.

The component may be a logo.

The component may be text.

BRIEF DESCRIPTION OF THE DRAWINGS

The invention is further described by way of examples with reference to the accompanying drawings, wherein.

DETAILED DESCRIPTION OF THE INVENTION

Figure 1:
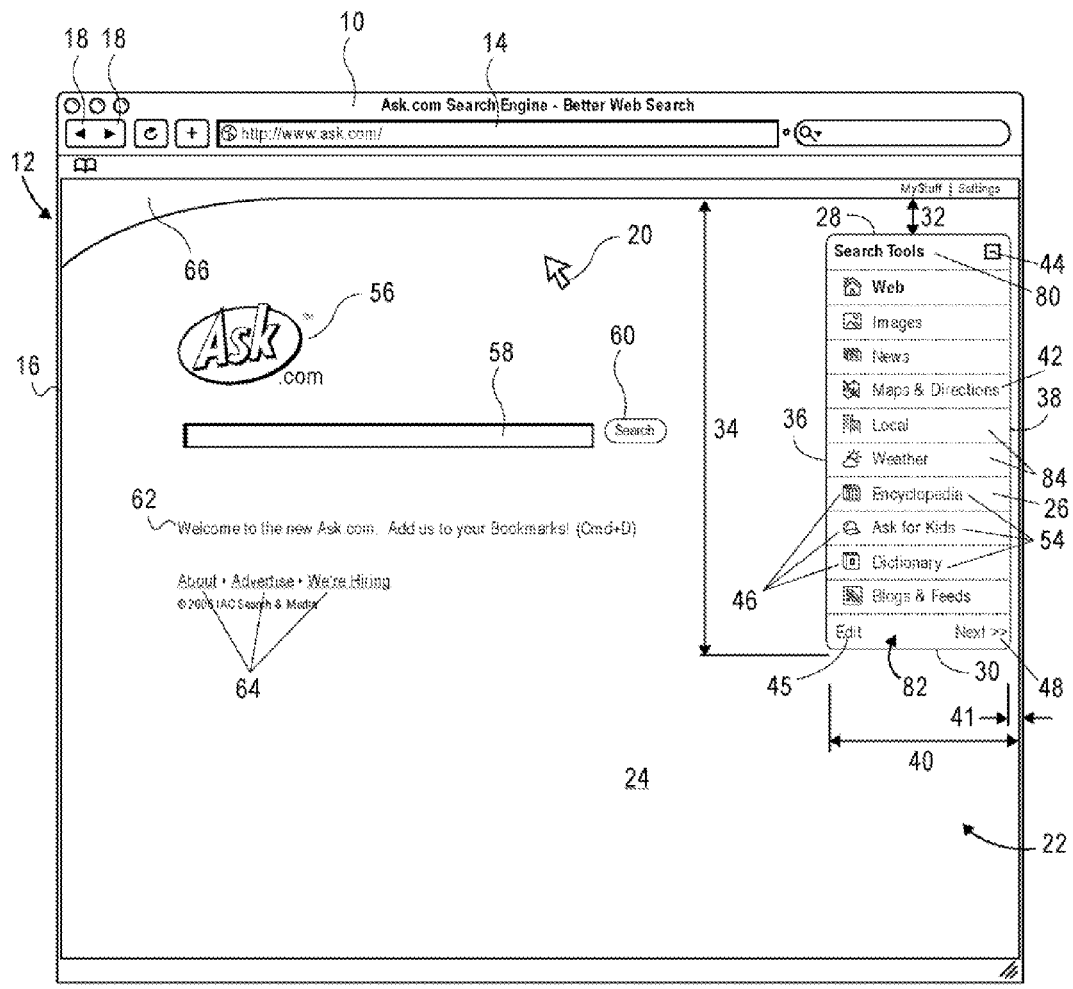
FIG. 1 is a view of a browser having a user interface according to a first embodiment of the invention.

FIG. 1 of the accompanying drawings illustrates a browser 10 that displays a user interface 12 according to an embodiment of the invention. The browser 10 may, for example, be an Internet Explorer®, Firefox®, Netscape®, or any other browser. The browser has an address box 14, a viewing pane 16, and various buttons such as back and forward buttons 18. The browser 10 is loaded on a computer at the client site. A user at the client site can load the browser 10 into memory, so that the browser 10 is displayed on a screen of the computer at the client site. The user enters an address (in the present example, the Internet address http://www.ask.com/) in the address box 14. A mouse is used to move a cursor 20 into the address box 14, and a button is clicked on the mouse. After clicking of the button on the mouse, the user can use a keyboard to enter text into the address box 14. The user then presses "Enter" on the keyboard. A command is then sent over the Internet requesting a page corresponding to the address that is entered into the address box 14. The page is retrieved and transmitted to the client site and displayed within the viewing pane 16.

In the present example, the page that is retrieved is a "Web" view 22 forming part of the user interface 12. The "Web" view 22 has a larger first area 24 and smaller rectangular second area 26. The rectangular second area 26 has substantially equal-length upper and lower edges 28 and 30 that are respectively at distances 32 and 34 from an upper edge of the first area 24 of the user interface 12. The rectangular second area 26 also has substantially equal-length left and right side edges 36 and 38 respectively that are at distances 40 and 41 respectively from a right edge of the first area 24 of the user interface 12. A length of the left side edge 36 is more than a length of the lower edge 30. A size or first surface area of the rectangular second area 26 is approximately a multiple of a length of the lower edge 30 and a length of the left side edge 36.

The user interface 12 further includes a plurality of search view links 42, a minimizer size selector 44, an "Edit" selector 45, and a "Next" selector 48, all under the heading "Toolbox." The minimizer size selector 44 is located in a top right-hand corner of the rectangular second area 26. The search view links 42 are located vertically below one another within the second area 26. Each search view link 42 includes a respective image 46 and respective text 54. The "Edit" selector 45 and the "Next" selector 48 are located in the bottom left and right corners respectively of the second area 26.

The user interface 12 further includes a logo 56, a search box 58, a search button 60, static text 62, and informational links 64, all located to the left of the second area 26. The user interface 12 also includes graphics 66 along an upper border of the first area 24. The logo 56 in the present example is a trademark Ask.com™ of a company. The informational links 64 are links to informational sites of the same company. The mouse can be placed in the search box 58 and, after clicking the mouse, the keyboard can be used to enter text into the search box 58. The mouse can then be used to click on the search button 60. When the "Web" view 22 is used, a search is carried out on a search database that holds information regarding websites across the Internet.

Figure 2:
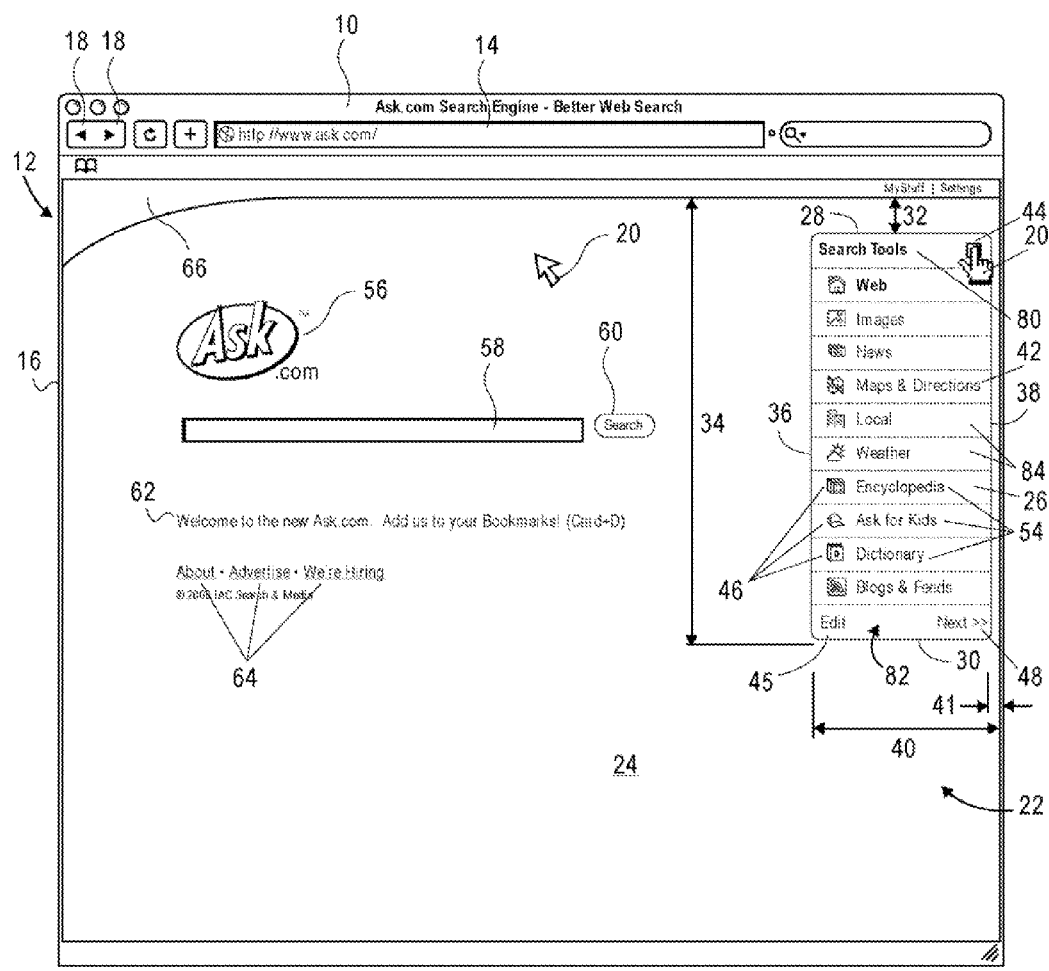
FIG. 2 is a view similar to FIG. 1, after a cursor is moved over a minimizer size selector.

FIG. 2 illustrates the cursor 20 after it has been moved over the minimizer size selector 44. The cursor 20 has changed from an arrow shape to a hand shape. The hand shape of the cursor 20 indicates that the minimizer size selector 44 is sensitive for being selected.

Figure 3:
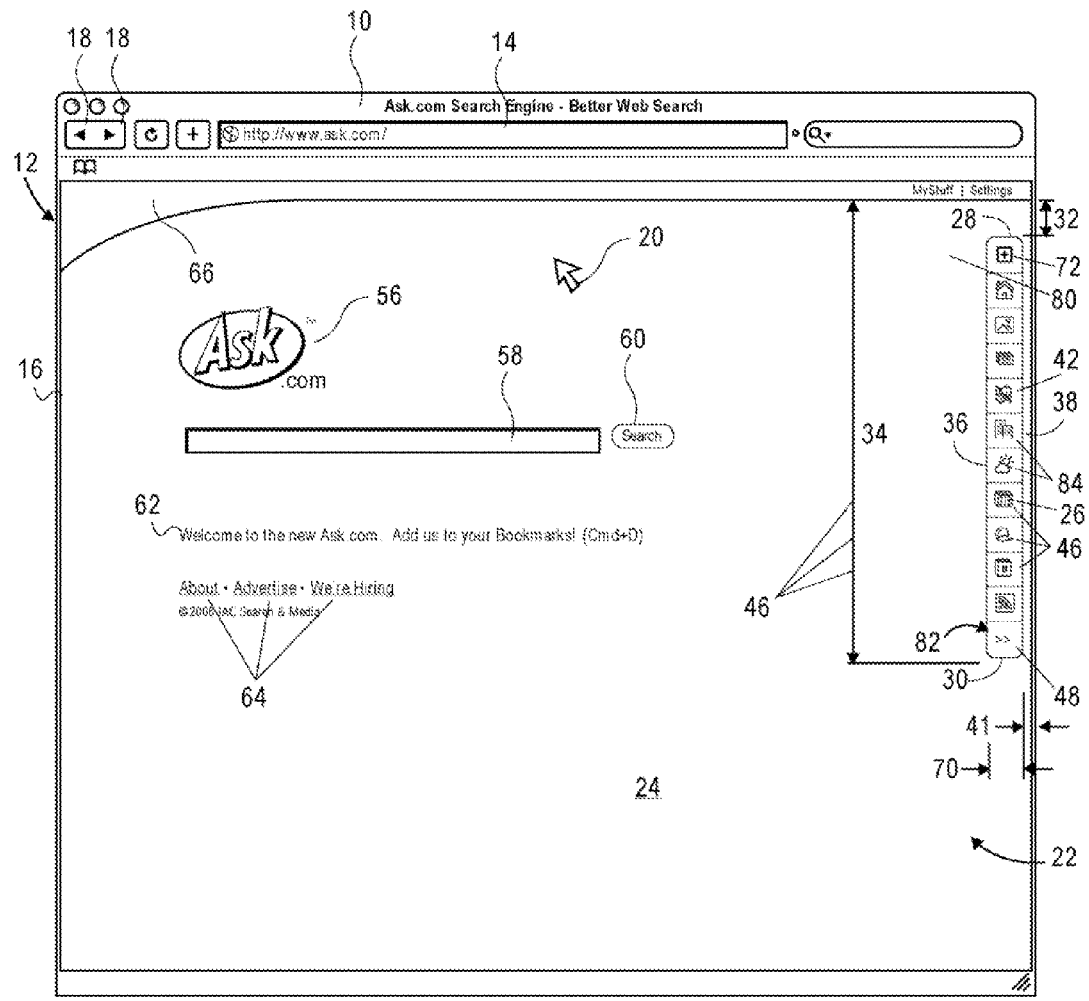
FIG. 3 is a view similar to FIG. 2, after the minimizer size selector is selected.

FIG. 3 illustrates the user interface 12 after the minimizer size selector 44 is selected by pressing or clicking a button on the mouse while the cursor 20 is in the position shown in FIG. 2. The second area 26 now has a second surface area that is less than the first surface area in FIG. 2 and discussed with reference to FIG. 1. The upper and lower edges 28 and 30 have remained at the same distances 32 and 34 from the upper edge of the first area 24 of the user interface 12. The right side edge 38 has remained at the same distance 42 from the right edge of the first area 24 of the user interface 12. The left side edge 36 is now located at a distance 70 from the right edge of the first area 24 of the user interface 12. The distance 70 in FIG. 3 is less than the distance 40 in FIG. 2. As such, the lower edge 30 of the second area 26 is now shorter in FIG. 3 than in FIG. 1. A surface area of the second area in FIG. 3 is a multiple of the length of the lower edge 30 and the left side edge 36.

Viewability of the search view links 42 is also reduced in FIG. 3 compared to FIG. 2. Specifically, only the images 46 are viewable, and not the corresponding text 54 of FIG. 2.

The "Edit" selector 45 shown in FIG. 2 is not viewable in the user interface 12 in FIG. 3. The "Next" selector 48 in FIG. 2 includes the text "Next" and two arrows to the right. As shown, in FIG. 3, the "Next" selector 48 only has the two arrows pointing to the right.

The user interface 12 in FIG. 3 further includes a maximizer size selector 72 located above the search view links 42. The maximizer size selector 72 has the same shape and dimensions as the minimizer size selector 44 in FIG. 2, and the only difference is that the maximizer size selector 72 includes a "plus" sign, whereas the minimizer size selector 44 includes a "minus" sign. The cursor 20 can again be positioned over the maximizer size selector 72, which will change the cursor 20 from an arrow into a hand, indicating that the maximizer size selector 72 is sensitive for purposes of selection. The button on the mouse can then again be clicked to select the maximizer size selector 72. After selection of the maximizer size selector 72, the rectangular second area 26 reverts to its dimensions shown in FIG. 2 and includes the text 54 of the search view links 42.

The search view links 42 provide the user with useful links to different types of searches that can be conducted. The ability to minimize and maximize the rectangular second area 26 allows the user to switch between a mode in FIG. 2, wherein more complete information is available to the user and a sleeker interface in FIG. 3. The user can click on the search view links 42 in both the modes shown in FIG. 2 and FIG. 3, and be directed to other views than the "Web" view 22, for purposes of conducting searches other than a "Web" search.

Referring specifically to FIG. 2, the second area 26 has upper and lower stationary tiles 80 and 82, and ten movable tiles 84. A heading "Search Tools" and the minimizer size selector 44 are located in the upper stationary tile 80. The "Edit" selector 46 and the "Next" selector 48 are located in the lower stationary tile 82. Each one of the search view links 42 is located on a respective one of the movable tiles 84. The movable tiles 84 are located below one another in an order so that the search view links 42 have a first order, namely: "Web," "Images," "News," "Maps & Directions," "Local," "Weather," "Encyclopedia," "Ask for Kids," "Dictionary," and "Blogs & Feeds."

Figure 4:
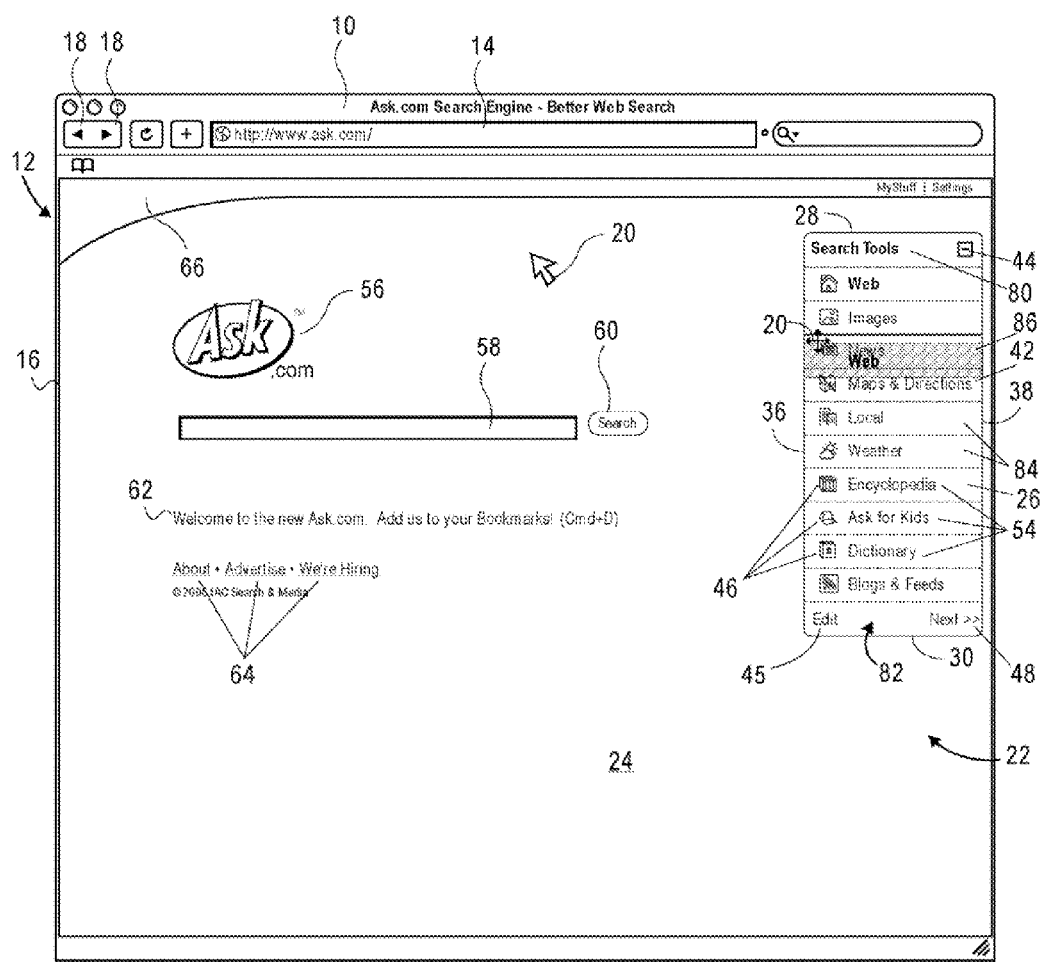
FIG. 4 is a view similar to FIG. 2, after a tile on which a search view link is located is selected and while the tile is being dragged.

The cursor 20 can be positioned over a selected one of the movable tiles 84, for example the movable tile 84 that includes the search view link 42 having the name "Web." When clicking on the respective search view link 42, the cursor 20 changes to a cross, as illustrated in FIG. 4. While holding down the button that is used for clicking on the respective search view link 42 and moving the cursor 20 by, for example, moving the mouse, the respective movable tile 84 can be moved from a first location, in the first order shown, to a second location in the first order. In the present example, the movable tile 84 holding the search view link 42 having "Web" thereon is moved from a position at the top in the first order to a position between the second and third movable tiles 84 respectively holding the search view links 42 "Images" and "News." A temporary grayed-out tile 86 moves with the cursor 20. The temporary grayed-out tile 86 has the text "Web" therein, which is the same as the text in the upper movable tile 84. The temporary grayed-out tile 86 indicates where the movable tile 84 having the text "Web" therein will be located, should the button on the mouse be released. The button on the mouse is then released.

Figure 5:
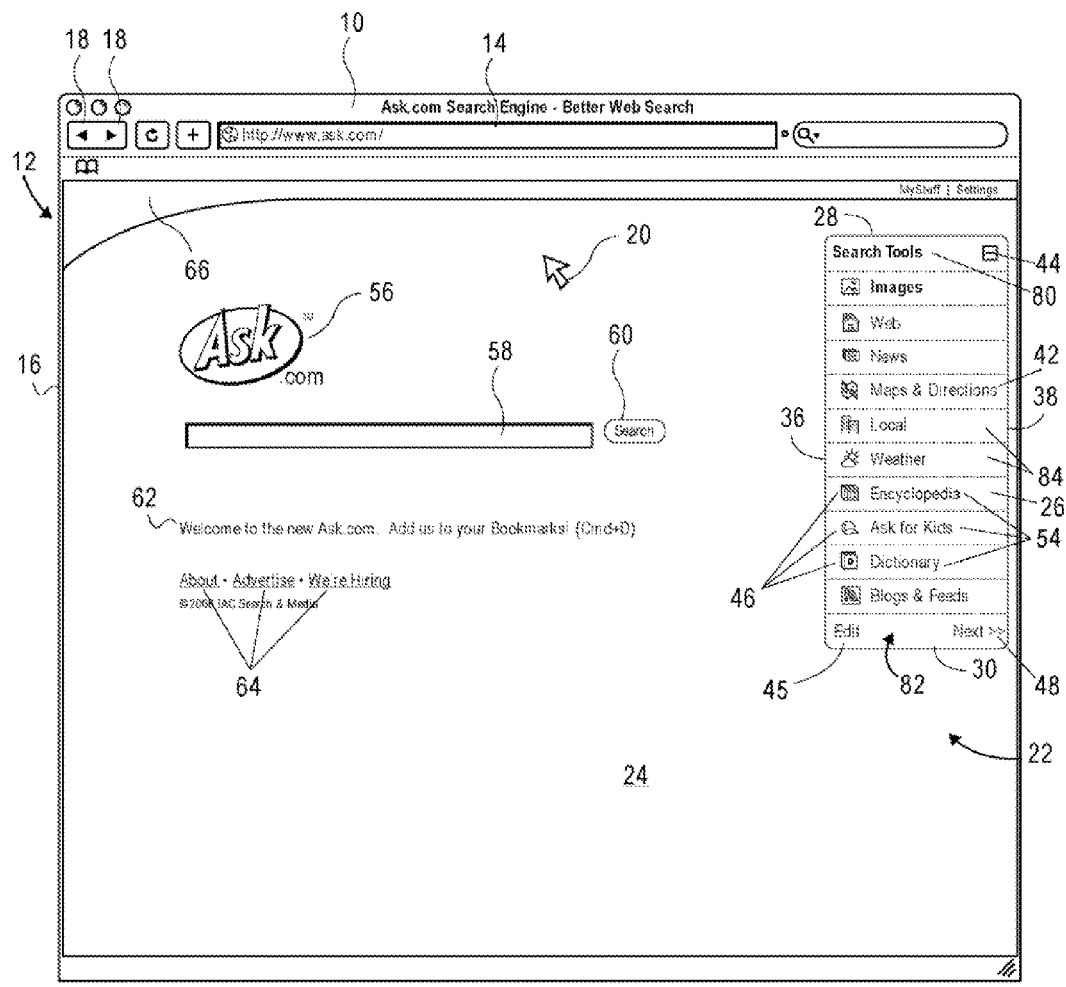
FIG. 5 is a view similar to FIG. 4, after the tile has been dropped.

FIG. 5 illustrates the user interface 12 after the button on the mouse is released. The temporary grayed-out tile 86 has disappeared. The movable tile 84 having the search view link 42 with the title "Web" is now located second from the top in the order of the search view links 42. The order of the search view links 42 has a second order in FIG. 5 that is different from the first order in FIG. 2.

What should be noted is that the only difference between the user interfaces 12 of FIG. 5 and FIG. 2 is that the order of the movable tiles 84 and therefore the order of the search view links 42 has changed. All other components of the user interface 12, for example the positions of the logo 56, search box 58, search button 60, static text 62, informational links 64, graphics 66, the edges 28, 30, 36, and 38 of the second area 26, the minimizer size selector 44, and the "Edit" and "Next" selectors 46 and 48, are the same in FIG. 5 as in FIG. 2. Furthermore, the locations and viewability of these components do not change during the entire time period between the user interface 12 shown in FIG. 2 and the user interface 12 shown in FIG. 5.

Figure 6:
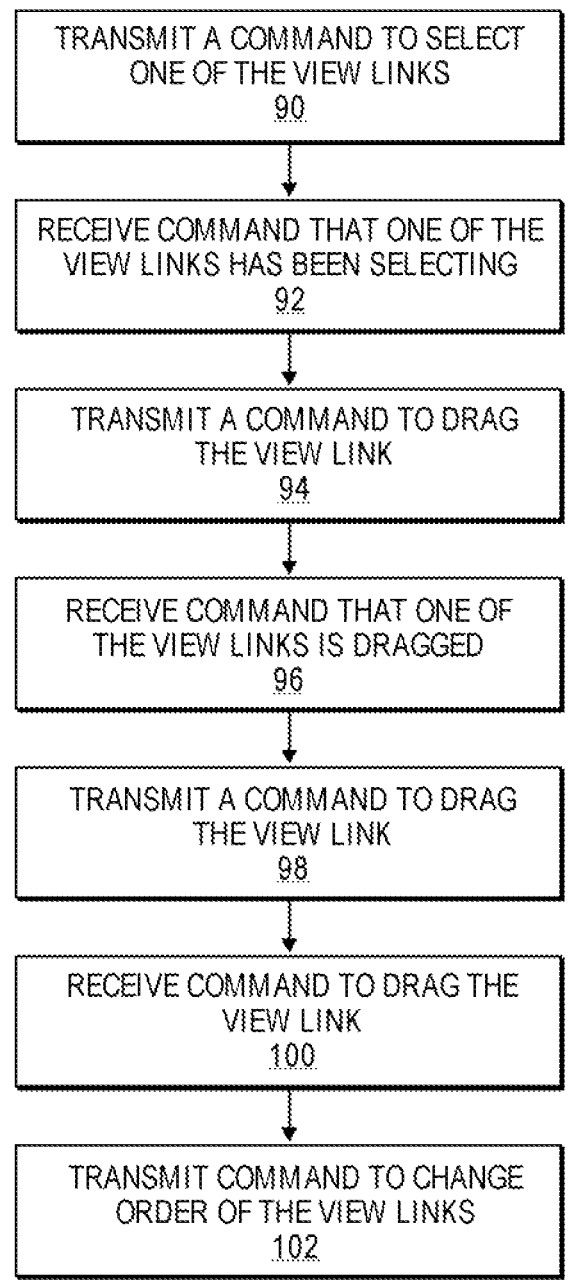
FIG. 6 is a flow chart of client and server interaction illustrating how an order of search view links is edited.

FIG. 6 illustrates the process for changing the order of the search view links between the first order shown in FIG. 2 and the second order shown in FIG. 5. In Step 90, a command is transmitted to select one of the search view links. The command is transmitted from a client site to a server site. In Step 92, the command that is transmitted in Step 90 that one of the search view links has been selected is received at a server site. In Step 94, a command is transmitted from the client site to drag the search view link. In Step 96, the command that is transmitted in Step 94 is received at the server site. In Step 98, a command is sent from the client site to drop the search view link at a specific location in the first order. In Step 100, the command that is transmitted in Step 98 to drop the search view link is received at the server site. In Step 102, in response to the command to drop the search view link received in Step 100, a command is transmitted from the server site to the client site to change an order of the search view links.

Asynchronous Javascript and XML (AJAX) is used to render and update the order of the movable tiles 84 and therefore the order of the search view links 42. The ability to reorder the search view links 42 allows for a user to customize the search view links 42 according to personal preference. AJAX technology allows for the user to easily change the order of the search view links 42 without the need for being redirected to a separate view or a separate page, and without losing viewability of the other components of the user interface 12 while reordering the search view links 42.

Referring again to FIG. 5, the search view links 42 are a first plurality of search view links 42 that are displayed on the "Web" view 22. The cursor 20 can be moved over the "Next" selector 48, and the shape of the cursor 20 changes from an arrow shape into a hand shape, indicating that the "Next" selector 48 is sensitive for selection.

Figure 7:
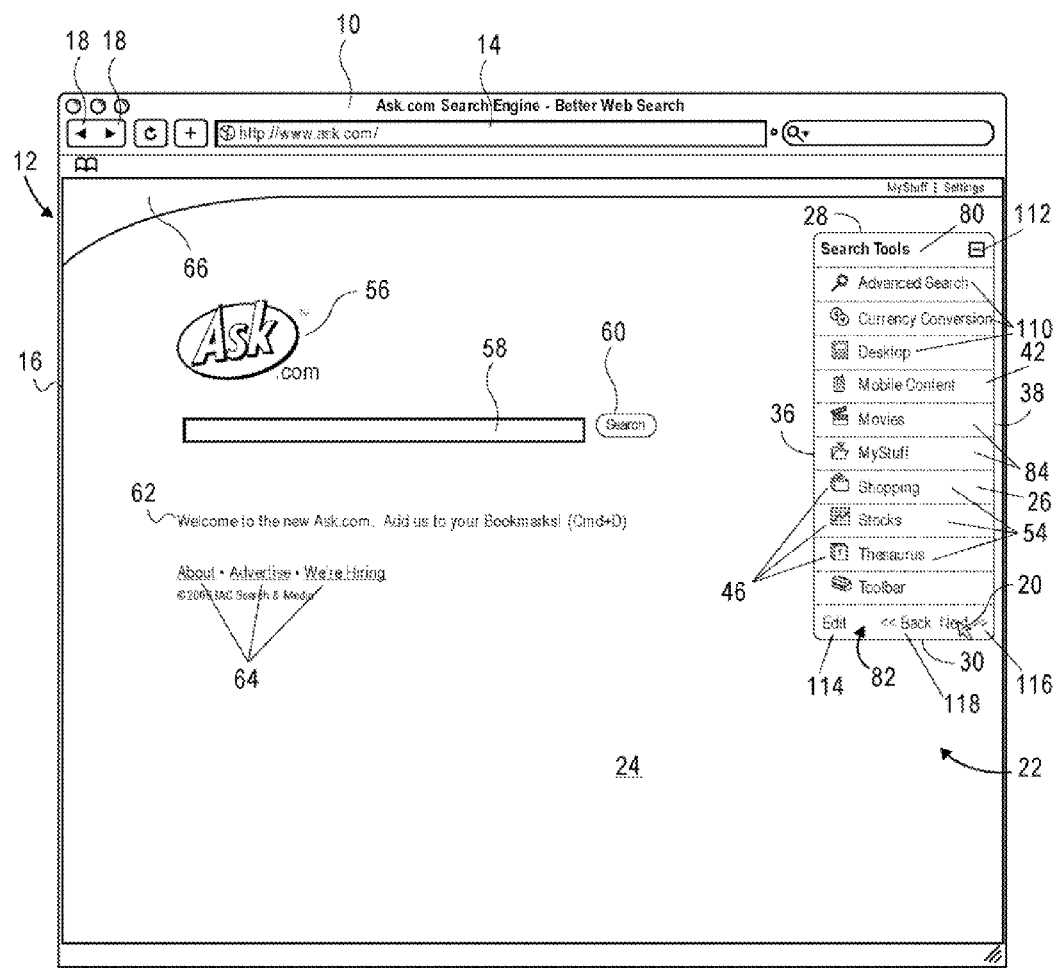
FIG. 7 is a view similar to FIG. 5, after a "Next" button is selected to display a second plurality of search view links.

FIG. 7 illustrates the "Web" view 22 after the "Next" selector 48 in FIG. 5 is selected by clicking the button on the mouse. The "Next" selector 48 in FIG. 5 acts as a forward pagination link, so that the first plurality of search view links 42 in FIG. 5 is replaced with a second plurality of search view links 110 in FIG. 7. Each one of the search view links 110 is located on a respective movable tile 84, and the movable tiles 84 can be dragged and dropped as described with reference to FIG. 4 to modify or edit the order of the search view links 110. All other components on the "Web" view 22, including the logo 56, the search box 58, the search button 60, the static text 62, informational links 64, and graphics 66 remain stationary on the "Web" view 22. A minimizer size selector 112 is provided and functions the same as the minimizer size selector 44 in FIG. 5.

"Edit" and "Next" selectors 114 and 116 are provided in the same locations as the "Edit" and "Next" selectors 46 and 48 in FIG. 5. A "Back" selector 118 is provided to the left of the "Next" selector 116. By selecting the "Next" selector 116, the second plurality of search view links 110 is replaced with yet a third plurality of search view links (not shown). Alternatively, the "Back" selector 118 can be selected. The "Back" selector 118 acts as a reverse pagination link that replaces the second plurality of search view links 110 with the first plurality of search view links 42, and thus returns the "Web" view 22 to the layout or view illustrated in FIG. 5.

Figure 8:
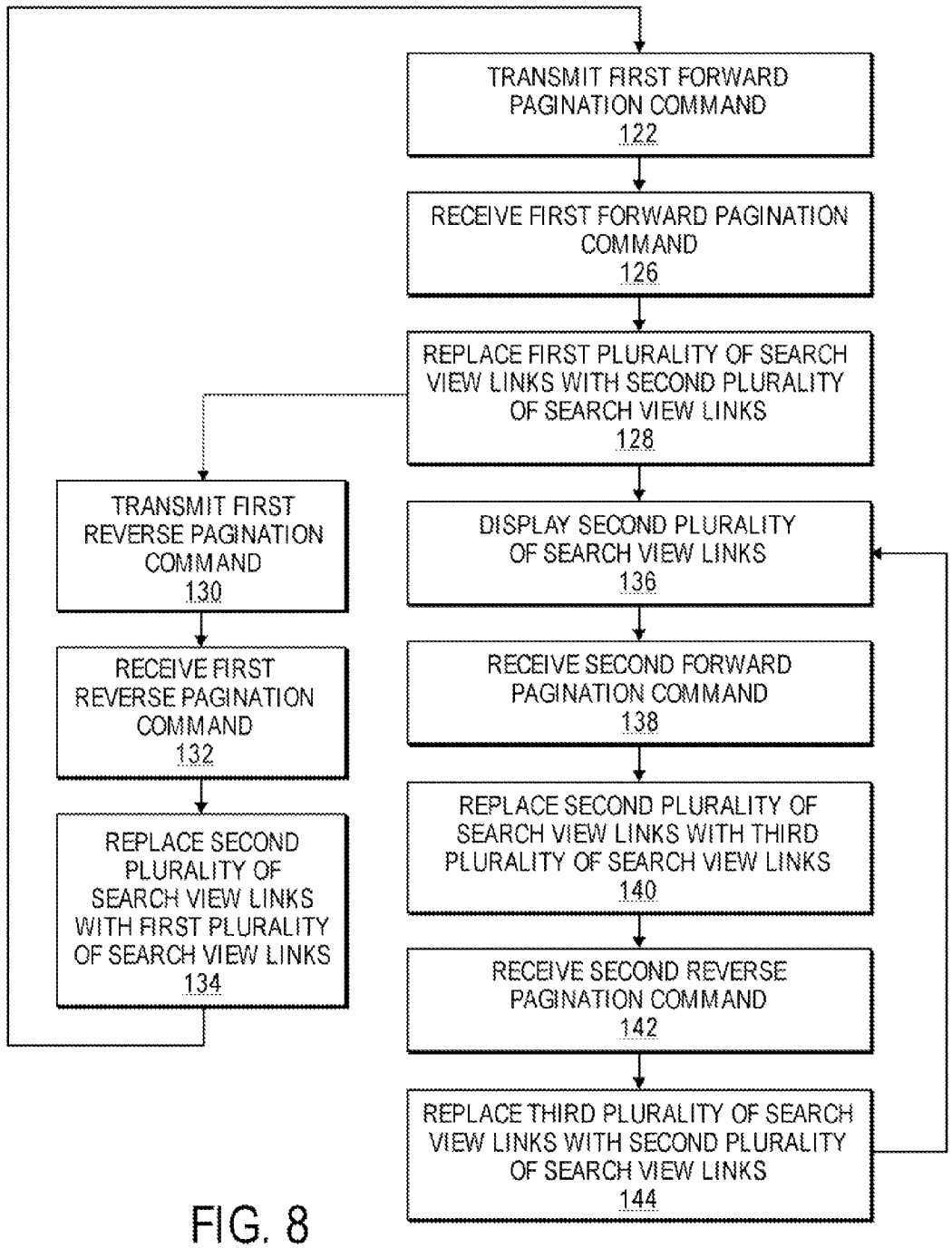
FIG. 8 is a flow chart of client and server interaction illustrating pagination through subsequent pluralities of search view links.

FIG. 8 illustrates how forward and reverse pagination between respective sets of search view links occurs between a client site and a server site. In Step 122, a first forward pagination command is transmitted from a client site. In Step 124, the first forward pagination command is received at the server site. In Step 126, the first plurality of search view links is replaced with the second plurality of search view links. In Step 128, as a result of Step 126, the second plurality of search view links is displayed. At any time when the second plurality of search view links is displayed as in Step 128, Step 130 can be carried out, wherein a first reverse pagination command is transmitted from the client site. In Step 132, the first reverse pagination command is received at the server site. In Step 134, the second plurality of search view links is replaced with the first plurality of search view links. Step 122 can then again be carried out.

Alternatively to Step 130, in Step 136 a second forward pagination command can be transmitted from the client site. In Step 138, the second forward pagination command is received at the server site. In Step 140, the server site replaces the second plurality of search view links with a third plurality of search view links. In Step 142, a second reverse pagination command can be transmitted from the client site. In Step 144, and in response to Step 142, the server site replaces the third plurality of search view links with the second plurality of search view links. As a result, Step 136 is carried out, wherein the second plurality of search view links is displayed.

Referring again to FIG. 5, the search view links 42 displayed in the "Web" view 22 are a first set of search view links, including "Images," "Web," "News," "Maps & Directions," "Local," "Weather," "Encyclopedia," "Ask for Kids," "Dictionary," and "Blogs & Feeds." Each one of the search view links 42 in the first set of search view links in the "Web" view 22 is selectable to open another view from a first set of views and simultaneously close a previous view. For example, when selecting the search view link 42 entitled "Weather," the "Web" view 22 will close and a "Weather" view (not shown) will open.

Figure 9:
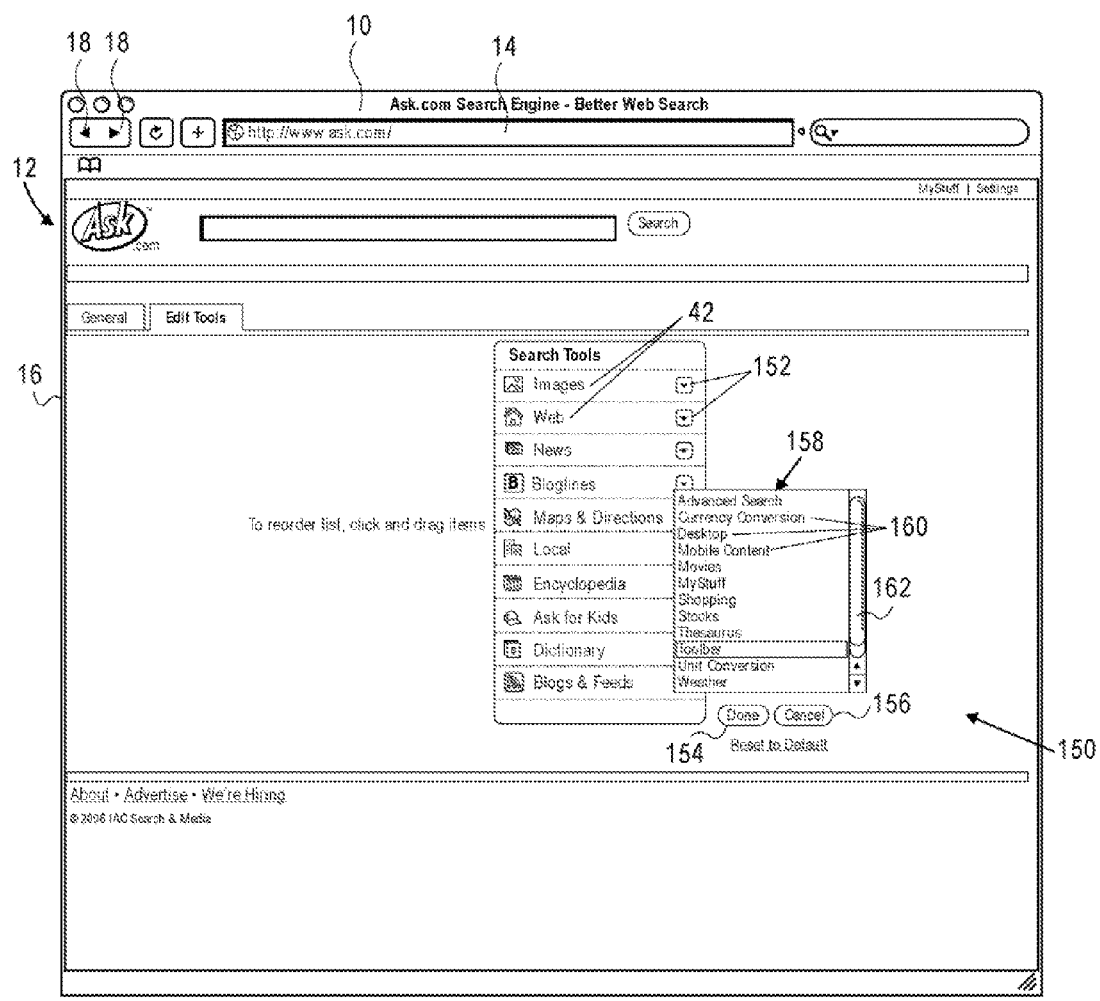
FIG. 9 is an "Edit" view that opens when an "Edit" link in FIG. 7 is selected and further shows a drop-down list of alternate search view links.

FIG. 9 illustrates an "Edit" view 150 that is used for customizing which ones of the search view links 42 should be included in the first set of view links in FIG. 5. The "Edit" view 150 opens when selecting the "Edit" selector 46 in the "Web" view 22 of FIG. 5. The exact same "Edit" view 150 also opens when selecting the "Edit" selector 114 in FIG. 7.

The search view links 42 shown in FIG. 5 are displayed in the "Edit" view 150, together with a drop-down selector 152 directly to the right and associated with each one of the search view links 42, a "Complete" selector 154 labeled "Done," and a "Cancel" selector 156. What should be noted is that the search view links 42 include only the search view links 42 of the first set shown in FIG. 5. When clicking on any one of the drop-down selectors 152, a respective drop-down list 158 is displayed. The drop-down list 158 includes a second set of search view links 160 that are different from the search view links 42 of the first set. In the given example, the drop-down selector 152 next to the search view link 42 labeled "Bloglines" is selected. The second set of search view links 160 includes "Advanced Search," "Currency Conversion," "Desktop," "Mobile Content," "Movies," "MyStuff," "Shopping," "Stocks," "Thesaurus," "Toolbar," "Unit Conversion," and "Weather." It is also possible to scroll down using a scroll bar 162 to display further ones of the search view links 160.

Figure 10:
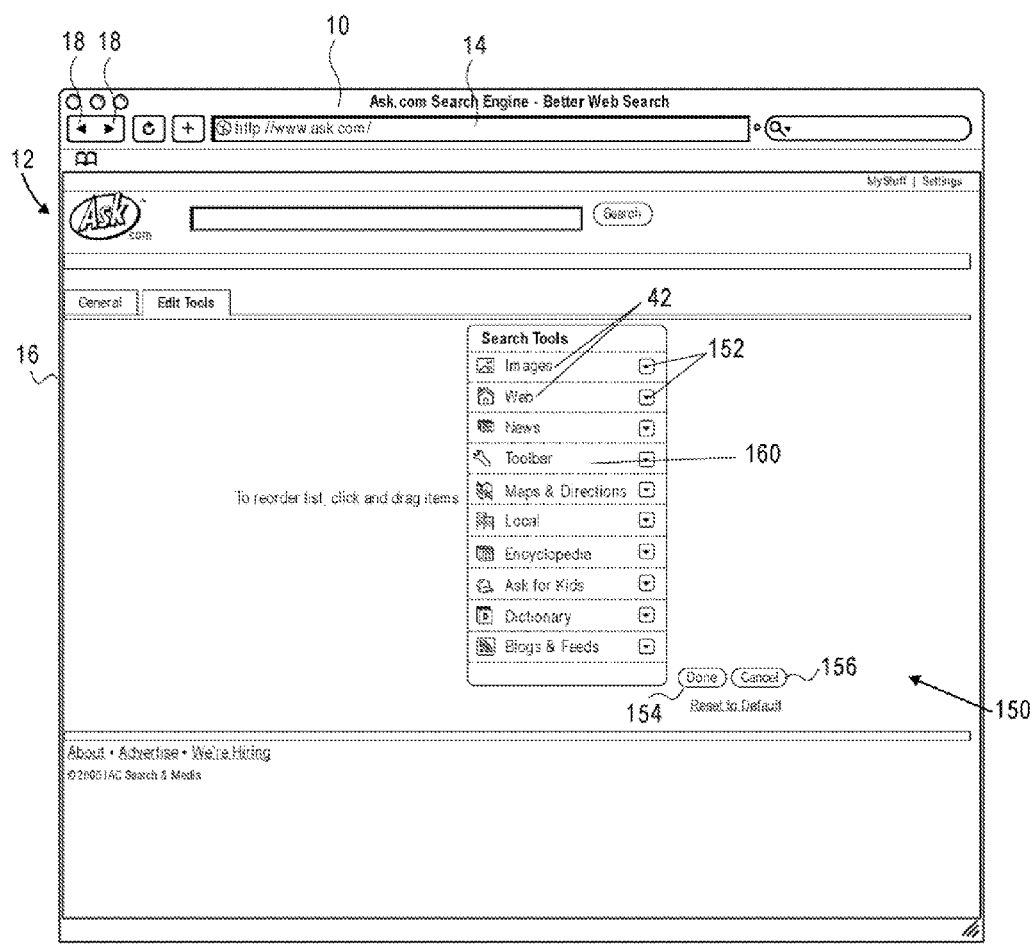
FIG. 10 is a view similar to FIG. 9, after one of the alternate search view links is selected.

In the present example, the search view link 160 labeled "Toolbar" is selected. As shown in FIG. 10, the drop-down list 158 disappears, and the search view link 42 labeled "Bloglines" in FIG. 9 is replaced with a search view link 160 labeled "Toolbar." The search view link 160 labeled "Toolbar" is thus now included in the first set of search view links 42. Other ones of the search view links 42 can be similarly replaced from a respective drop-down list by selecting a respective drop-down selector 152.

Figure 11:
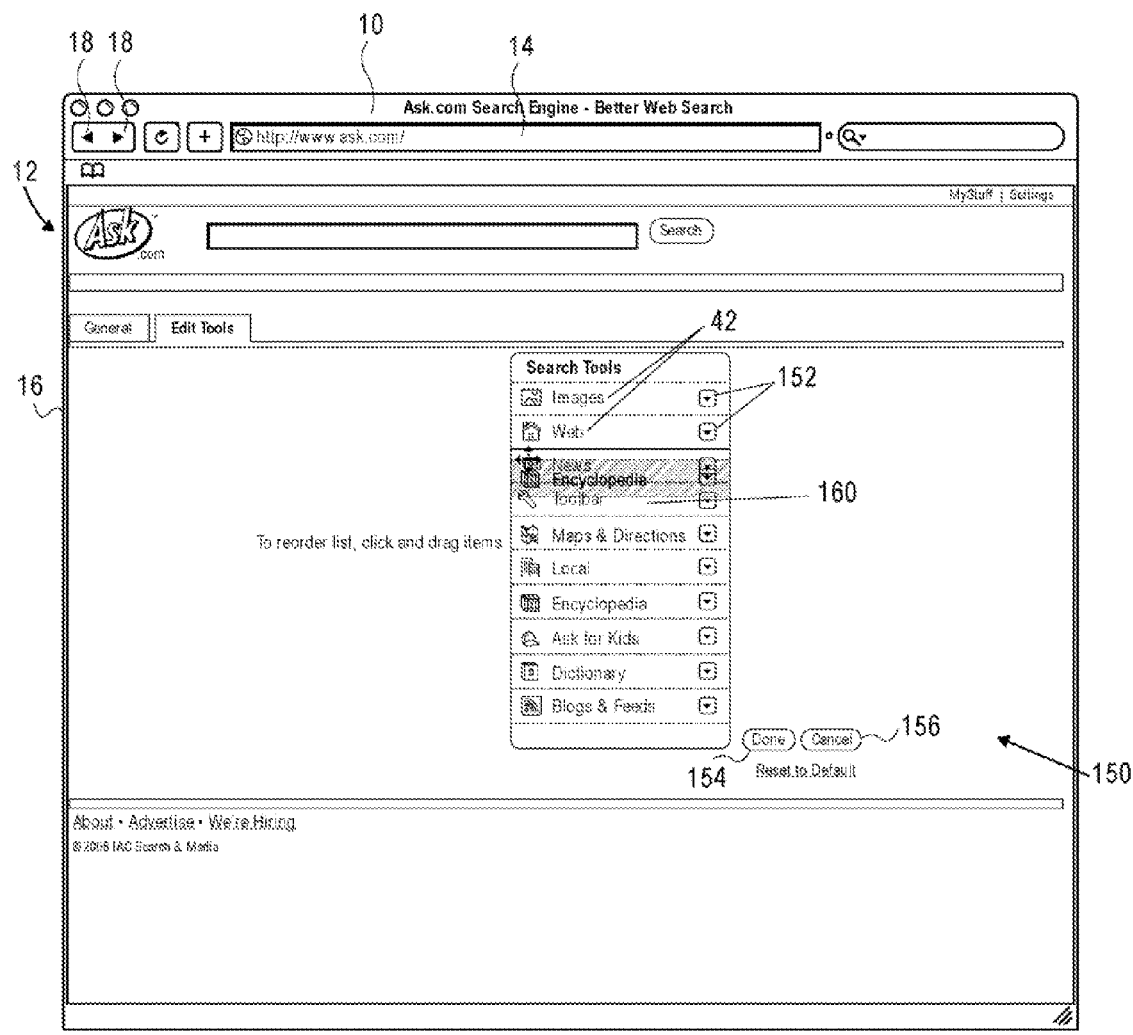
FIG. 11 is a view similar to FIG. 10, illustrating dragging of a tile in a manner similar to FIG. 4.
Figure 12:
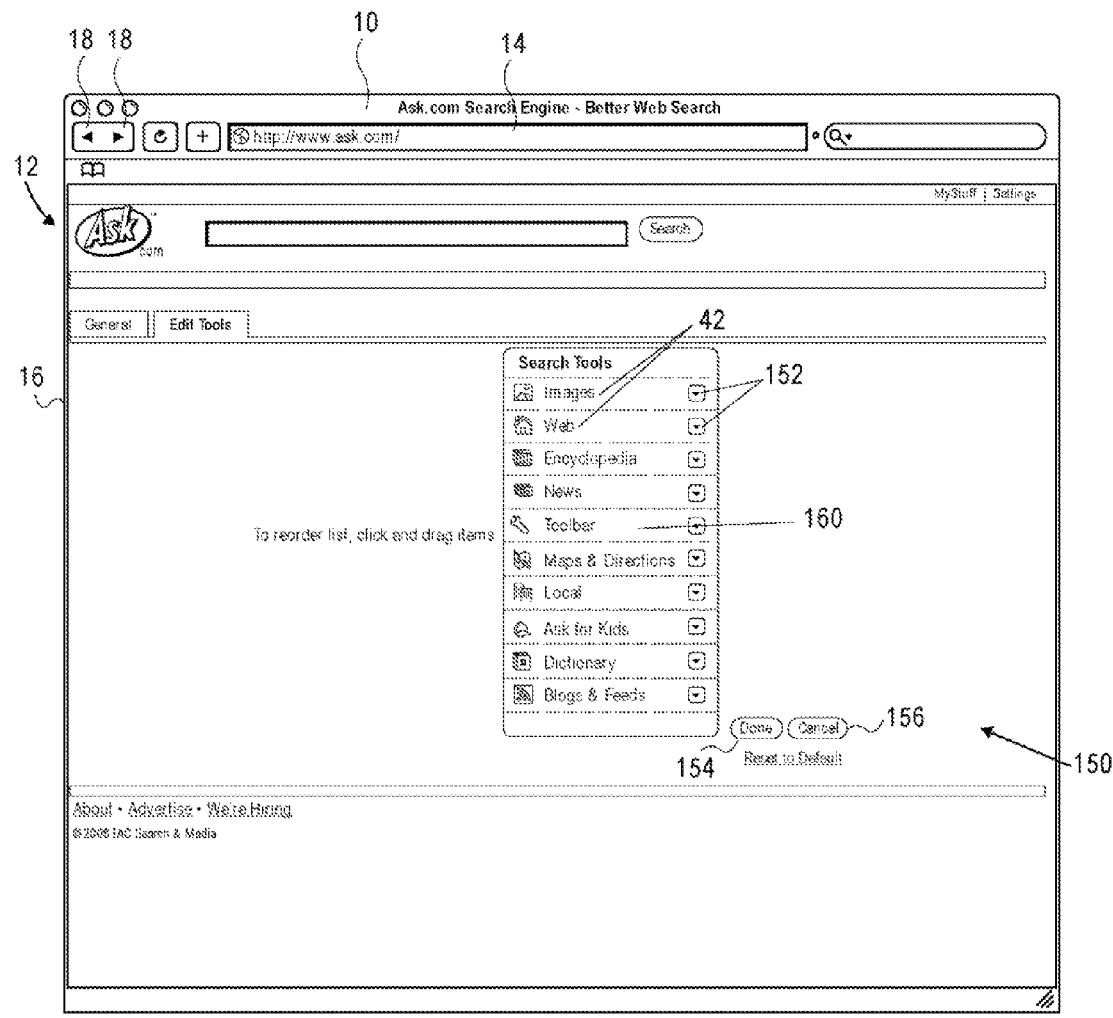
FIG. 12 is a view similar to FIG. 11, after the tile is dropped.

As shown in FIG. 11, the search view links 42 and 160 can have their order customized by dragging and dropping tiles on which the respective search view links 42 or 160 are located, as described with reference to FIG. 4. In the present example, the search view link 42 labeled "Encyclopedia" is moved from a seventh location, shown in FIG. 10, to a third location shown in FIG. 12.

Figure 13:
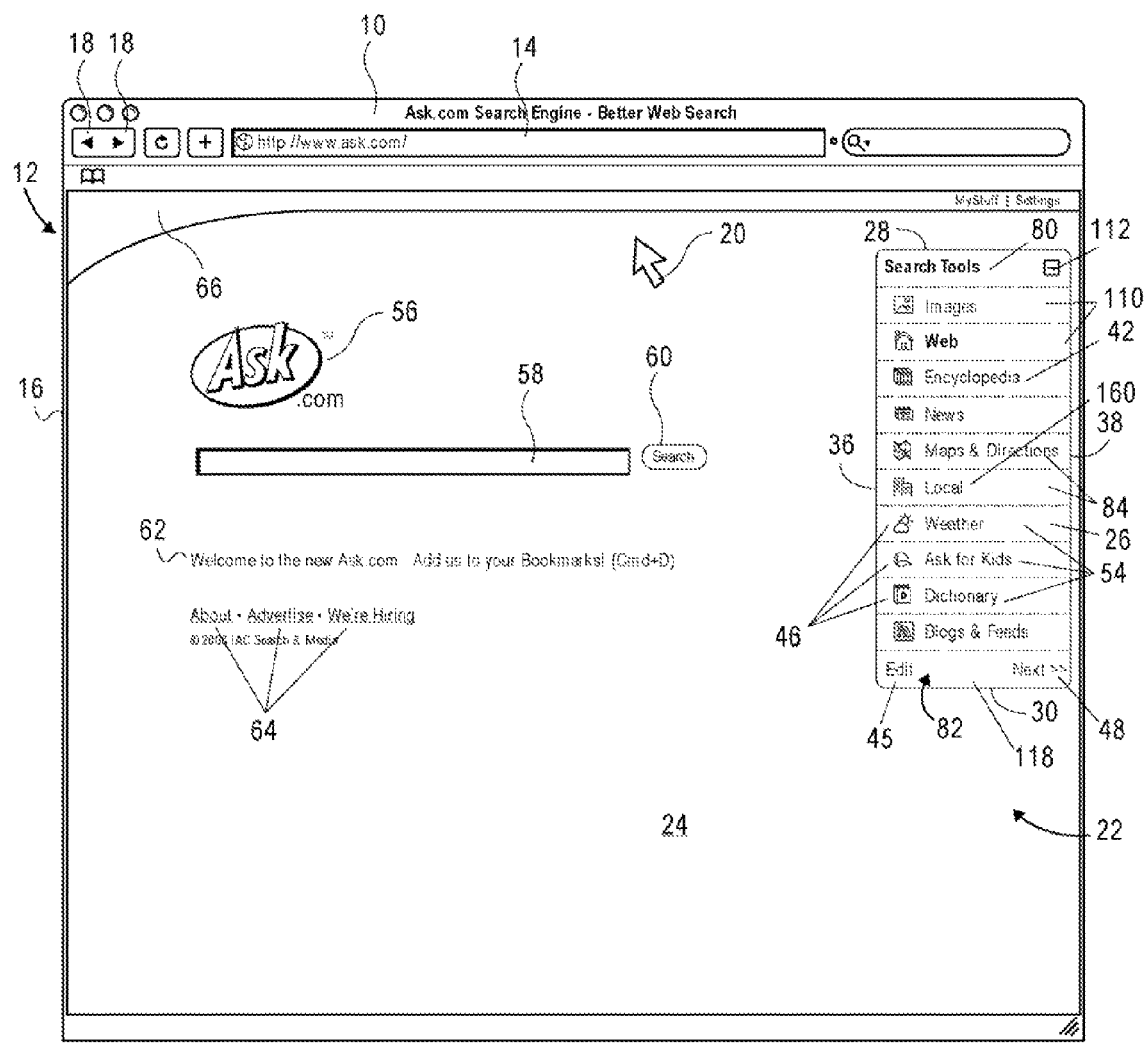
FIG. 13 is a view similar to FIG. 7, after search view links are edited as shown in FIGS. 9 to 12.

Either the "Complete" selector 154 or the "Cancel" selector 156 can then be selected. Upon selection of the "Cancel" selector 156, the "Web" view 22 as shown in FIG. 5 opens with the search view links 42, not including the search view link 160 labeled "Toolbar." Upon selection of the "Complete" selector 154, the "Edit" view 150 closes and the "Web" view 22 opens as shown in FIG. 13. The first set of search view links 42 in the "Web" view 22 of FIG. 13 includes the search view link 160 labeled "Local." The search view link 42 labeled "Encyclopedia" is moved from a location at number seven in the list in FIG. 5 to a location at number three in the list. The search view link 160 labeled "Local" can now be selected to open a respective search view for conducting a local search, and the "Web" view 22 is simultaneously closed. The search view links 42 and 160 now have a third order that is different from the second order discussed with reference to FIG. 5.

Figure 14:
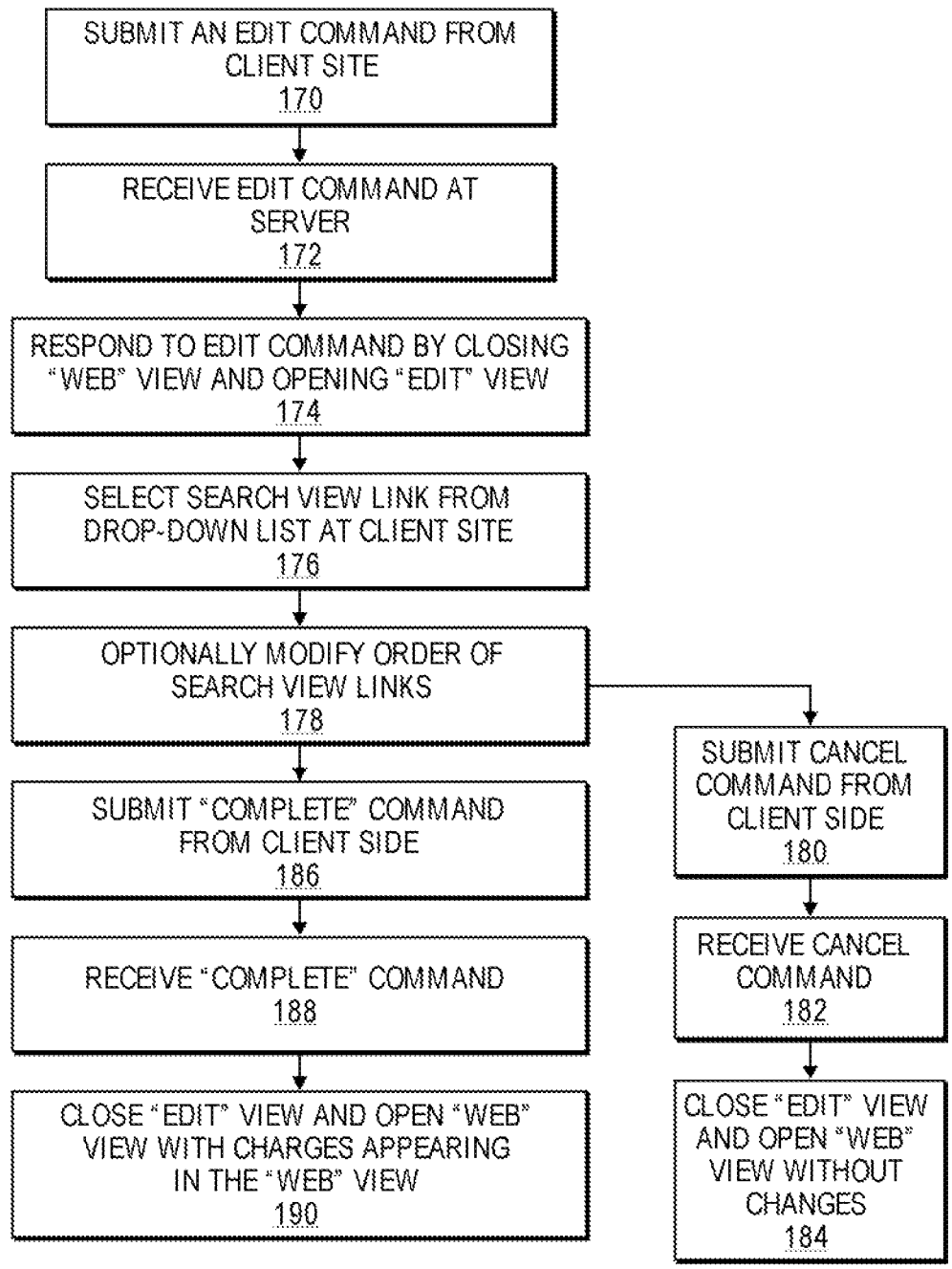
FIG. 14 is a flow chart of client and server interaction showing editing of search view links.

FIG. 14 illustrates server and client interaction to edit the search view links 42. At Step 170, an "Edit" command is submitted from the client site. At Step 172, the "Edit" command is received at the server. At Step 174, the server responds to the "Edit" command by closing the "Web" view and opening the "Edit" view. At Step 176, a user at the client site selects a search view link from the drop-down list displayed at the client site. At Step 178, the user optionally modifies an order of the search view links. At Step 180, the user can submit the "Cancel" command from the client site. At Step 182, the server receives the "Cancel" command from the client site. At Step 184, the server responds to the "Cancel" command by closing the "Edit" view and opening the "Web" view without changes. As an alternative to Step 180, the user at Step 186 can submit a "Complete" command from the client site. At Step 188, the server receives the "Complete" command. At Step 190, the server responds to the "Complete" command by closing the "Edit" view and opening the "Web" view with changes appearing in the "Web" view.

Figure 15:
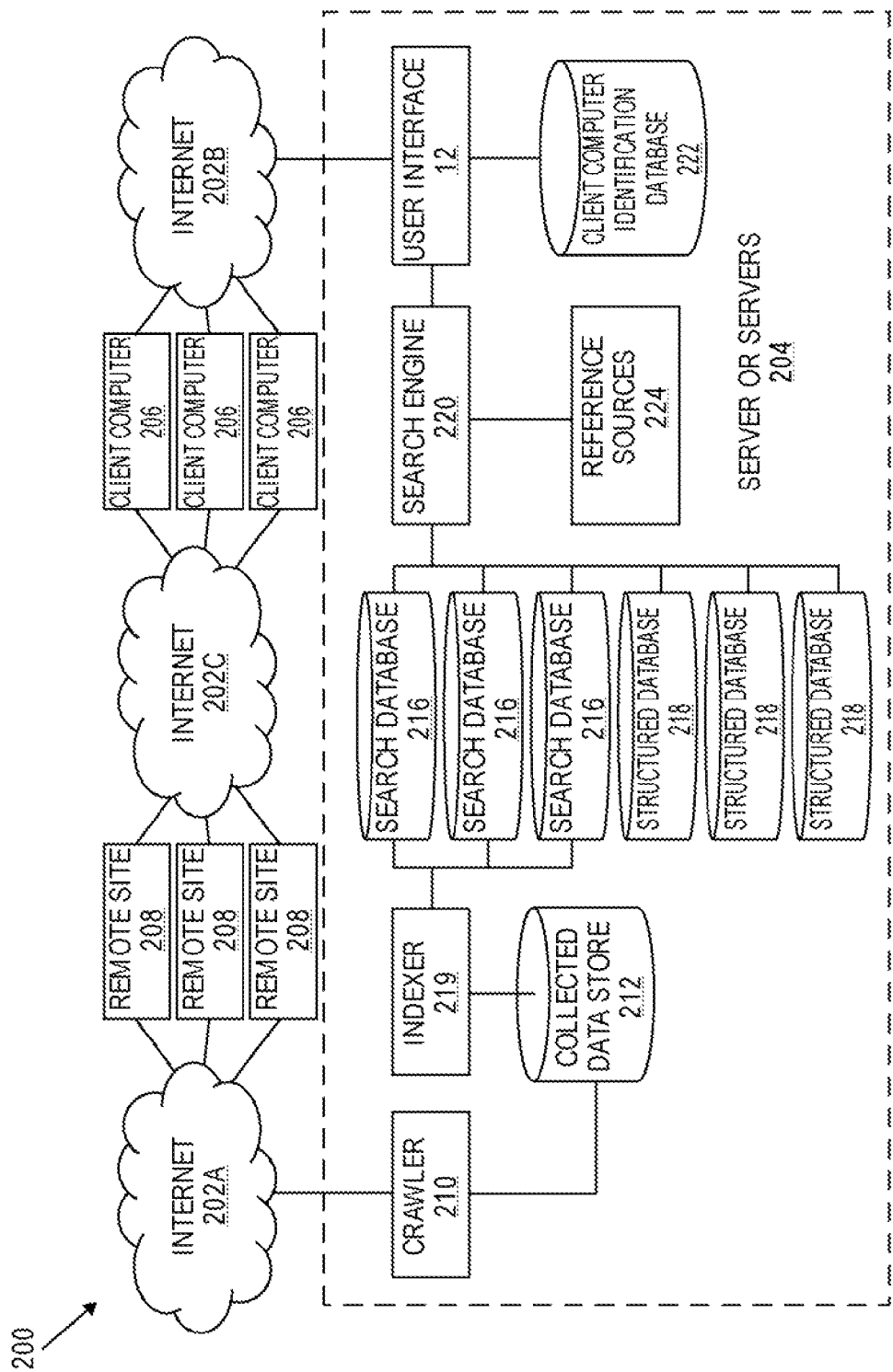
FIG. 15 is a block diagram of a network environment, in which the user interface of FIG. 1 can find application.

FIG. 15 illustrates a network environment 200 in which the user interface 12 finds particular application. The network environment 200 includes the Internet 202A, 202B, and 202C, one or more server or servers 204, a plurality of client computers 206, and a plurality of remote sites 208.

The server or servers 204 have stored thereon a crawler 210, a collected data store 212, an indexer 214, a plurality of search databases 216, a plurality of structured databases 218, a search engine 220, the user interface 12, a client identification database 222, and reference sources 224. The crawler 210 is connected over the Internet 202A to the remote sites 208. The collected data store 212 is connected to the crawler 210, and the indexer 214 is connected to the collected data store 212. The search databases 216 are connected to the indexer 214. The search engine 220 is connected to the search databases 216 and the structured databases 218. The client computers 206 are located at respective client sites and are connected over the Internet 202B and the user interface 12 to the search engine 220. The client computer identification database 222 is also connected to the user interface 12. The client computers 206 are also connected over the Internet 202C to the remote sites 208.

Figure 16:
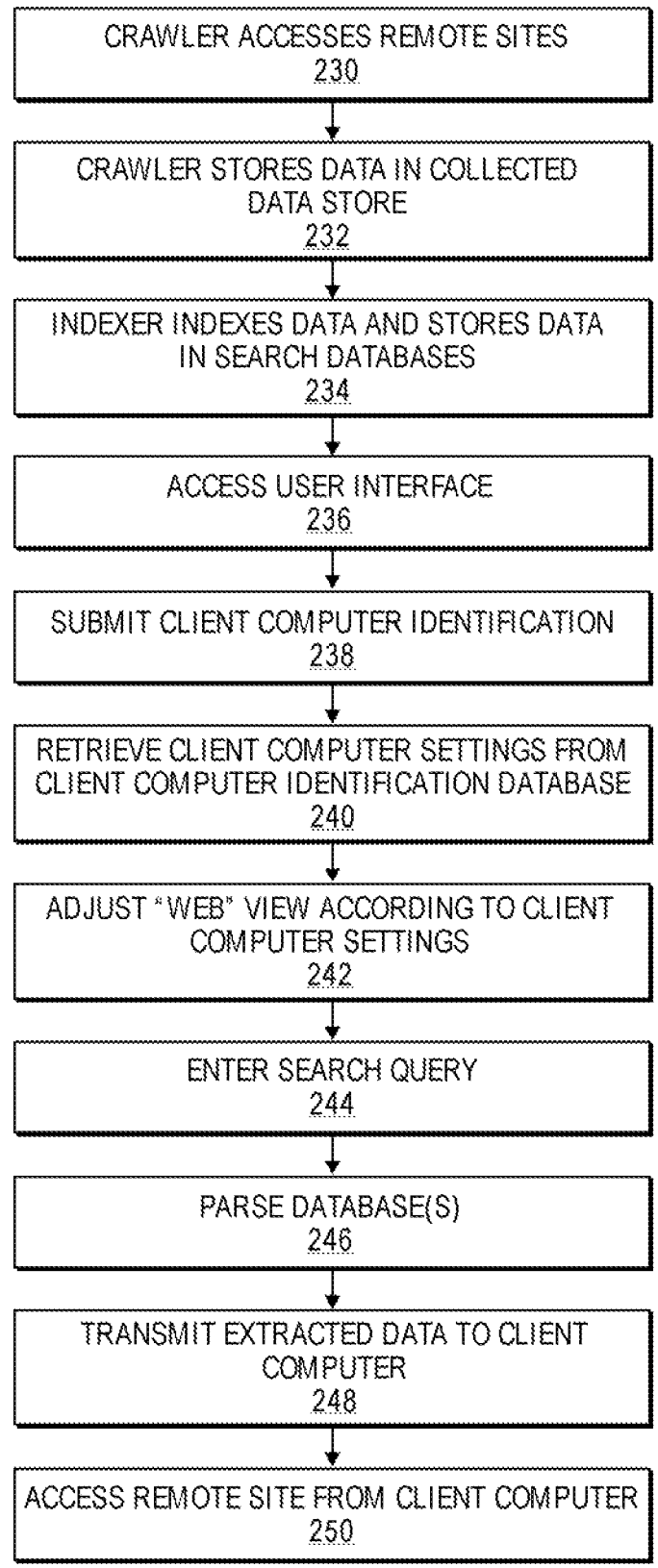
FIG. 16 is a flow chart of client and server interaction illustrating how a search is conducted in the network environment of FIG. 15, and using the interface of FIG. 1.

Reference is now made to FIGS. 15 and 16 in combination to describe the functioning of the network environment 200. The crawler 210 periodically accesses the remote sites 208 over the Internet 202A (Step 230). The crawler 210 collects data from the remote sites 208 and stores the data in the collected data store 212. The indexer 214 indexes the data in the collected data store 212 and stores the indexed data in the search databases 216 (Step 234). The search databases 216 may, for example, be a "Web" database, a "News" database, a "Blogs & Feeds" database, an "Images" database, etc. The structured databases 218 are licensed from third-party providers and may, for example, include an encyclopedia, a dictionary, maps, a movies database, etc.

A user at one of the client computers 206 accesses the user interface 12 over the Internet 202B (Step 236). The client computer 206 also transmits a client computer identification to the user interface 12 (Step 238). The user interface 12 retrieves client computer settings from the client computer identification database 222 corresponding to the client computer identification (Step 240). The user interface 12 then adjusts the layout of the "Web" view 22 in accordance with the client computer settings and as described with reference to FIGS. 1 through 14 (Step 242). The user can enter a search query in the search box 58 in FIG. 13, and either hit "Enter" on a keyboard or select the "Search" button 60 (Step 244). The search engine 220 then uses the "Search" query to parse the search databases 216 or the structured databases 218. In the example of the "Web" view 22, the search engine 220 parses the search database 216 having general Internet Web data (Step 246). Various technologies exist for comparing or using a search query to extract data from databases, as will be understood by a person skilled in the art.

The search engine 220 then transmits the extracted data over the Internet 202B to the client computer 206 (Step 248). The extracted data typically includes URL links to one or more of the remote sites 208. The user at the client computer can select one of the links to the remote sites 208 and access the respective remote site 208 over the Internet 202C (Step 250). The server or servers 204 have thus assisted the user at the respective client computer to find or select one or more of the remote sites 208 that have data pertaining to the query entered by the user.

Figure 17:
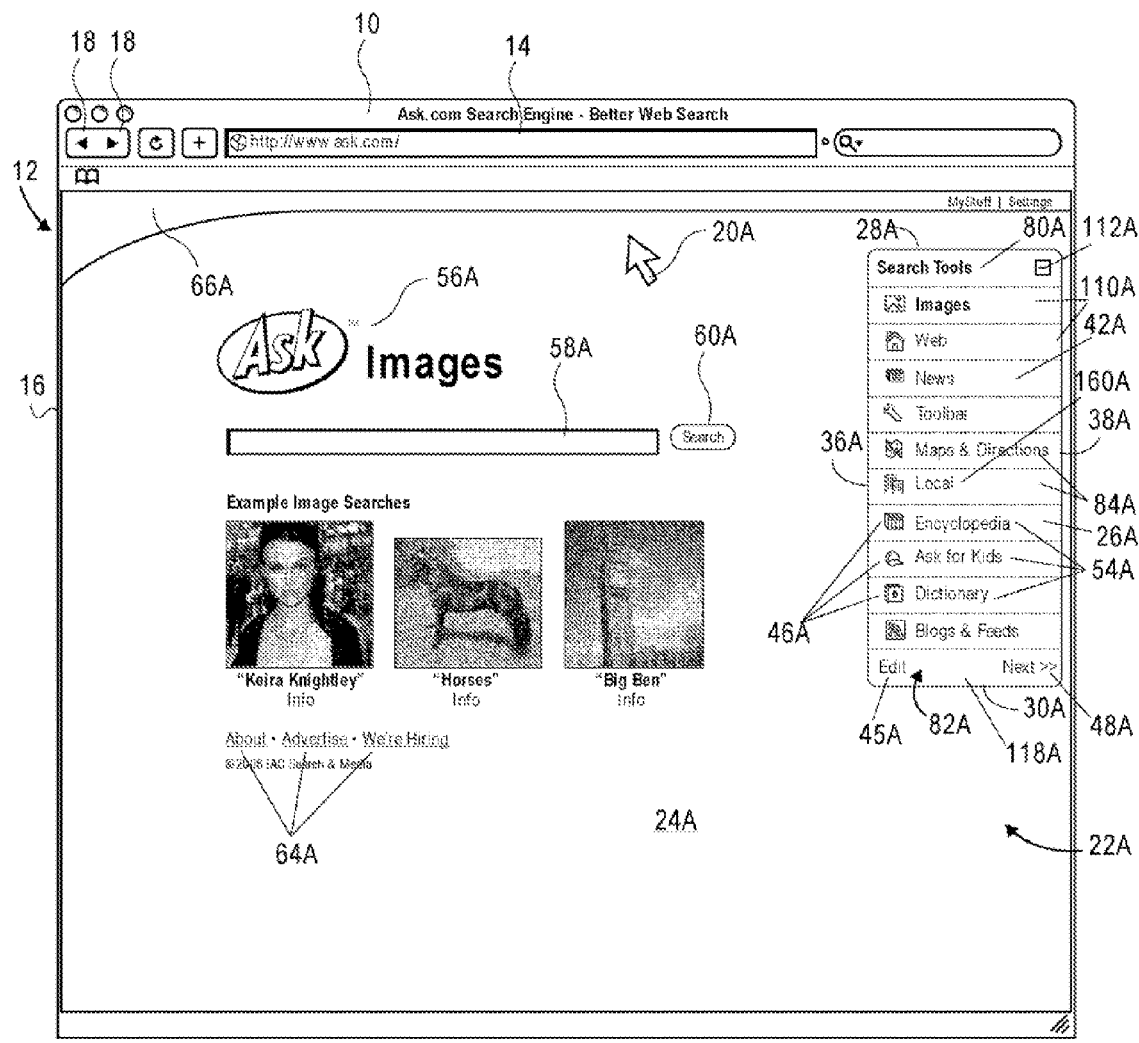
FIGS. 17 through 22 are further views of the user interface after individual ones of the search view links are selected.
Figure 18:
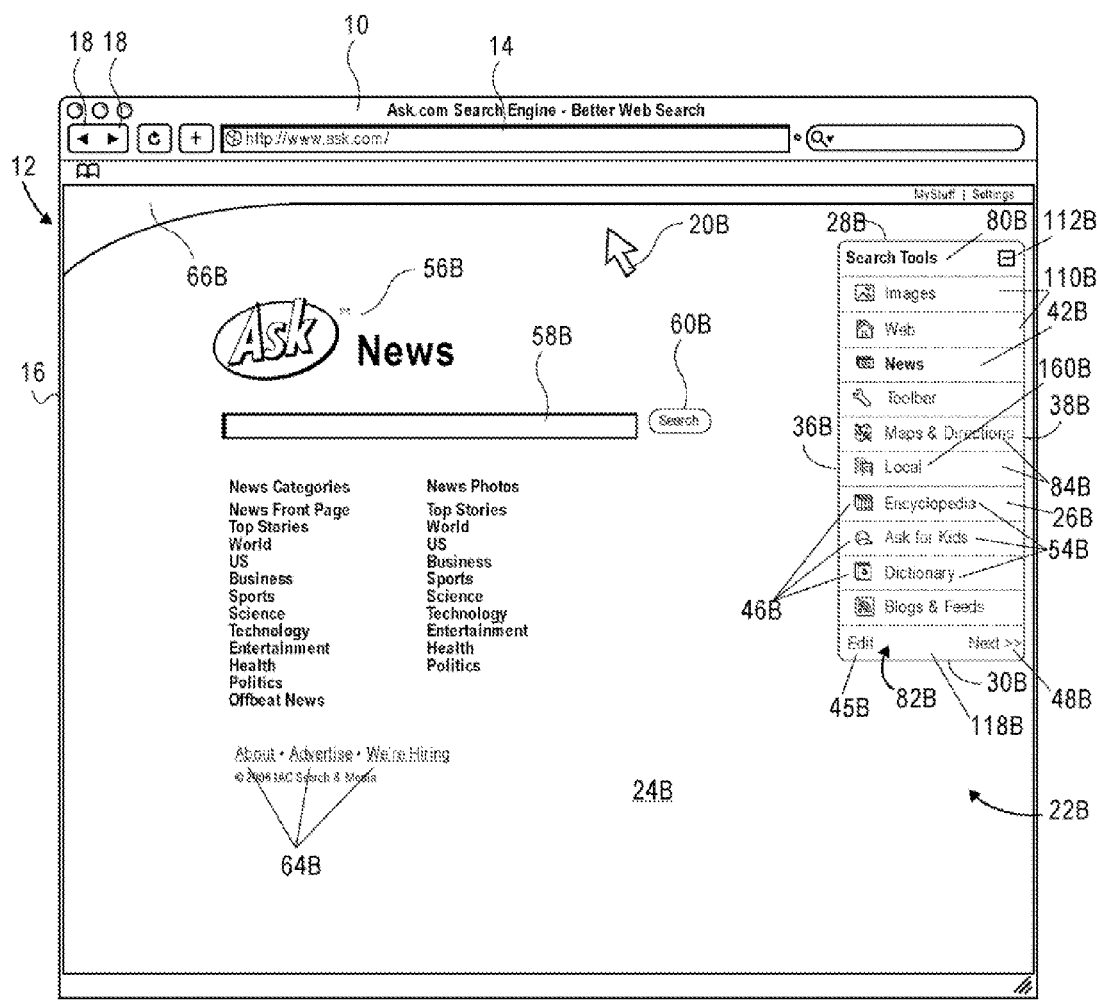
Figure 19:
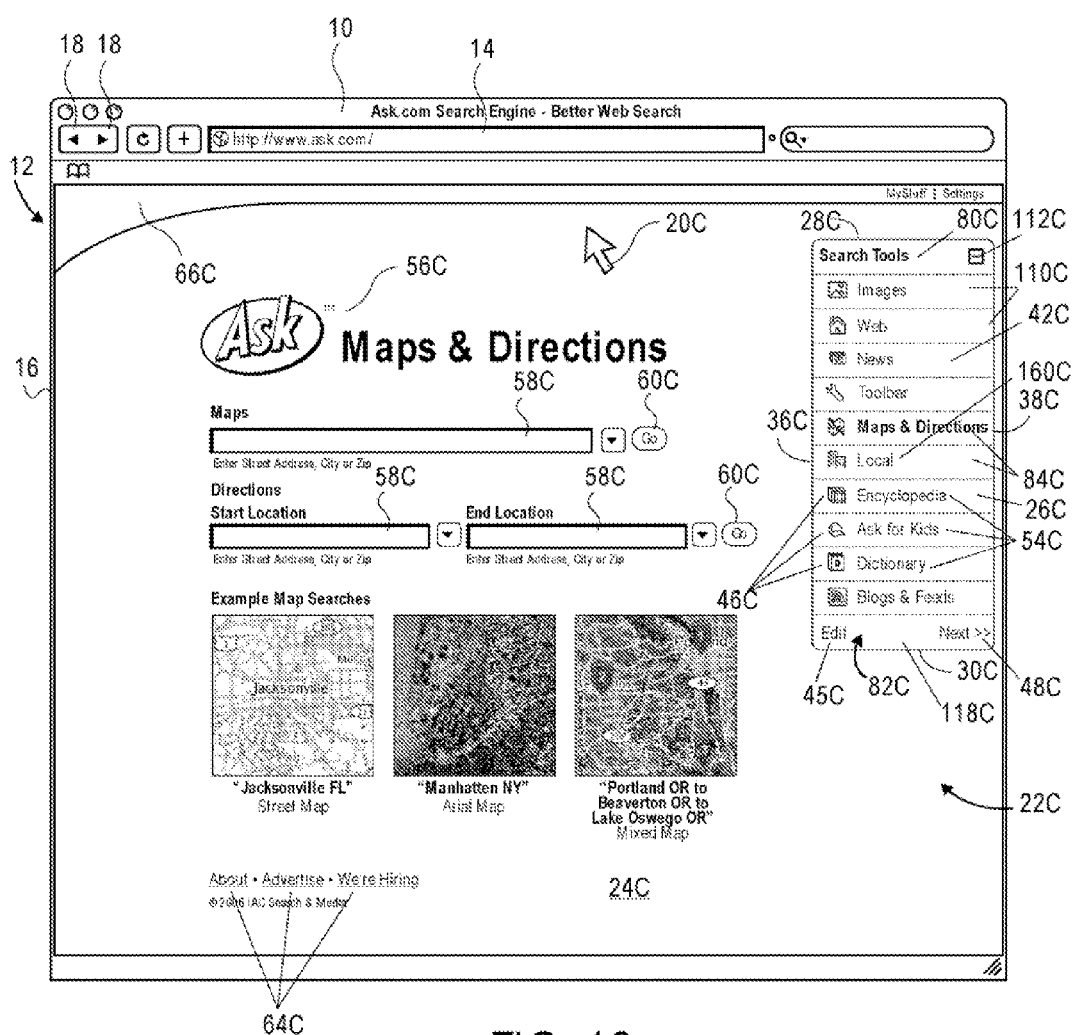
Figure 20:
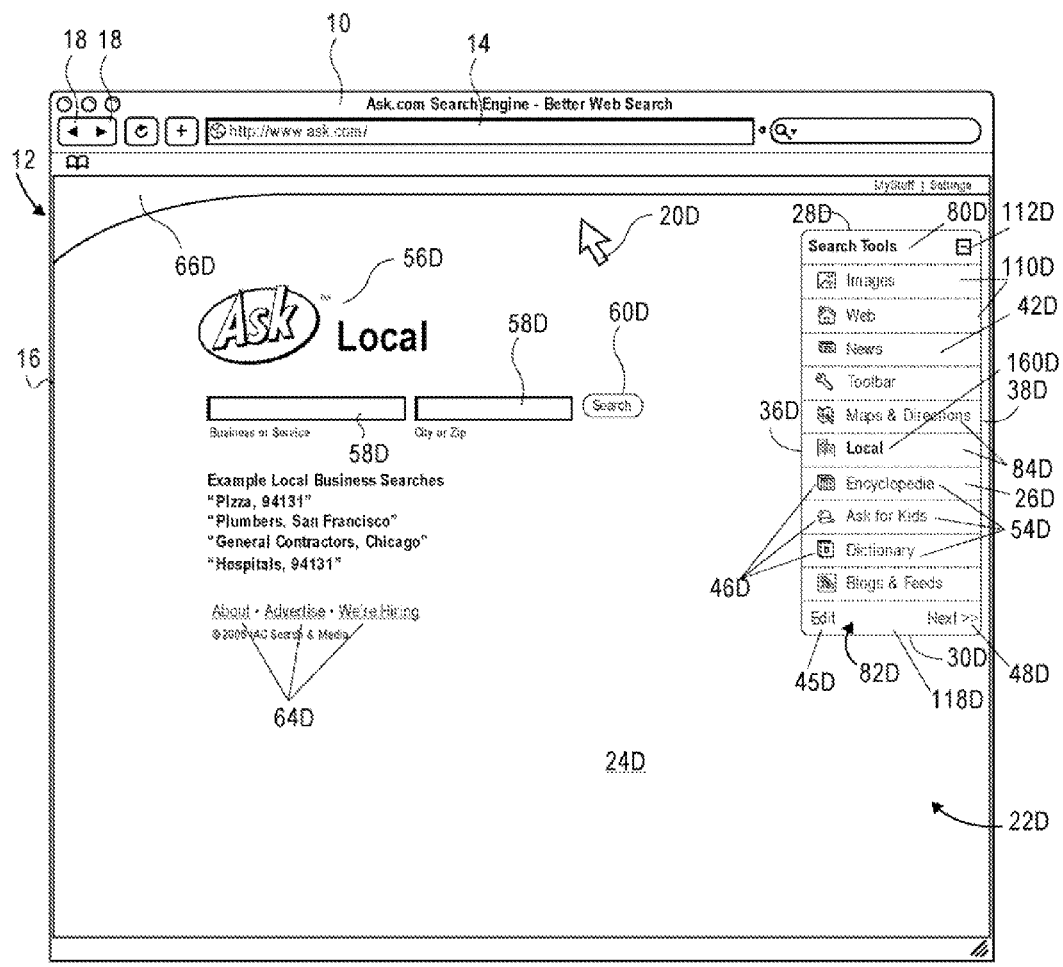
Figure 21:
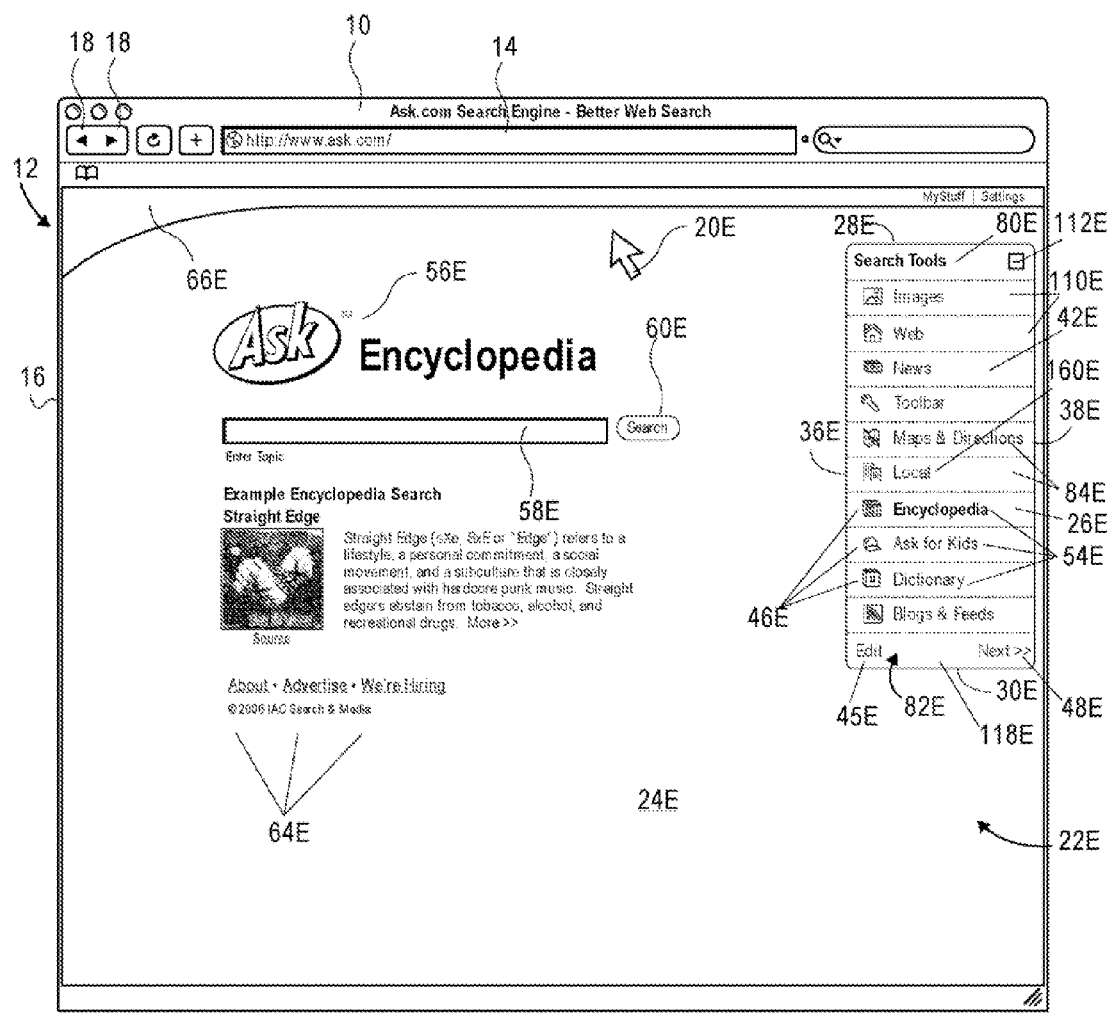

A user can select the search view link 42 labeled "Images" in FIG. 13 to open an "Images" view 22A as shown in FIG. 17. Much of the code that is used to generate the "Web" view 22 of FIG. 13 is the exact same code that is used to generate components of the "Images" view 22A. It is assumed that the "Images" view 22A in FIG. 17 replaces the "Web" view 22 of FIG. 13, for example because FIGS. 13 and 17 are views at two different moments in time. The "Images" view 22A, however, has similar components as the "Web" view 22, and like components have like reference numerals appended with an "A" in the "Images" view 22A of FIG. 17 when compared with the "Web" view 22 of FIG. 13. What should also be noted is that all the components in the "Images" view 22A in FIG. 17 are in the same locations as the similar components in the "Web" view in FIG. 13. For example, the search box 58A is in exactly the same location and has the same dimensions and shape as the search box 58. The search view links 42A are also in the same order as the third order of the search view links 42. The "Edit" and "Next" selectors 46A and 48A also function in the same way as the "Edit" and "Next" selectors 46 and 48 respectively. The order of the search view links 42A can also be modified as described with reference to FIG. 4 or with reference to FIG. 11. The "Images" view 22A also has a minimizer size selector 44A that functions in the same way as the minimizer size selector 44 in FIG. 13.

A primary difference between the "Images" view 22A of FIG. 17 and the "Web" view 22 of FIG. 13 is the underlying functionality. When conducting a search in the "Web" view 22 of FIG. 13, the search engine 220 in FIG. 15 searches one of the search databases 216 holding general Internet data. In conducting a search by entering a query in the search box 58A in the "Images" view 22A of FIG. 17, the search engine 220 searches another one of the search databases 216 holding image data. Data that is extracted from such a search database include primarily images. Images may, for example, be in jpeg, bitmap, or other formats for rendering two-dimensional pictures.

FIGS. 18 through 22 illustrate further views that can be opened by selecting respective ones of the search view links 42A-F or 160A-F. When comparing FIGS. 13 and 17 through 21, it can be seen that many of the components are located in exactly the same locations from one view to another. What should be noted in particular is that the second rectangular areas 26 and 26A-F are located in exactly the same locations in the respective views 22 and 22A-F. The search boxes 58, 58A, 58B, and 58E are located in exactly the same locations. The "Maps & Directions" view 22C of FIG. 19 has three boxes 58C for entering data. The "Local" view 22D of FIG. 20 has two boxes for entering data.

Figure 22:
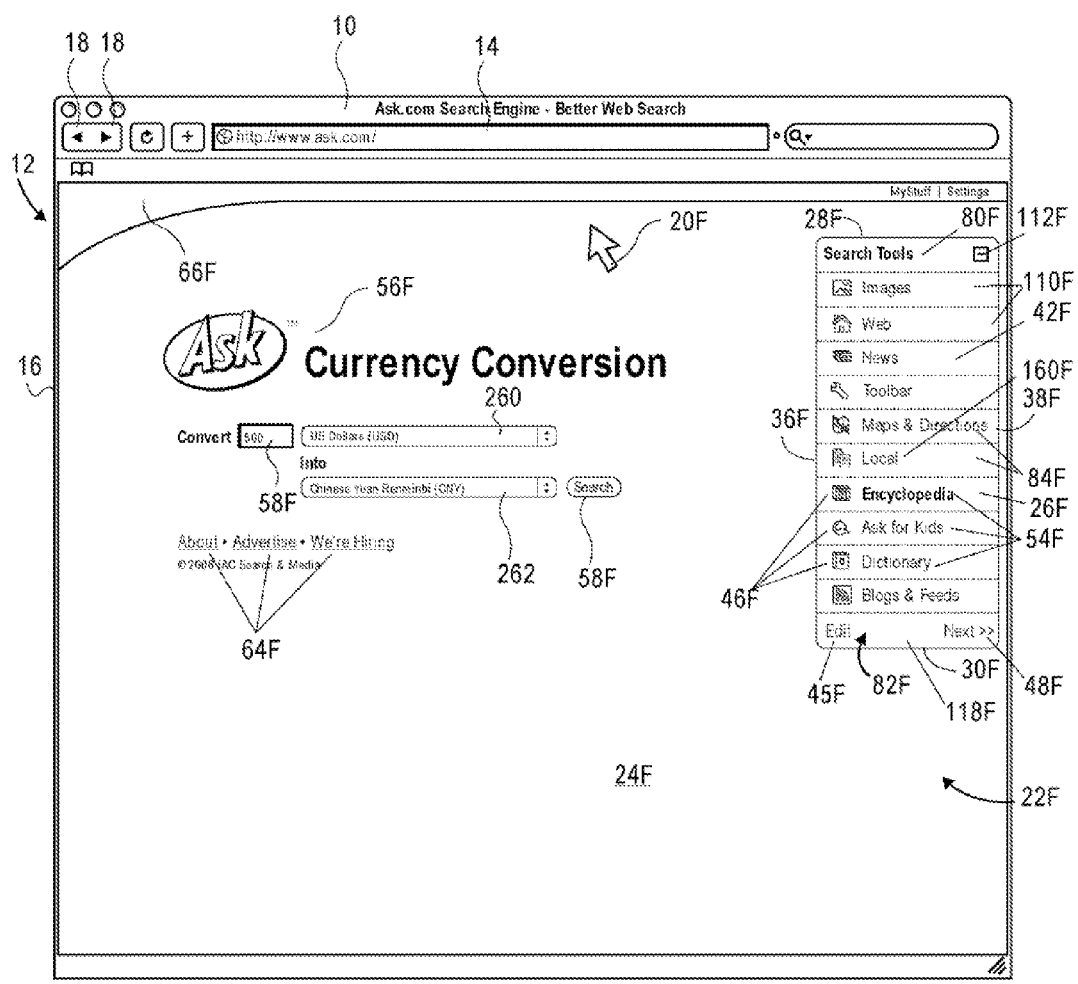
Figure 23:
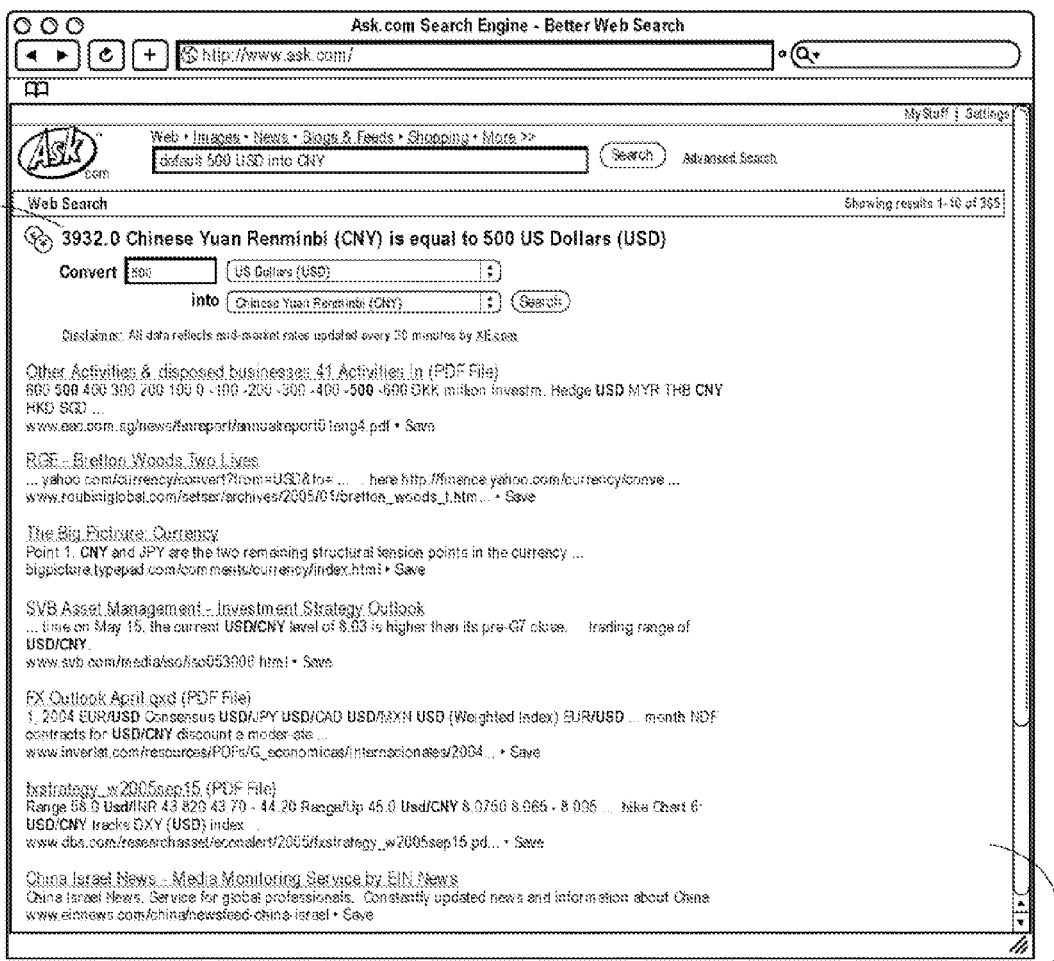
FIG. 23 is a search results view that appears in response to a search conducted using the view of FIG. 22.

The "Currency Conversion" view 22F of FIG. 22 has a search box 58F for entering a monetary amount, in the present example, $500.00. The "Currency Conversion" view 22A also has two monetary drop-down lists 260 and 262. A user can select a currency in each one of the lists 260 and 262 and then select the search button 60F for purposes of converting the monetary amount entered in the search box 58F from the currency in the list 260 to the currency in the list 262. FIG. 23 illustrates a "Currency Conversion Results" view 266 that appears after the search button 60F in FIG. 22 is selected. The "Currency Conversion" view 22F disappears and is replaced by the "Currency Conversion Results" view 266. The "Currency Conversion Results" view 266 includes a "Calculation Result" 268. The "Calculation Result" 268 is calculated based on the present exchange rate between the two currencies selected in the monetary drop-down lists 260 and 262, and multiplying the exchange rate by the monetary value entered in the search box 58F. The "Currency Conversion Results" view 266 also includes search boxes and drop-down lists such as the search box 58F and lists 260 and 262 in the "Currency Conversion" view 22F.

Figure 24:
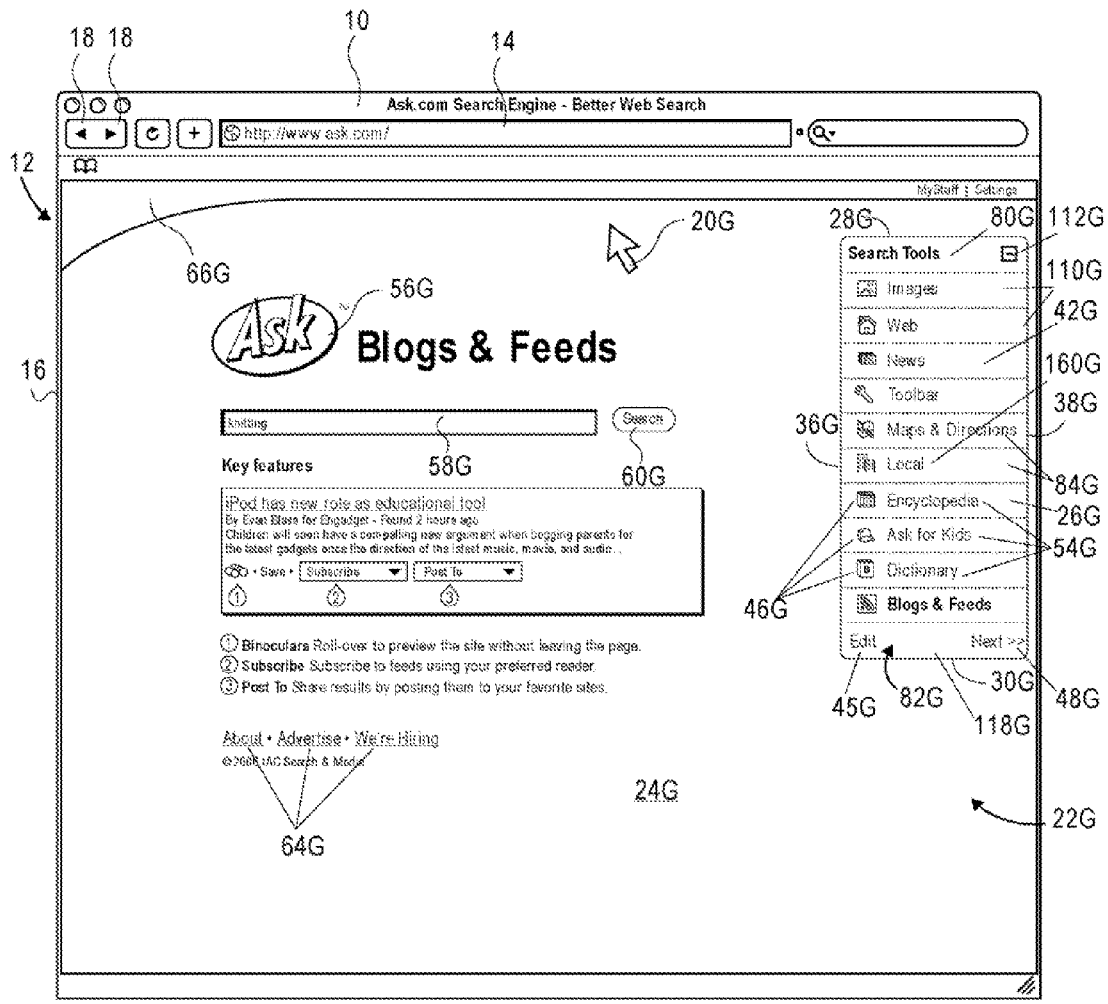
FIG. 24 is a further view of the user interface, when a further one of the search view links is selected.

FIG. 24 illustrates a "Blogs & Feeds" view that opens when, for example, the search view link 42E labeled "Blogs & Feeds" in FIG. 22 is selected. A user enters a search request in the search box 58G and selects the search button 60G.

Figure 25:
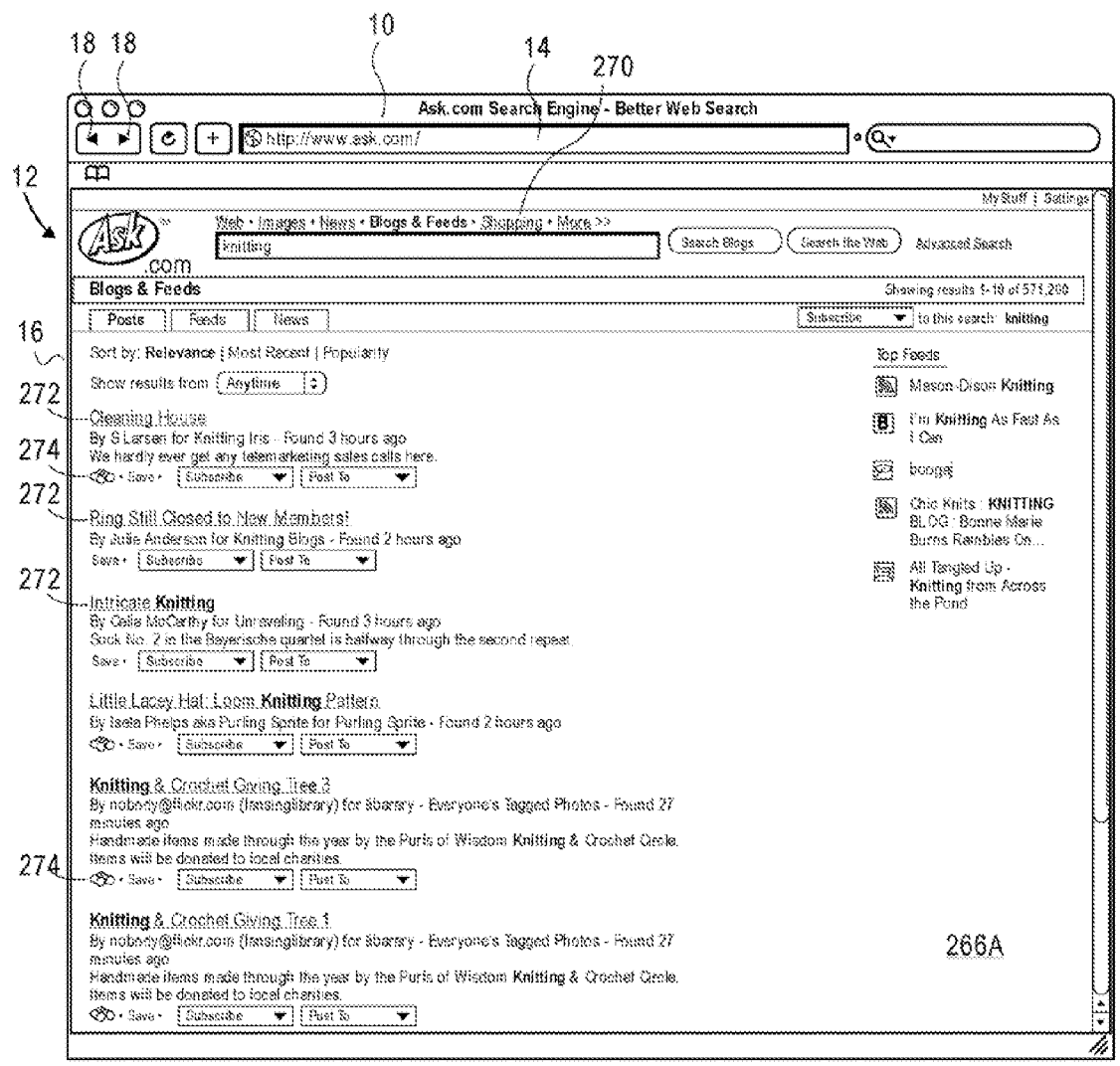
FIG. 25 is a results view when a search is conducted in the view of FIG. 24.

FIG. 25 illustrates a "Blogs & Feeds" results view 266A that opens when the user conducts the search in FIG. 24, and the "Blogs & Feeds" view 22G closes. The "Blogs & Feeds" results view 266A includes a plurality of search view links 270 horizontally across the top of the view 266A. The search view links "Web," "Images," "News," and "Shopping" are selectable, and the search view link "Blogs & Feeds" is not selectable. The exact same "Blogs & Feeds" results view 266A can also be obtained by, for example, entering the same search criteria in the "Web" view 22 in FIG. 13 to open a "Web" results view 266B in FIG. 26 and selecting a "Blogs & Feeds" view link at the top of the "Web" results view.

The "Blogs & Feeds" results view 266A includes a plurality of search result links 272. The search result links 272 are provided to the client site by the search engine 220 in FIG. 15 because they are URLs that point to remote sites 208 in FIG. 15 containing RSS feed information or data.

A subset of the links 272 also have icons 274, in the present example binoculars, positioned on the "Blogs & Feeds" results view 266A in close proximity to the search results links 272. A respective icon 274 is located closest to a respective search result link 272 to which it pertains, and it should be evident to a viewer which ones of the icons 274 are associated with which ones of the search result links 272. As shown in FIG. 27, a preview window 280 opens when a cursor "mouses over" one of the icons 274 and is inserted and forms part of the "Blogs & Feeds" results view 266A, "Mousing over" is a term that is commonly understood in the art, and generally means the positioning of a cursor at a particular location without clicking a button on a mouse that is used for positioning the cursor at the selected location. The preview window 280 opens within the "Blogs & Feeds" results view 266A of FIG. 26. The following is an example of an RSS file:

```
<rss version="2.0">

<channel>
  <title>MotorTorque Latest News</title>
  <link>http://www.askaprice.com/torque.asp</link>

<description>
    MotorTorque - The very latest motoring news, reviews, features and car launches
    </description>
    <language>en-gb</language>
    <copyright>Askaprice.com</copyright>
    <pubDate>15/12/2006 17:18:08</pubDate>
    <ttl>60</ttl>

<item>
      <title>New Audi TT Roadster 2.0 TFSI</title>

<link>
        http://www.askaprice.com/torque-
        article.asp?article=New%20Audi%20TT%20Roadster%202.0%20TFSI&item=2467
        </link>

<description>
        <a href='http://www.askaprice.com/audi.asp'><a
        href='http://www.askaprice.com/audi.asp'><a
        href='http://www.askaprice.com/audi.asp'><a
        href='http://www.askaprice.com/audi.asp'>Audi</a></a></a></a>'s convertible has
        its work cut out following the Coupe and is facing tough competition in the soft-top
        market
        </description>
        <pubDate>15 December 2006</pubDate>
      </item>
```

-continued

```
  <item>
<title>Volkswagen herald green fleet</title>
  <link>
http://www.askaprice.com/torque-
article.asp?article=Volkswagen%20herald%20green%20fleet&item=2466
</link>
  <description>
German manufacturer releases details of a raft of greener models utilising hybrid
technology, biofuels and fuel cells
</description>
<pubDate>15 December 2006</pubDate>
</item>

<item>
<title>EU votes to slash diesel emissions</title>
  <link>
http://www.askaprice.com/torque-
article.asp?article=EU%20votes%20to%20slash%20diesel%20emission&item=2465
</link>
  <description>
European Union hails good move for environment but manufacturers say motorists
will be hit in pocket
</description>
<pubDate>15 December 2006</pubDate>
</item>

<item>
<title>Honda Accord Coupe Concept</title>
  <link>
http://www.askaprice.com/torque-
article.asp?article=Honda%20Accord%20Coupe%20Concept&item=2464
</link>
  <description>
New concept to launch in January suggests future styling hints for Accord series
</description>
<pubDate>15 December 2006</pubDate>
</item>

<item>
<title>Kia unveils new direction with Kue Concept</title>
  <link>
http://www.askaprice.com/torque-
article.asp?article=Kia%20unveils%20new%20direction%20with%20Kue%20Concept
&item=2460
</link>
  <description>
South Korean company to reveal "Compact Utility Vehicle", inviting speculation
over future Kia designs
<description>
<pubDate>14 December 2006</pubDate>
</item>

<item>
<title>Chevrolet consider European debut for Camaro</title>
  <link>
http://www.askaprice.com/torque-
article.asp?article=Chevrolet%20consider%20European%20debut%20for%20Camaro
&item=2459
</link>
  <description>
GM mulls all-new version of the award-winning Concept for European market after
fan petitions
</description>
<pubDate>14 December 2006</pubDate>
</item>

<item>
<title>Motorists who use mobiles could face prison</title>
```

-continued

```
<link>
http://www.askaprice.com/torque-
article.asp?article=Motorists%20who%20use%20mobiles%20could%20face%20prison
&item=2458
</link>
-
<description>
Under proposed changes to the law motorists who kill while using mobile phones
or tuning a car radio could face a life
sentence
</description>
<pubDate>14 December 2006</pubDate>
</item>
-
  <item>
<title>Saab celebrate anniversary in style</title>
-
  <link>
http://www.askaprice.com/torque-
article.asp?article=Saab%20celebrate%20anniversary%20in%20style&item=2457
</link>
-
  <description>
The Swedish manufacturer launches special editions of 9-3 and 9-5 series with raft
of unique features worth £3K at no
cost to buyers
</description>
<pubDate>13 December 2006</pubDate>
</item>
-
  <item>
<title>Nissan blueprint for greener future</title>
-
  <link>
http://www.askaprice.com/torque-
article.asp?article=Nissan%20blueprint%20for%20greener%20future&item=2456
</link>
-
  <description>
<a href='http://www.askaprice.com/nissan.asp'>Nissan</a> target carbon emissions
with plan for more fuel-efficient, hybrid and electric vehicles
</description>
<pubDate>13 December 2006</pubDate>
</item>
-
  <item>
<title>Ford unveil sneak preview of new C-MAX</title>
-
  <link>
http://www.askaprice.com/torque-
article.asp?article=Ford%20unveil%20sneak%20preview%20of%20new%20C-
MAX&item=2454
</link>
-
  <description>
<a href='http://www.askaprice.com/ford.asp'>Ford</a> previewed the new C-MAX
at the Bologna Motor Show, unveiling a smart and sporty new look for the compact
MPV
</description>
<pubDate>13 December 2006</pubDate>
</item>
</channel>
</rss>
```

The source code for the preview window 280 includes RSS feed information that is used for generating an image 282 within the preview window 280. Only the RSS feed information is used for generating the content of the preview window 280.

The preview window 280 includes a frame 284 around the image 282, a vertical scroll bar 286, a horizontal scroll bar 288, and a "Close" selector 290 within the frame 284. The user can move the cursor off the icon 274 that was used to open the preview window 280, and the preview window 280 does not close. The user can, for example, move the cursor to the search view links 270 or any other location inside or outside the preview window 280, and the preview window 280 does not close.

Figure 27:
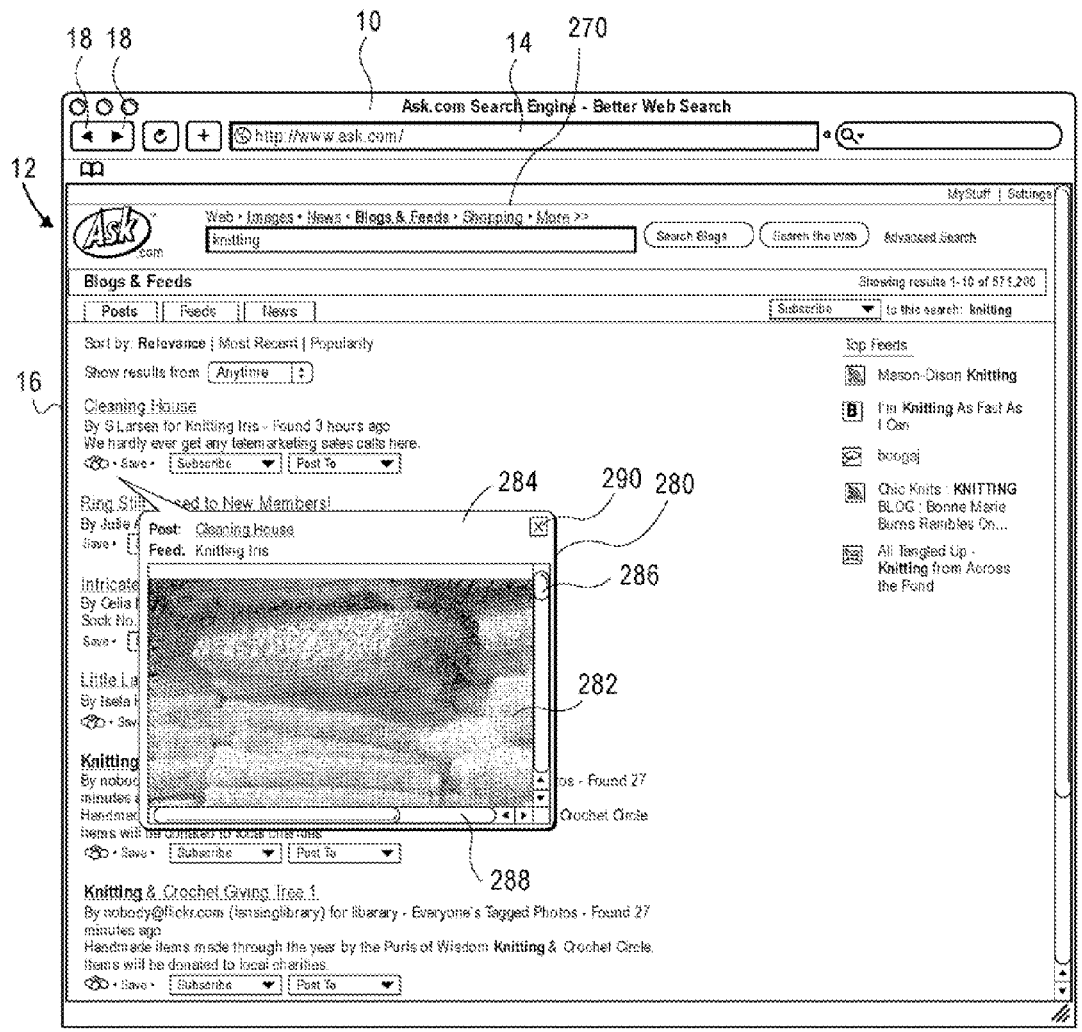
FIG. 27 is a view similar to FIG. 25, further showing a preview window that appears when mousing over an icon in the view of FIG. 25.
Figure 28:
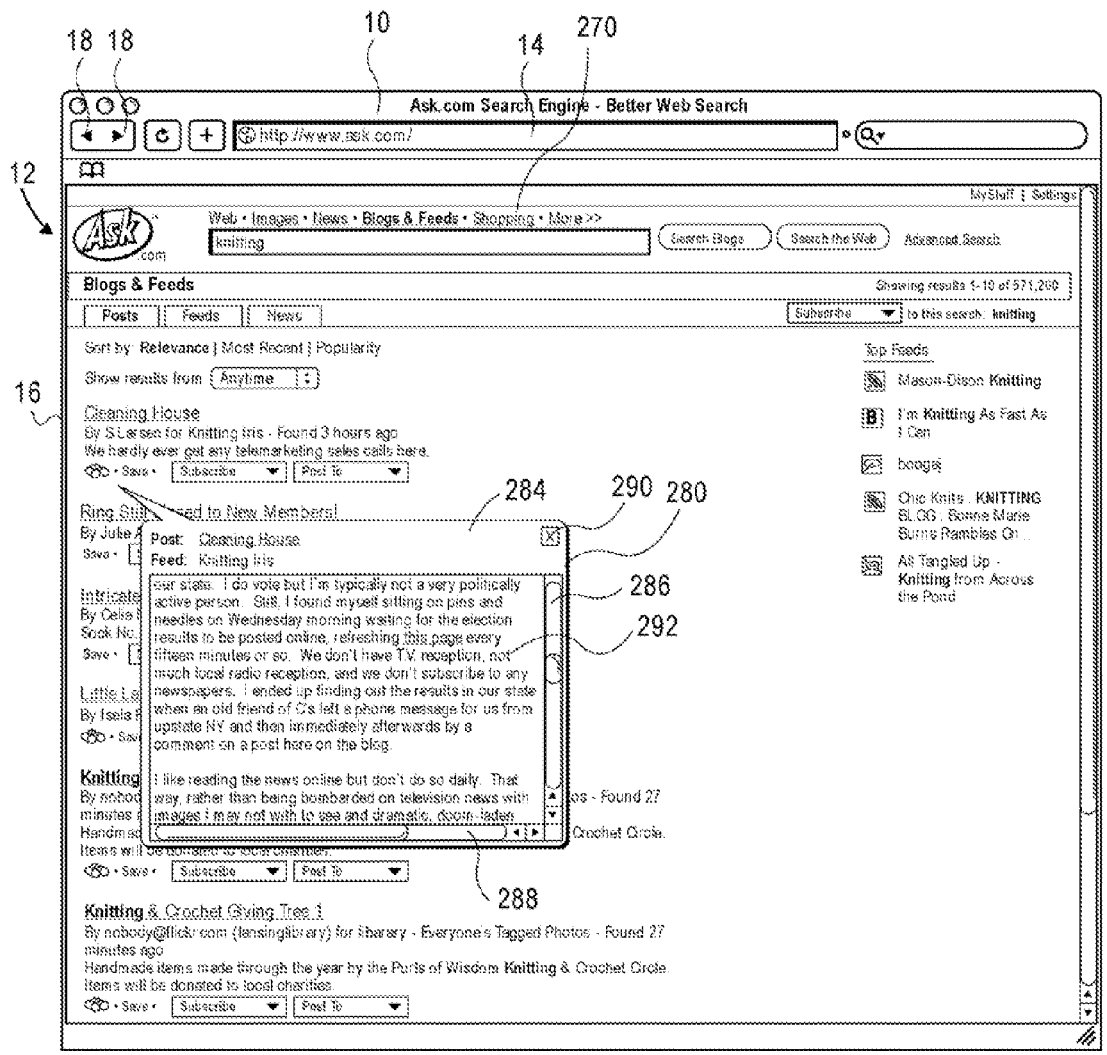
FIG. 28 is a view similar to FIG. 27, illustrating persistence of the preview window and RSS feed-generated information within the preview window.

FIG. 28 illustrates what happens when the user selects and drags the vertical scroll bar 286 down. The image 282 of FIG. 27 moves upwardly out of the preview window 280, and text 292 appears within the preview window 280. The text 292 is also generated using the RSS feed information. The horizontal scroll bar 288 can also be used to scroll horizontally within the preview window 280.

The user may at any stage in FIG. 27 or 28 select the "Close" selector 290. The preview window 280 closes upon selection of the "Close" selector 290, and the "Blogs & Feeds" results view 266A appears as in FIG. 26.

Figure 26:
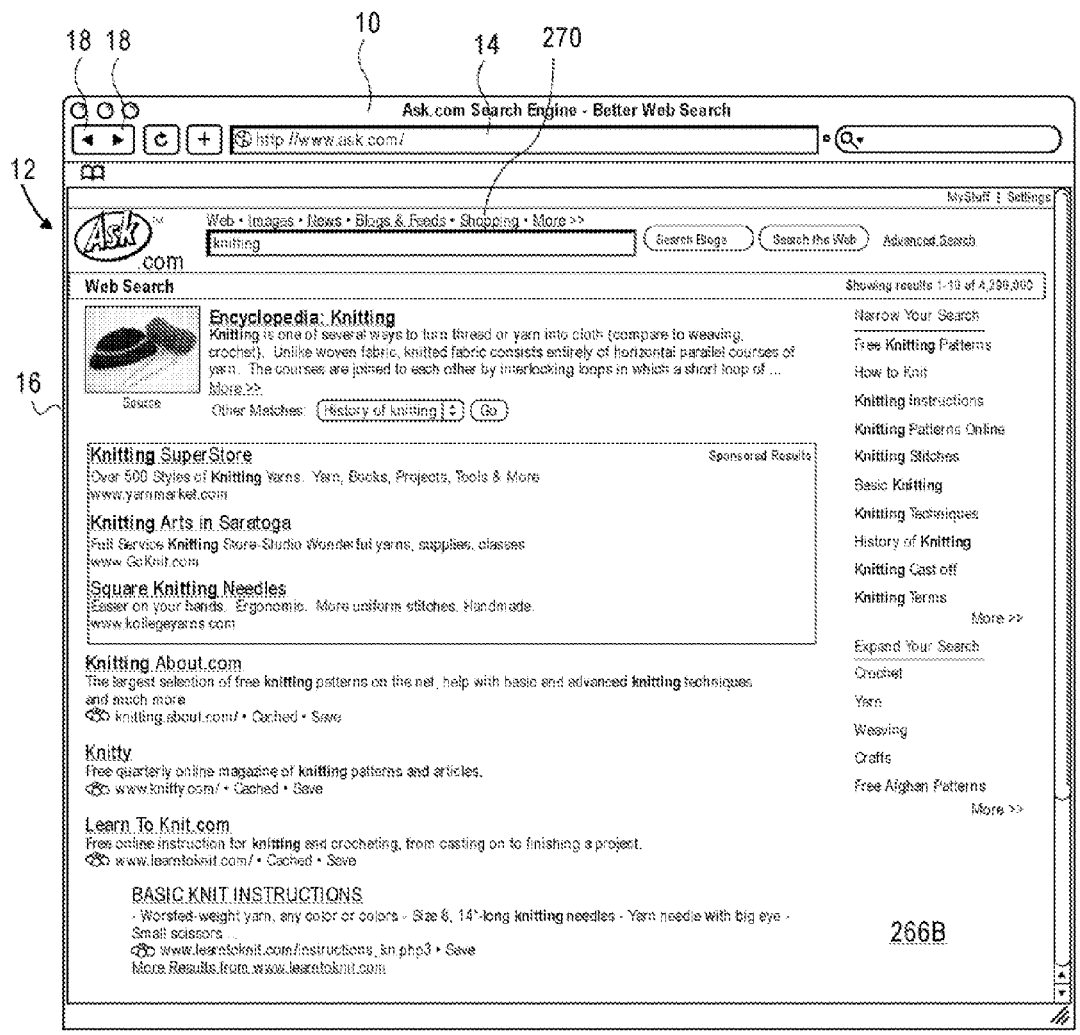
FIG. 26 is a results view when a search is conducted using the same search query as in FIG. 24, but using, for example, the view of FIG. 1, further illustrating how the view of FIG. 25 can be obtained from the view of FIG. 26.
Figure 29:
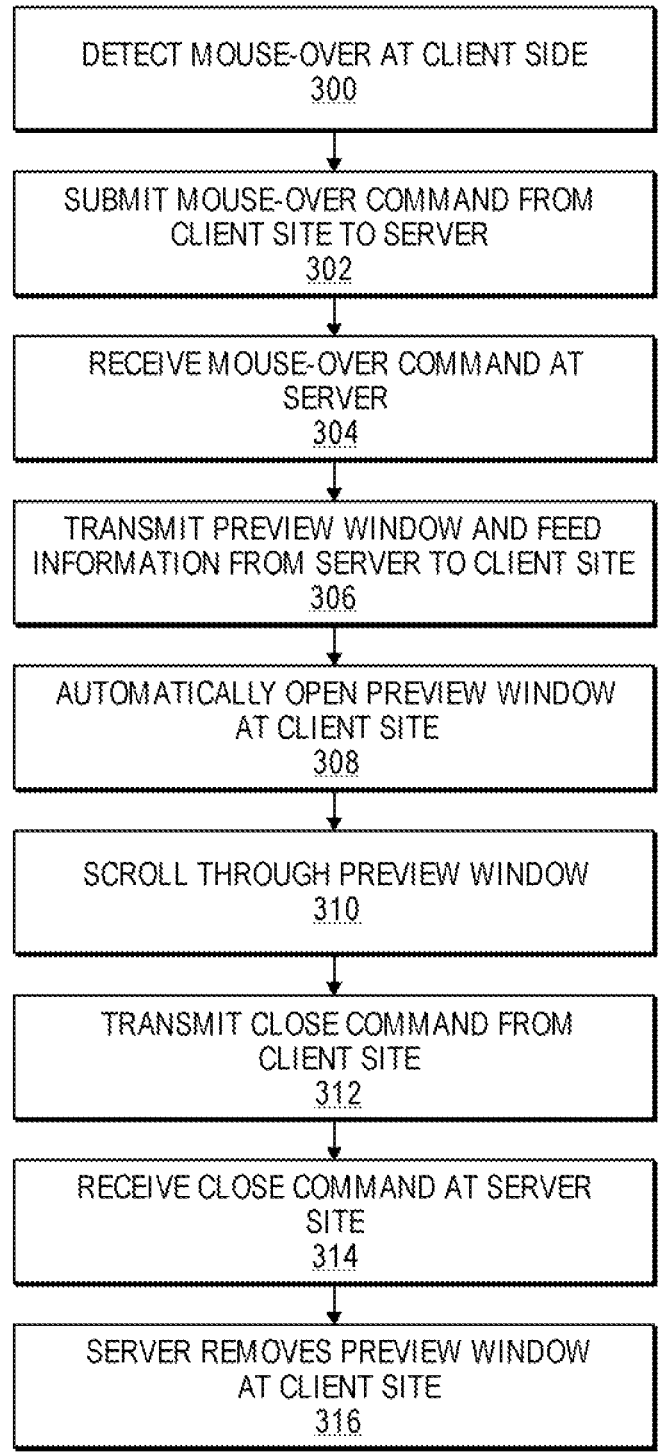
FIG. 29 is a flow chart illustrating client and server interaction to generate and close the preview window.

FIG. 29 illustrates server and client site interaction during FIGS. 26, 27, and 28. At Step 300, the browser 10 detects mouse-over at the client site and the particular location of the mouse-over. At Step 302, a mouse-over command is submitted from the client site to the server. At Step 304, the mouse-over command is received at the server. At Step 306, the server transmits the preview window and the feed information from the server to the client site. At Step 308, the preview window is automatically opened at the client site. At Step 310, the user can optionally scroll through the preview window. At Step 312, the user transmits a "Close" command from the client site by selecting the "Close" selector 290. At Step 314, the "Close" command is received at the server. At Step 316, the server removes the preview window at the client site.

Figure 30:
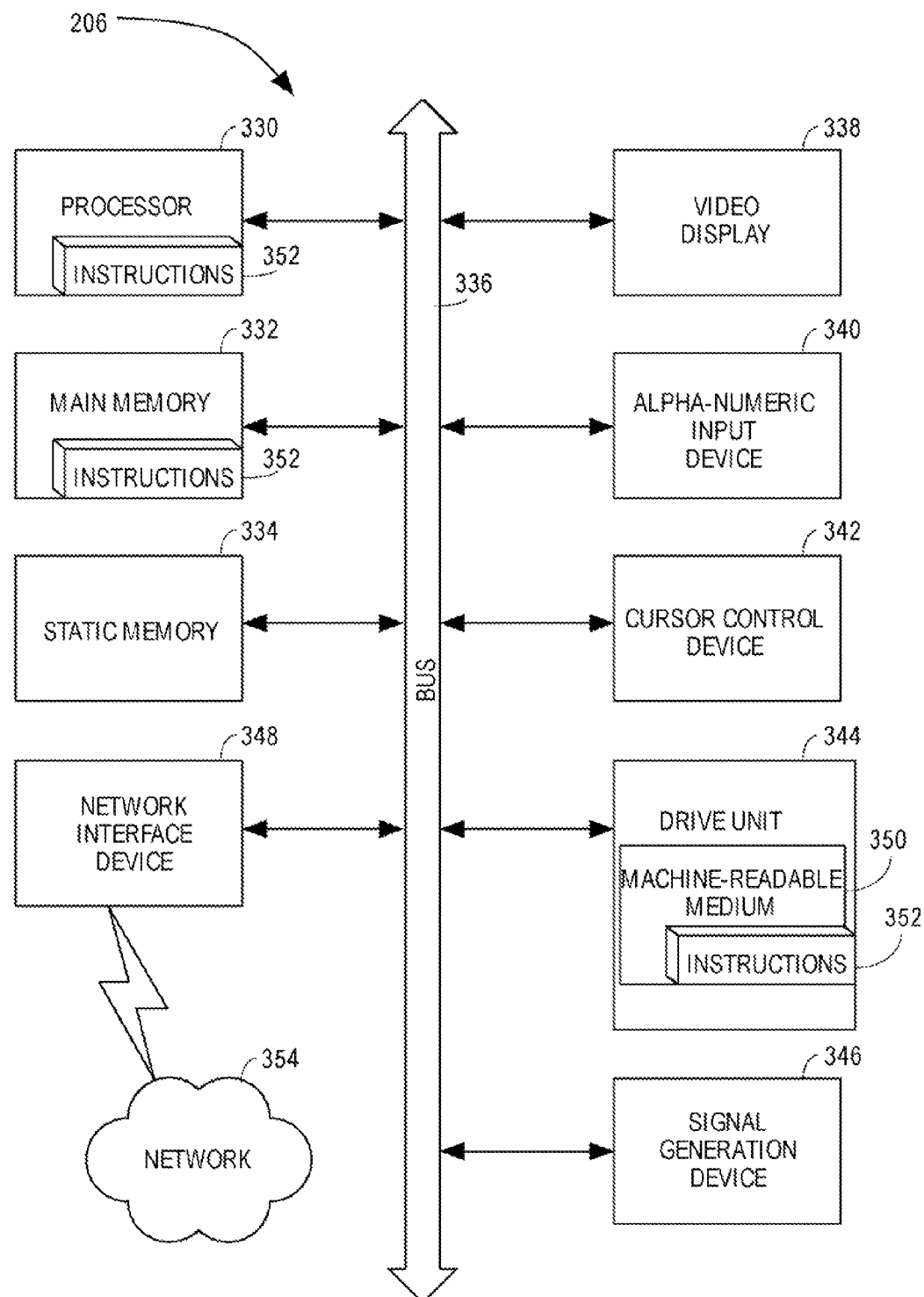
FIG. 30 is a block diagram of a computer system that can find use in the network environment of FIG. 15.

FIG. 30 shows a diagrammatic representation of a machine in the exemplary form of the client computer 206 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The server or serves 204 in FIG. 15 may also include one or more machines as shown in FIG. 30.

The exemplary client computer 206 includes a processor 330 (e.g., a central processing unit (CPU), a graphics processing unit (GPU), or both), a main memory 332 (e.g., read-only memory (ROM), flash memory, dynamic random access memory (DRAM) such as synchronous DRAM (SDRAM) or Rambus DRAM (RDRAM), etc.), and a static memory 334 (e.g., flash memory, static random access memory (SRAM), etc.), which communicate with each other via a bus 336.

The client computer 206 may further include a video display 338 (e.g., a liquid crystal display (LCD) or a cathode ray tube (CRT)). The client computer 206 also includes an alphanumeric input device 340 (e.g., a keyboard), a cursor control device 342 (e.g., a mouse), a disk drive unit 344, a signal generation device 346 (e.g., a speaker), and a network interface device 348.

The disk drive unit 344 includes a machine-readable medium 350 on which is stored one or more sets of instructions 352 (e.g., software) embodying any one or more of the methodologies or functions described herein. The software may also reside, completely or at least partially, within the main memory 332 and/or within the processor 330 during execution thereof by the client computer 206, the main memory 332 and the processor 330 also constituting machine-readable media. The software may further be transmitted or received over a network 354 via the network interface device 348.

While the machine-readable medium 352 is shown in an exemplary embodiment to be a single medium, the term "machine-read able medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Figure 31:
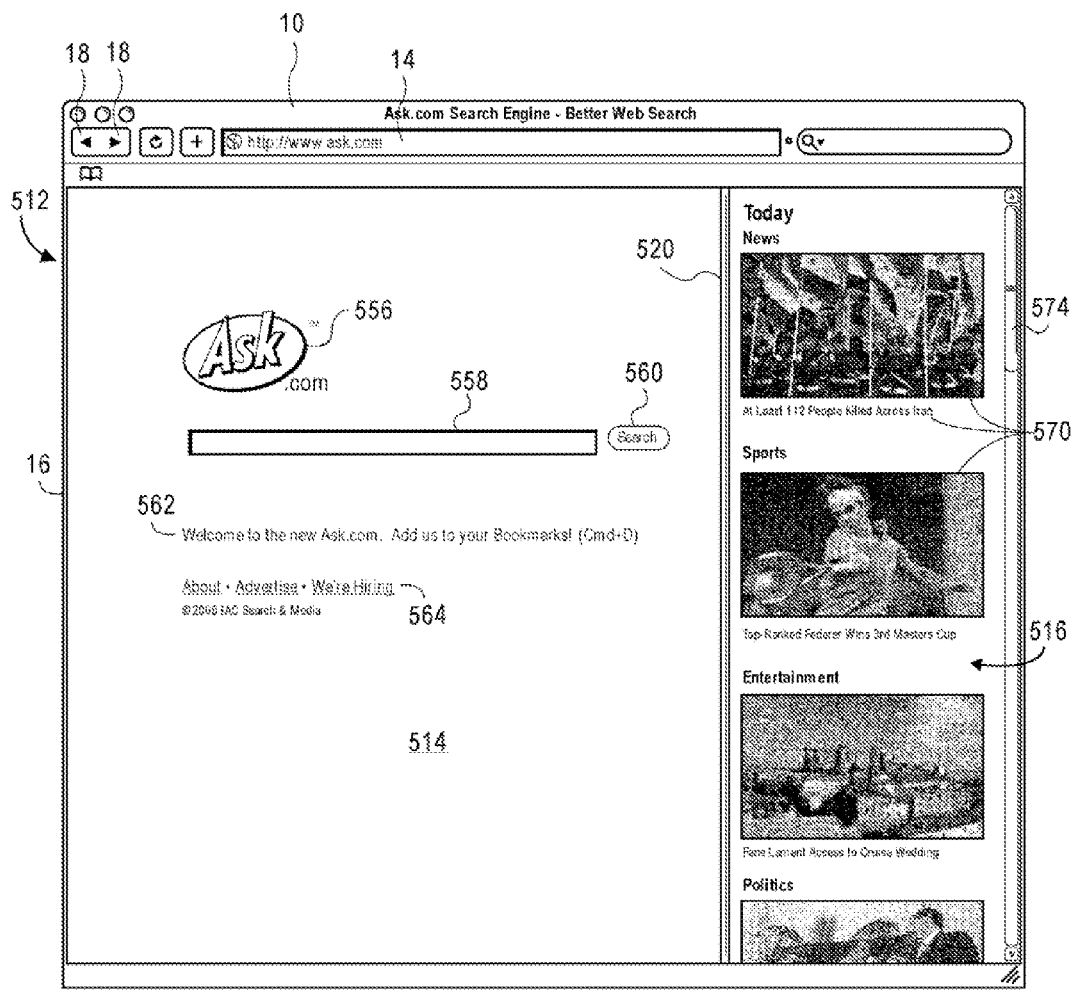
FIG. 31 is a view of the browser of FIG. 1 having a user interface according to a second embodiment of the invention.

FIG. 31 illustrates the same browser 10 of FIG. 1, but with a user interface 512 according to another embodiment of the invention. The view of the user interface 512 shown in FIG. 31 has a larger search area 514 on the left and a smaller content area 516 on the right. The search area 514 and the content area 516 together make up the entire surface area of the user interface 512. A vertical separator bar 520 forms a border 520 between the search area 512 and the content area 516.

The user interface 512 further includes a logo 556, a search box 558, a search button 560, static text 562, and informational links 564, all located within the search area 514. The logo 556 in the present example is a trademark of the company, Ask.com™, and the information links 564 are links to informational sites of the same company. The mouse can be placed in the search box 558 and, after clicking a button on the mouse, the keyboard can be used to enter text into the search box 558. The mouse can then be used to select the search button 560. A search is then carried out on a search database that holds information regarding websites across the Internet and other Internet-based databases. The search results from the different databases are combined. The search results will depend on whether a search can be carried out in a particular database.

The content area 516 includes downloaded content 570. The content 570 in the view of FIG. 31 includes a "Today" page, and the "Today" page includes text and images. The content 570 is as wide as the content area 516 in a horizontal direction, but is larger than the content area 516 in a vertical direction. The browser 10 detects that the content 570 is larger than the content area 516, and renders a vertical scroll bar 574.

Figure 32:
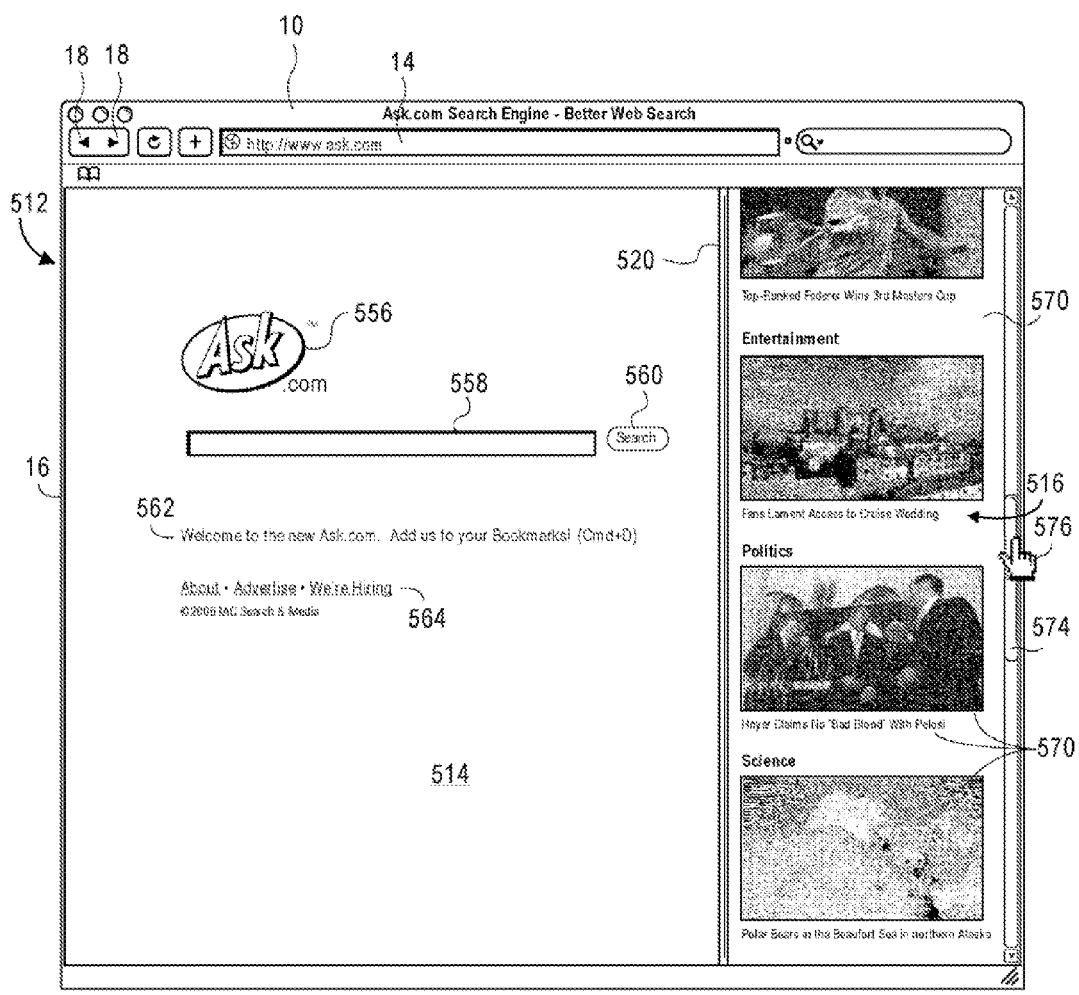
FIG. 32 is a view similar to FIG. 31, further illustrating vertical scrolling in a content area of the user interface while components in a search area of the user interface remain stationary.

As shown in FIG. 32, a user can position a cursor 576 on the vertical scroll bar 574, and drag the vertical scroll bar 574. The content 570 moves vertically upward when the vertical scroll bar 574 is moved vertically down. An upper portion of the content 570 moves off a top edge of the content area 516, and a portion of the content 570 appears above a lower edge of the content area 516. The user is thus allows to view areas of the content 570 that cannot fit within the content area 516.

What should also be noted is that the content area 516 and the search area 514 do not move relative to one another while moving the content 570 within the content area 516. The search area 514 and the content area 516 are also stationary relative to the browser 10 when the content 570 moves. The logo 556, search box 558, search button 560, static text 562, and informational links 564 also do not move relative to the search area 514 while moving the content 570. The user is thus permitted to move the content 570 without moving any other components of the user interface 512.

Figure 33:
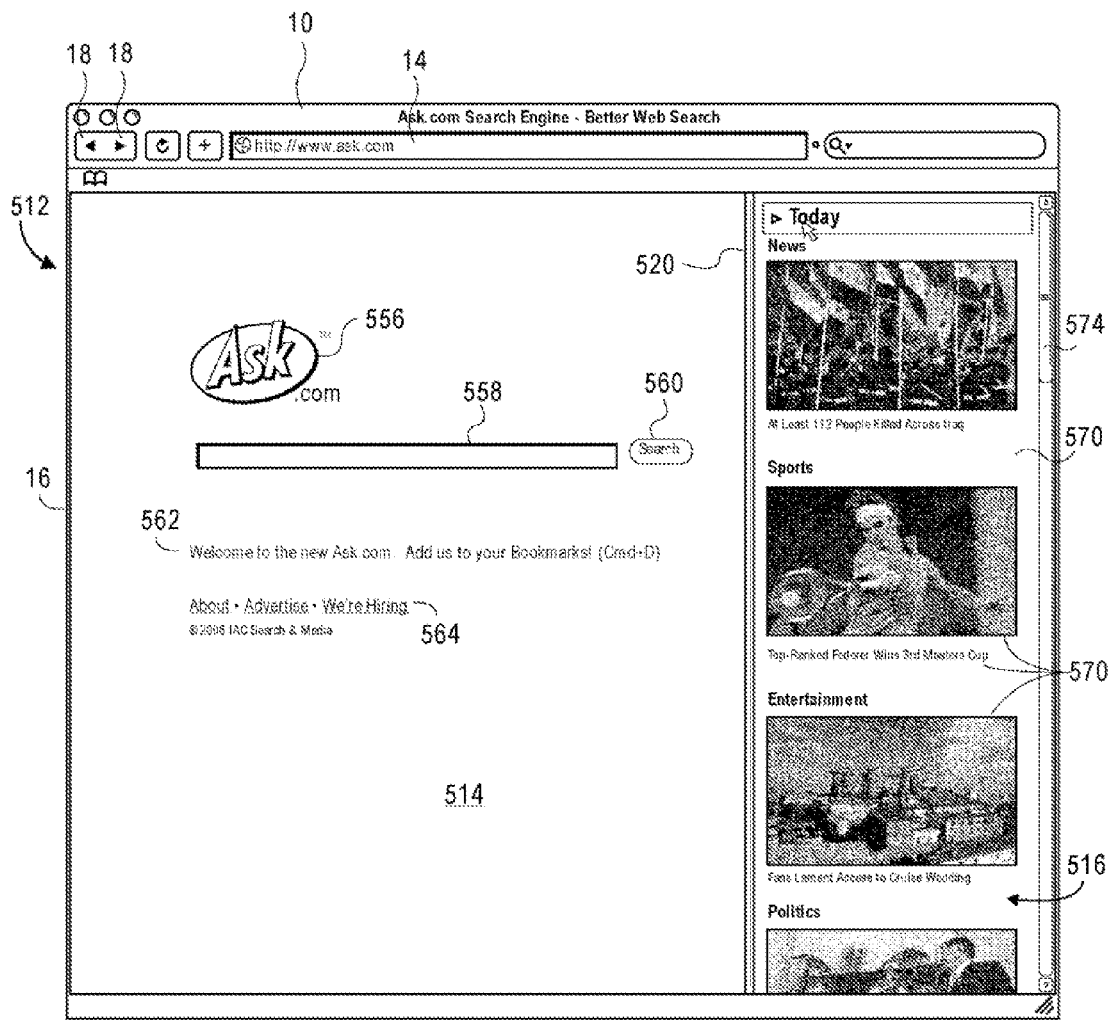
FIG. 33 is a view similar to FIG. 32, after scrolling in an opposite direction as in FIG. 32.

As shown in FIG. 33, the vertical scroll bar 574 can again be moved vertically upward to move the content 570 vertically down. When comparing FIG. 33 and FIG. 31, it can be seen that the view in FIG. 33 returns the user interface 512 to the view shown in FIG. 31.

Figure 34:
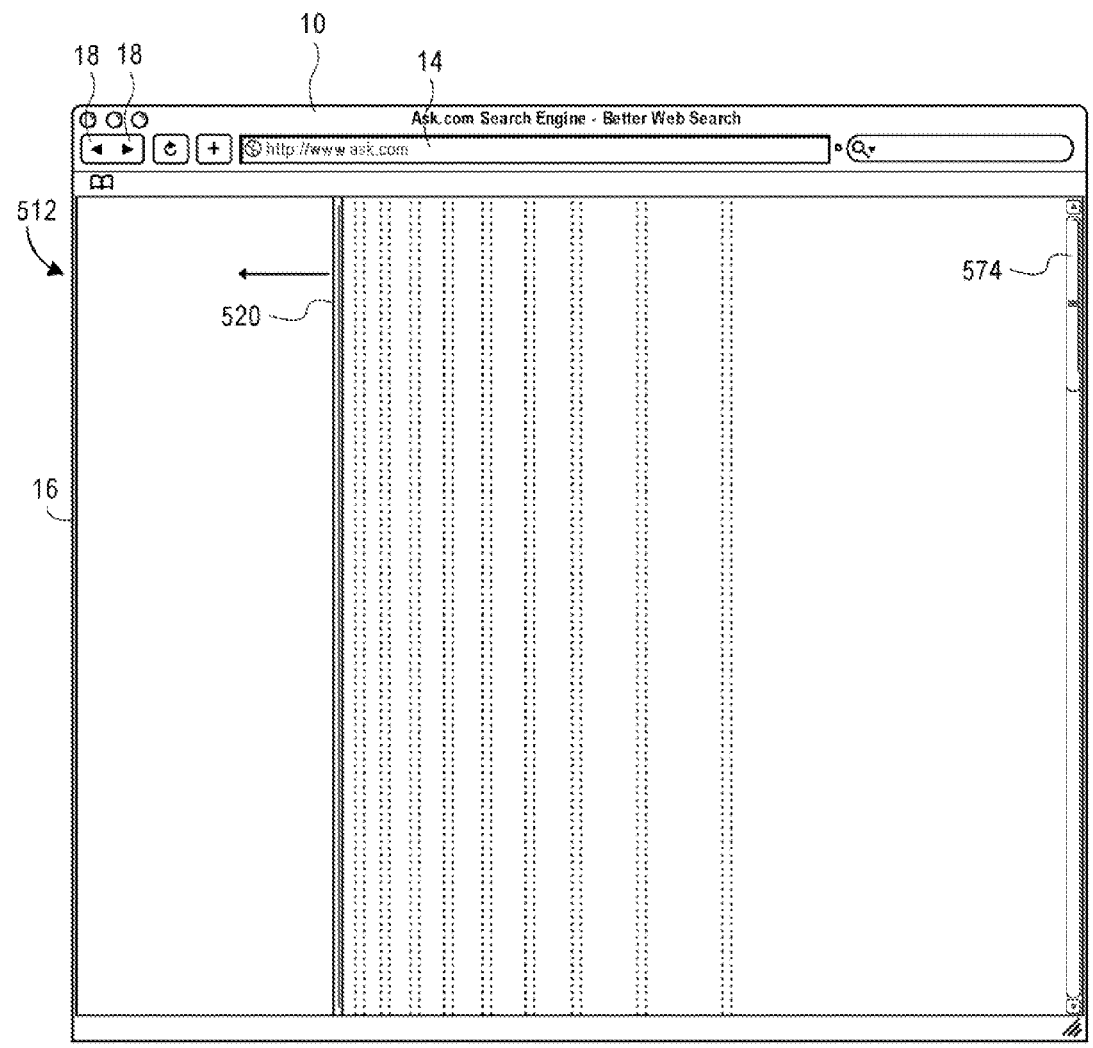
FIG. 34 is a view similar to FIG. 33, illustrating a slide-and-fade action to transform the sizes and content of the content area and the search area of FIG. 33.

FIG. 34 illustrates what occurs over a period of less than three seconds after the vertical separator bar forming the border 520 in the view of FIG. 33 forming the border between the search area 514 and the content area 516 is selected. As shown in the view of FIG. 34, the logo 556, search box 558, search button 560, static text 562, informational links 564, and the content 570 of FIG. 33 have faded out. The vertical separator bar forming the border 520 in the view of FIG. 33 progressively moves or "slides" from right to left while remaining vertical.

Figure 35:
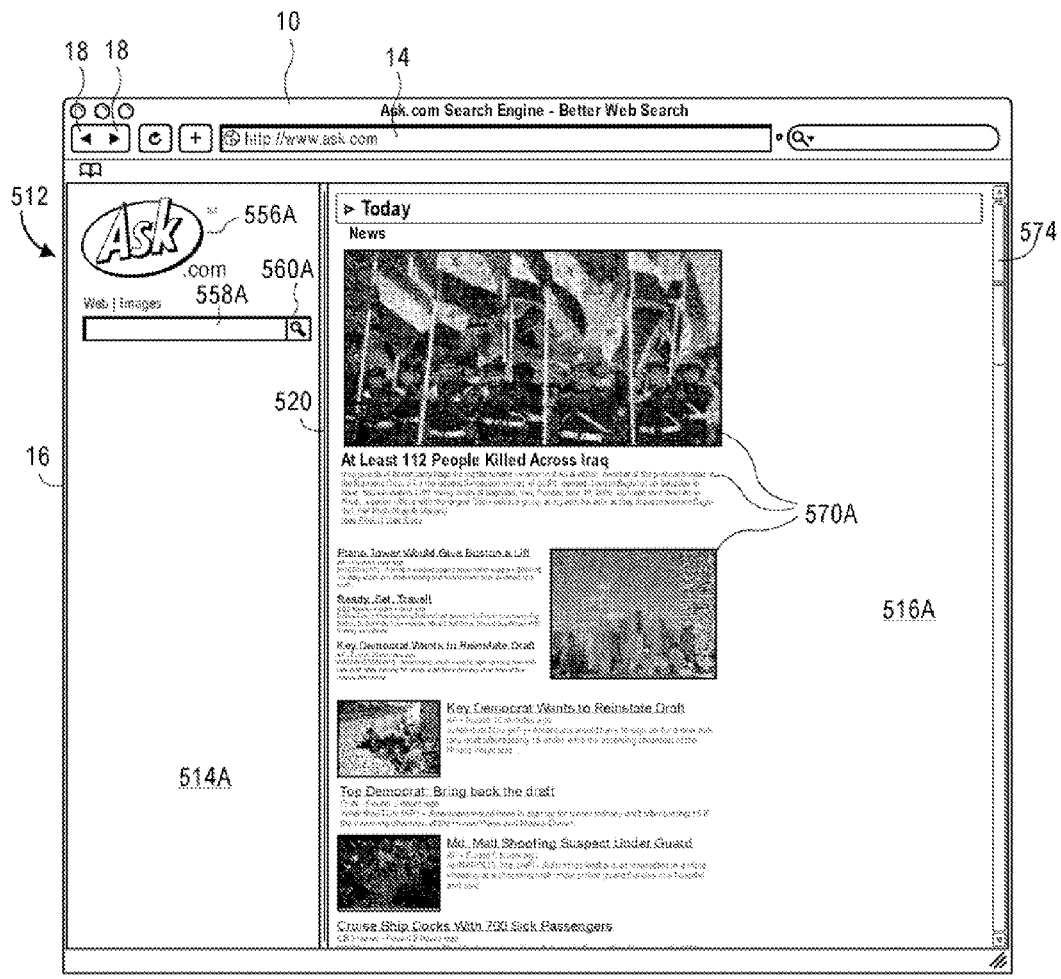
FIG. 35 is a view similar to FIG. 34, after content has faded into the content area and into the search area.

The view in FIG. 35 appears after the view of FIG. 34 and within three seconds of the view of FIG. 33. The view in FIG. 35 has a search area 514A that is narrower and therefore has a smaller surface area than the search area 514 of FIG. 33. The view in FIG. 35 also has a content area 516A that is wider and therefore has a larger surface area than the content area 516 of FIG. 33.

New content 570A fades into the content area 516A. The content 570A in the view of FIG. 35 is more detailed than the content 570 in the view of FIG. 33. For example, it can be seen that the image at the top in the content 570 in the view of FIG. 33 is included at the top of the content 570A in the view of FIG. 35, but is now in higher resolution and is correspondingly larger. It can also be seen that the content 570 includes additional text and images that are not present in the content 570 of the view of FIG. 33.

A new logo 556A and search box 558A have faded info the search area 514A, together with the content 570A in the content area 516A. The search box 558A and the search button 560A in the view of FIG. 35 are smaller than the search box 558 and the search button 560, respectively, in the view of FIG. 33.

The viewer can again in the user interface 512 in the view of FIG. 35 select the vertical separator bar forming the border 520. Upon selection of the vertical separator bar forming the border 520, the content 570A, logo 556A, search box 558A, and search button 560A fade out and the border 520 slides to the right. In less than three seconds, the user interface 512 is transformed from the view shown in FIG. 35 back to the view shown in FIG. 33. The content 570, logo 556, search box 558, search button 560, static text 562, and informational links 564 all fade back into the content area 516 and the search area 514.

The ability for the user to alternate between the view of FIG. 33 and the view of FIG. 35 allows to the user to either use the user interface 512 in the view of FIG. 33, which is primarily a search interface with minimal content, or to use the user interface 512 in the view of FIG. 35, which holds a large amount of content, without the larger search box 558 of FIG. 33, the static text 562, or the informational links 564.

Figure 36:
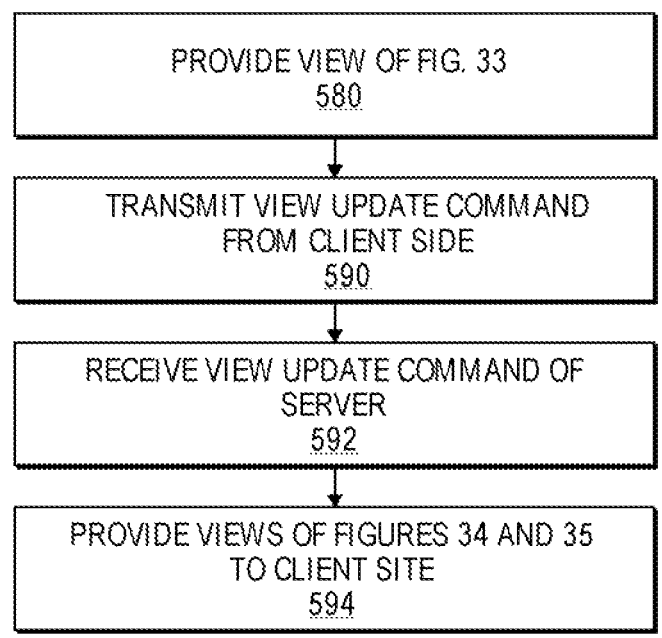
FIG. 36 is a flow chart illustrating slide-and-fade action and instructions between the client site and the server.

FIG. 36 illustrates server and client interaction before rendering the views of FIGS. 33, 34, and 35. At Step 580, the server provides the view of FIG. 33 to the client site. At Step 590, the client site transmits a view update command to the server. The view update command is transmitted when the vertical separator bar forming the border 520 is selected. At Step 592, the server receives the view update command. At Step 594, the server responds to the view update command by providing the views of FIGS. 34 and 35 sequentially to the client site.

Figure 37:
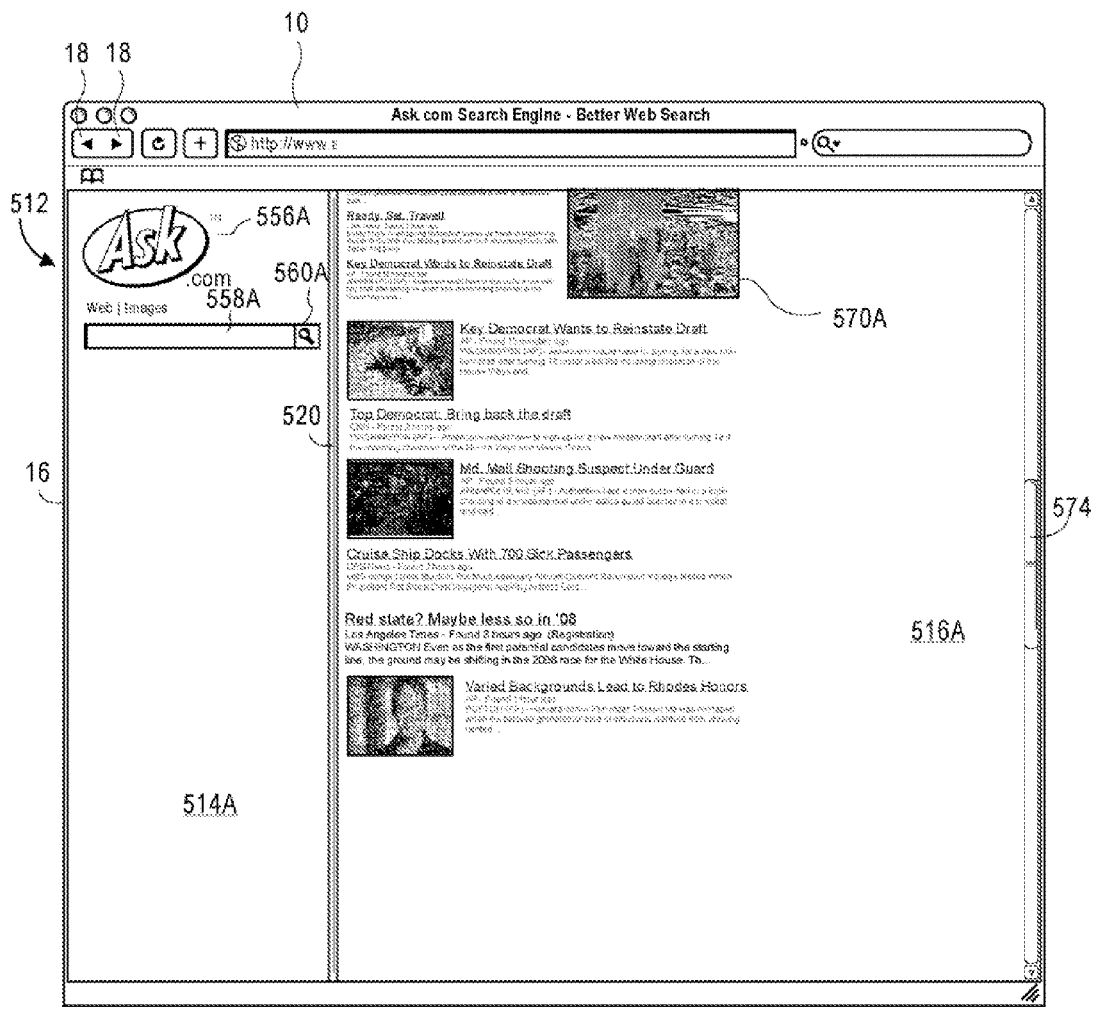
FIG. 37 is a view similar to FIG. 35, illustrating vertical scrolling of content within the content area of FIG. 35.

As shown in FIG. 37, the vertical scroll bar 574 can be selected by a user and be dragged vertically down, which moves the content 570A vertically up. The content 570A is larger in the vertical direction than the content area 516A, and movement of the vertical scroll bar 574 allows for positioning of different areas of the content 570A within the content area 516. What should be noted is that the content 570A moves relative to the stationary content area 516A, stationary search area 514A, stationary logo 556A, stationary search box 558A, stationary search button 560A, and stationary browser 10 apart from the vertical scroll bar 574 of the browser 10.

Figure 38:
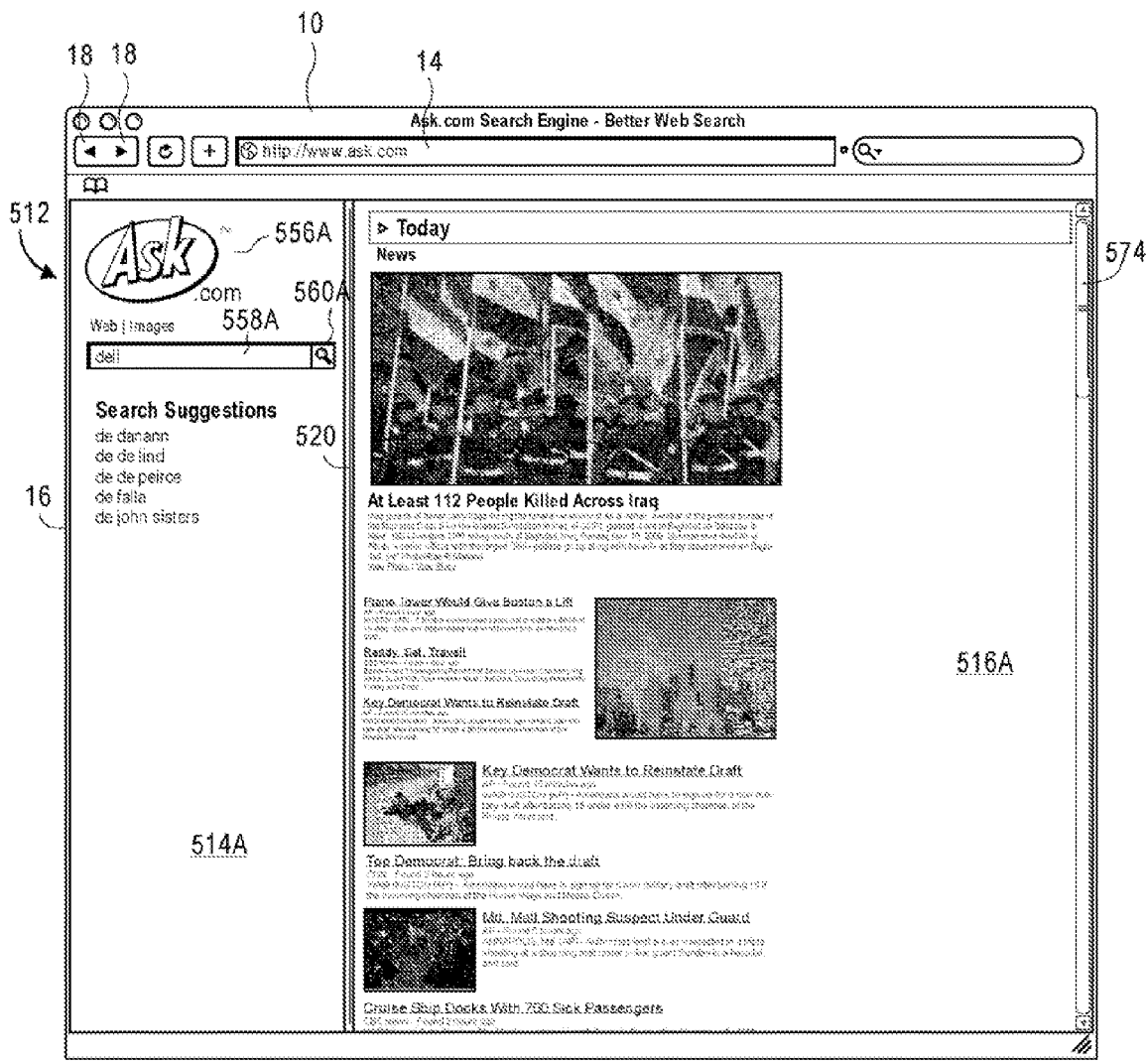
FIG. 38 is a view similar to FIG. 37, illustrating scrolling in an opposite direction as in FIG. 37, and further illustrating entry of a search query in a search box.

As shown in FIG. 38, the vertical scroll bar 574 can be moved vertically up to move the content 570A vertically down into the same position within the content area 516A as shown in the view of FIG. 35.

As further shown in FIG. 38, a user at the client site enters a search query or search request into the search box 558A. Referring to FIG. 15, a search request command and the query are transmitted from the client computer 206 over the Internet 202B using the user interface 12 to the search engine 220. The search engine 220 then parses the search databases 216 and structured databases 218 with the query. Should a response be received from any one of the databases 216 or 218, the search engine 220 returns the search results to the user interface 12.

Figure 39:
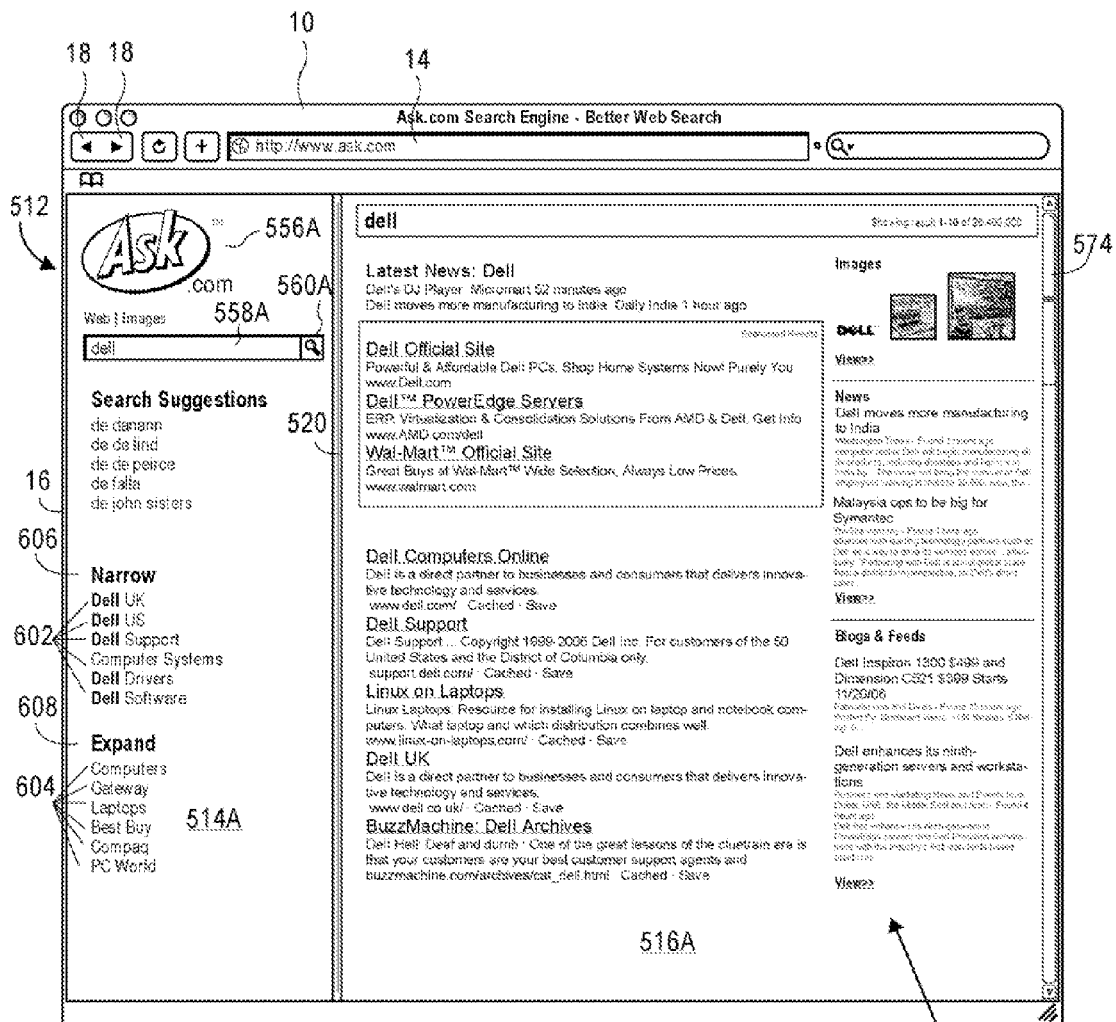
FIG. 39 is a view of the user interface after a search is carried out and search results are displayed in the content area, together with narrowing search results and expanding search results in a search area.

FIG. 39 illustrates new content 570B that appears within the content area 516A. The content 570B includes the search results that are pushed by the search engine 220 in FIG. 15 after receiving responses from a subset of the databases 216 and 218.

It should be noted at this stage that the exact same view of FIG. 39 can be obtained by entering the same search query into the search boxes 558 of FIGS. 30, 31, and 32, or the search boxes 558A of FIG. 35, 37, or 38. When the user interface 512 is used in the view of FIG. 31, 32, or 33, the content 570 fades out, the vertical separator bar forming the border 520 slides across as discussed with reference to FIG. 34, and the content 570B fades into the content area 516A.

The content 570B is larger than the content area 516A. The vertical scroll bar 574 can be moved to bring different areas of the content 570B into and move other areas of the content 570B out of the content area 516A.

The search results of the content 570B depend on which ones of the databases 216 and 218 in FIG. 15 are parseable. In the present example, the portion of the content 570B includes search results relating to general Internet documents from a "Web" database among the search databases 216, images from an "Image" database among the search databases, news from a "News" database among the search databases 216, and blogs and feeds from a "Blogs & Feeds" database among the search databases 216. The general Internet documents are located within a left-hand column within the content area 516A, and the images, news, and blogs and feeds search results are located within a right-hand column within the content area 516A.

The view of FIG. 39 further includes the logo 556A, the search box 558A, and the search button 560A within the search area 514A, which are located in exactly the same locations as the logo 556A, search box 558A, and search button 560A in the view of FIG. 38. There is thus a level of persistence within the search area 514A, although the content 570A in the content area 516A is replaced with the content 570B.

Referring again to FIG. 15, the reference sources 224 are connected to the search engine 220. The reference sources 224 include reference sources for natural language processing, narrowing of search queries, expanding on search queries, search suggestions, spelling correction, etc. Referring again to FIG. 39, it can be seen that a plurality of narrowing search suggestions 602 and a plurality of expanding search suggestions 604 are included under a respective heading 606 and 608 as text in the page forming part of the search area 514A. When comparing the view of FIG. 39 with the view of FIG. 35, it can be seen that the narrowing and expanding search suggestions 602 and 604 and the headings 606 and 608 only appear after entering the search query in the search box 558A. The search engine 220 in FIG. 15 extracts the narrowing search suggestions 602 and the expanding search suggestions 604 from two of the reference sources 224.

Figure 40A:
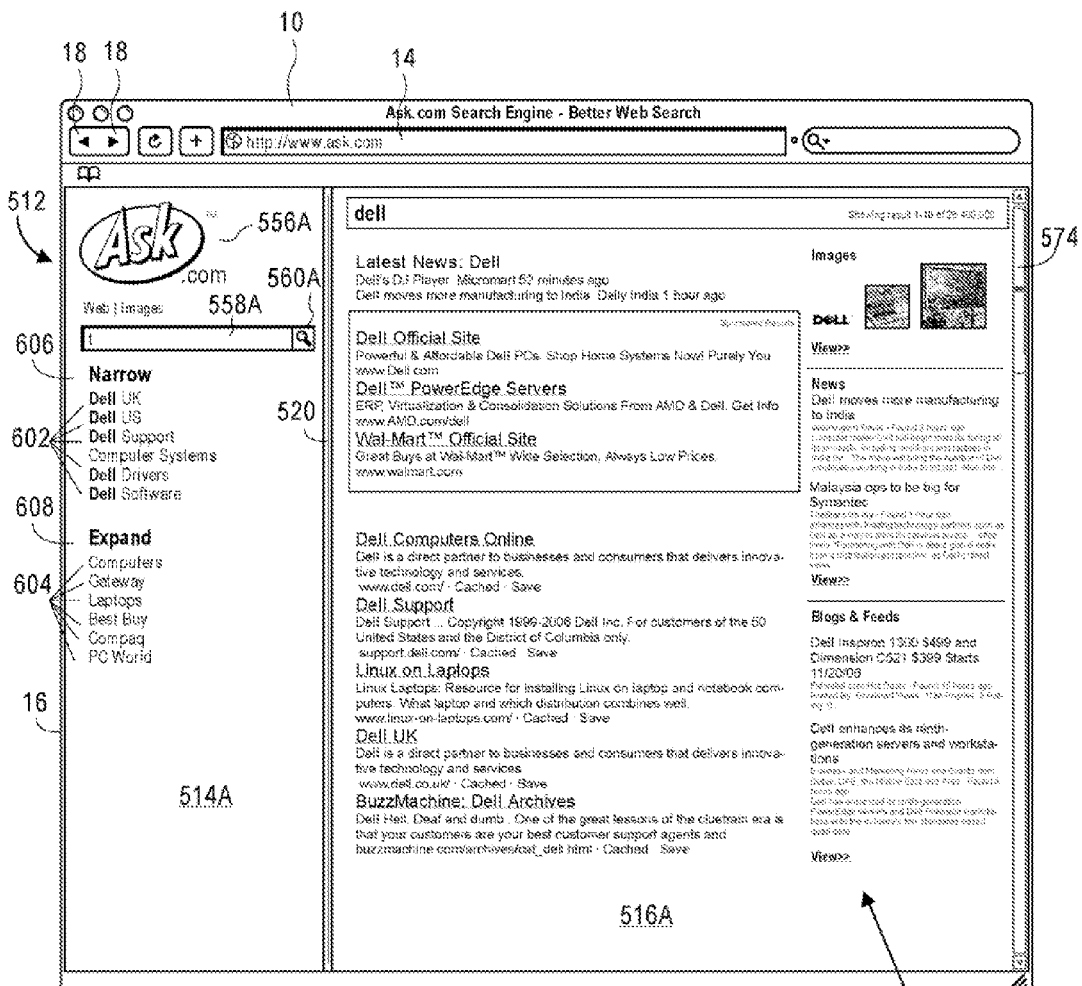
FIGS. 40A to 40D are views of the user interface while a new search query is entered in the search box, and specifically illustrates search suggestions that are continually updated within the search area.

Referring to FIG. 40A, the user now enters a first character for a new search in the search box 558A. The narrowing search suggestions 602 and the expanding search suggestions 604 relating to the search conducted in the view of FIG. 38 remain in the view of FIG. 40A. The heading 606 is positioned directly below the search box 558A.

Figure 40B:
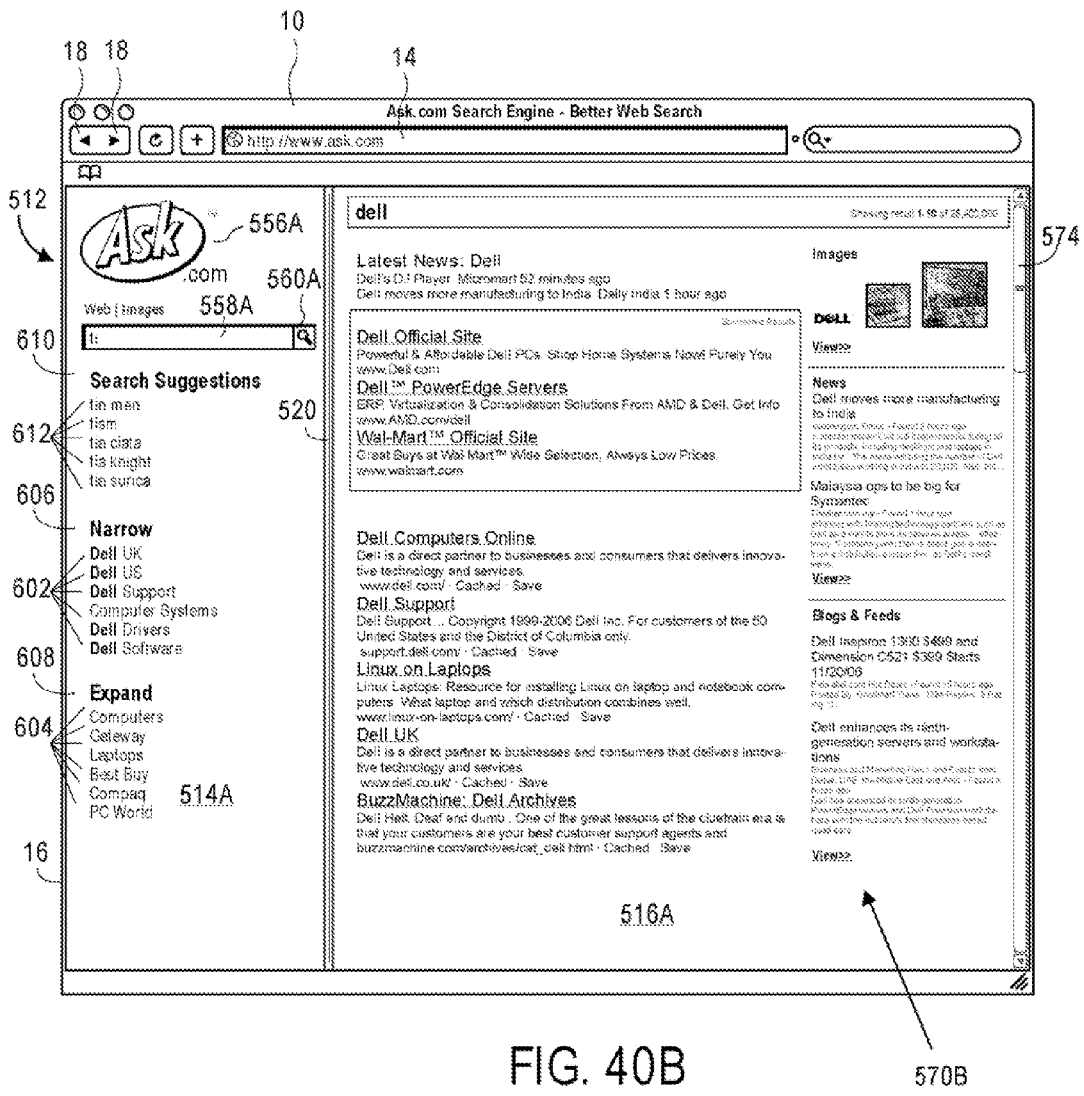

As shown in FIG. 40B, the user now enters a second character of a search request in the search box 558A. The search request is thus not fully entered in the search box 558A. The two characters thus represent a first partial search query. Referring to FIG. 15, the partial search query is transmitted over the Internet 202B to the search engine 220. The search engine 220 then enters the partial search request into one of the reference sources 224 holding search suggestions. The search engine 220 then extracts a plurality of search suggestions corresponding to the partial search query from the respective reference source 224 holding search suggestions. The search engine 220 then transmits the search suggestions to the user interface 12, and the user interface 12 is updated over the Internet 202B on the client computer 206.

Referring again to FIG. 40B, the heading 606 is positioned lower with respect to the search box 558A than in FIG. 40A. A heading 610 is inserted directly below the search box 558A. Search suggestions 612 are inserted directly below the heading 610 and above the heading 606. The search suggestions 612 are the search suggestions extracted from the respective reference source 224 in FIG. 15. The search suggestions 612 are text positioned in the page forming part of the search area 514 of the user interface 512.

Each one of the search suggestions 612 is selectable by positioning a cursor on the respective search suggestion 612 and clicking a button on a mouse. Upon selection of the respective search suggestion 612, a search command is transmitted from the client computer 206 in FIG. 15 over the Internet 202B to the search engine 220. The search engine 220 then conducts a search in the search databases 216 and the structured databases 218 using the selected search suggestion. The search engine 220 then transmits the search results over the Internet 202B to the client computer 206, and the search results are displayed in the content area 516. In the present example, a user can, for example, select one of the search suggestions "tia knight," and search suggestions corresponding to "tia knight" will be displayed within the content area 516A. Alternatively, the user may select the search button 560A or press "Enter" on a keyboard, and receive search results corresponding to the partial query "ti" entered in the search box 558A.

Figure 40C:
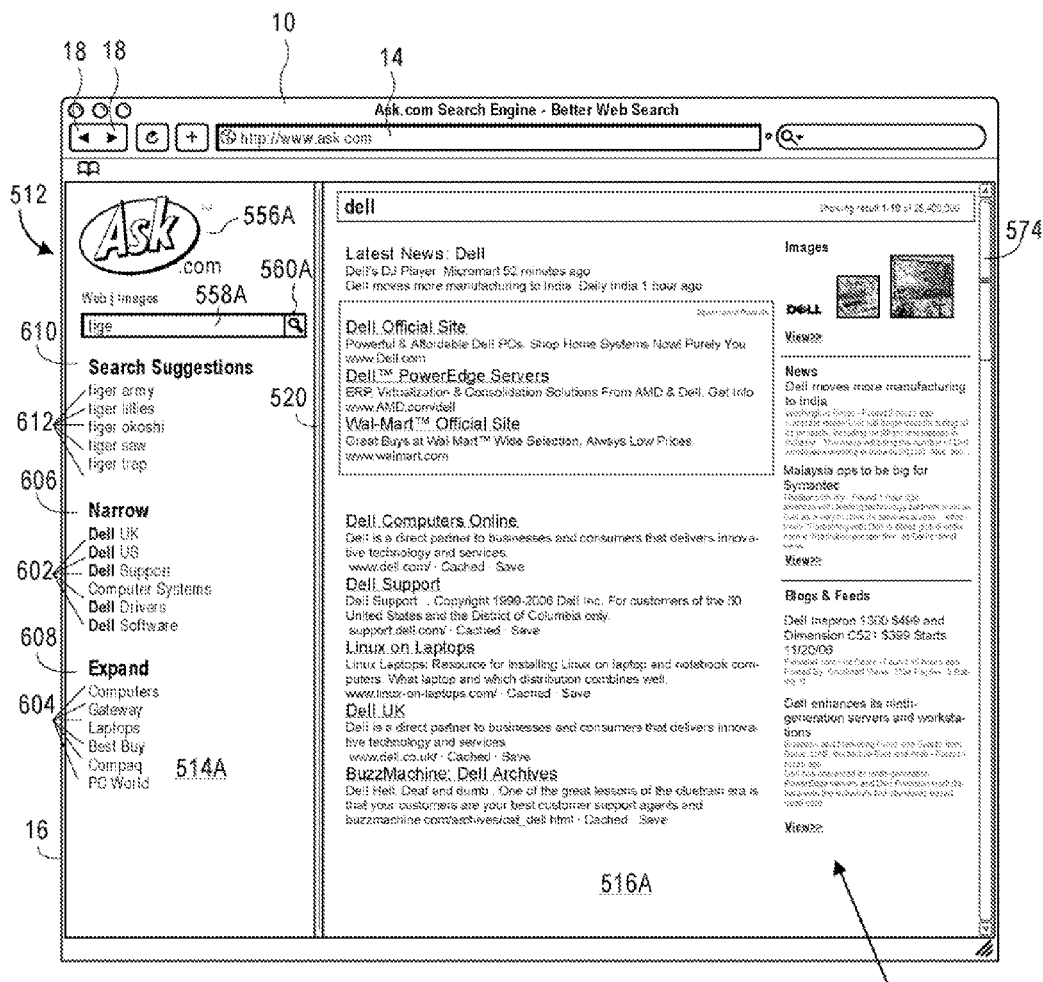
Figure 40D:
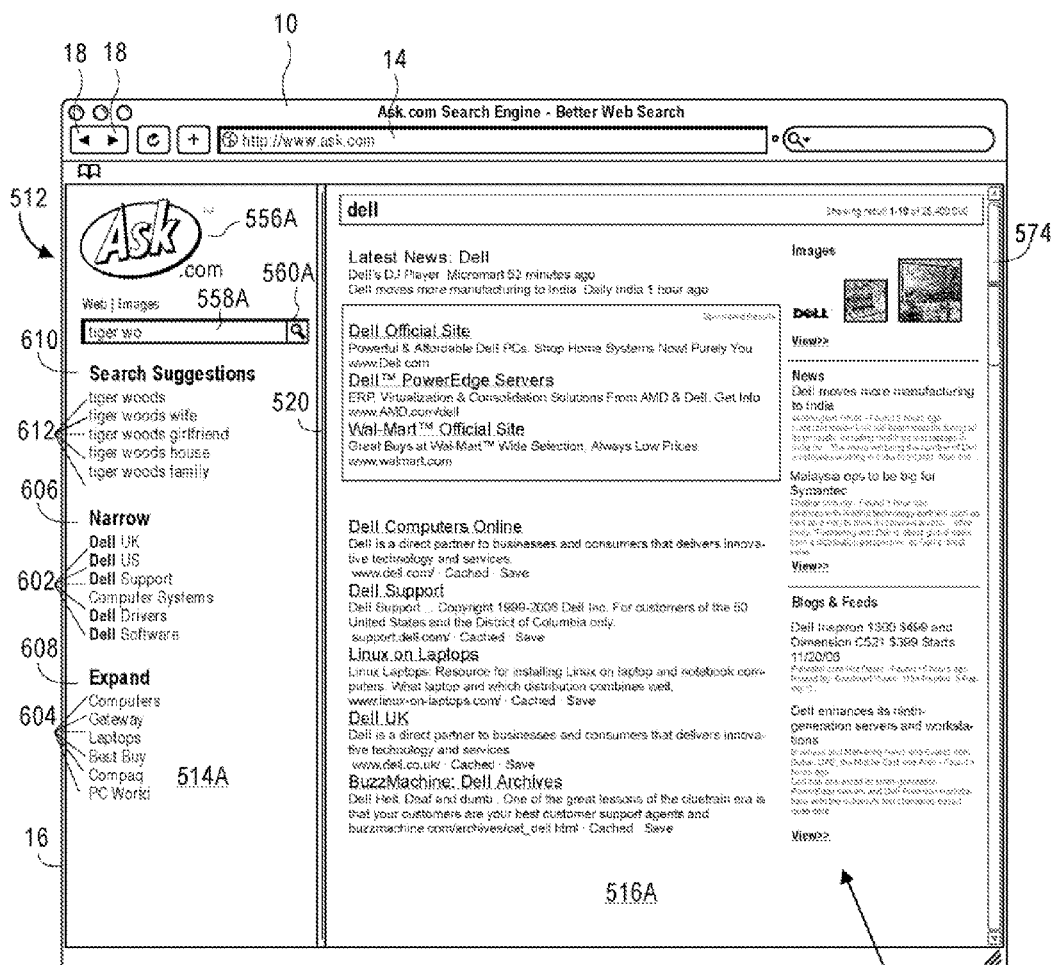

FIGS. 40C and 40D illustrate further progression of the partial search query in the search box 558A. In FIG. 40C, the partial search query includes four characters, and in FIG. 40D, the partial search query includes eight characters. Upon each entry of a character, the search suggestions 612 are updated according to the process described with reference to FIG. 40B.

Figure 41:
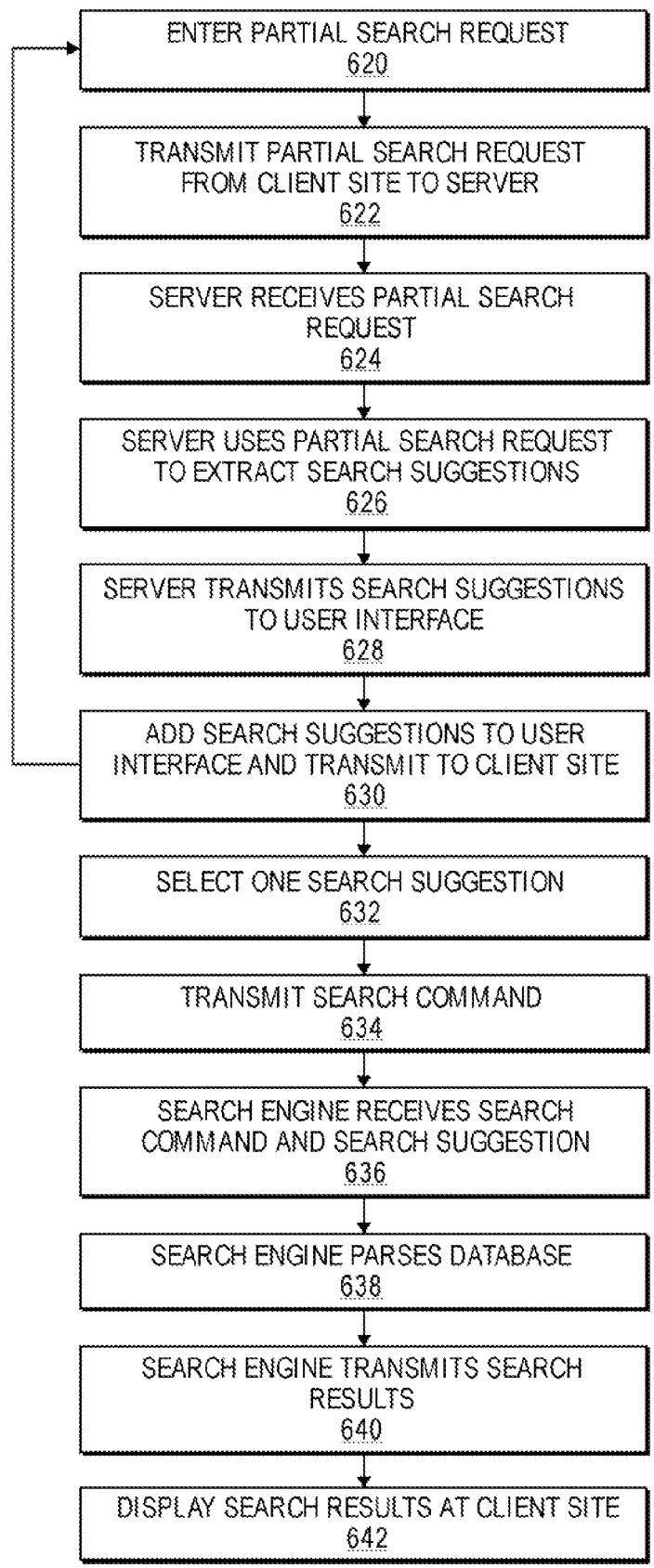
FIG. 41 is a flow chart illustrating server and client interaction to update the search suggestions.

FIG. 41 illustrates client and server interaction during the process illustrated with reference to FIGS. 40A to 40D. At Step 620, a user enters a partial search request in the search box 558A. In Step 622, the partial search request is transmitted from the client site to the server. In Step 624, the server receives the partial search request from the client site. In Step 626, the server uses the partial search request to extract search suggestions from one of the reference sources 224. In Step 628, the server transmits the search suggestions to the user interface. At Step 630, the search suggestions are added to the user interface, and the user interface is transmitted to the client site. Steps 620 through 630 can be repeated as the partial search request is updated, as described with reference to FIGS. 40C and 40D. At Step 632, the user selects one of the search suggestions. At Step 634, a search command is transmitted from the client site, indicating selection of one of the search suggestions. At Step 636, the search engine receives the search command and the selected search suggestion. At Step 638, the search engine parses the search databases and structured databases. At Step 640, the search engine transmits search results back to the client site. At Step 642, the search results are displayed at the client site.

Figure 42:
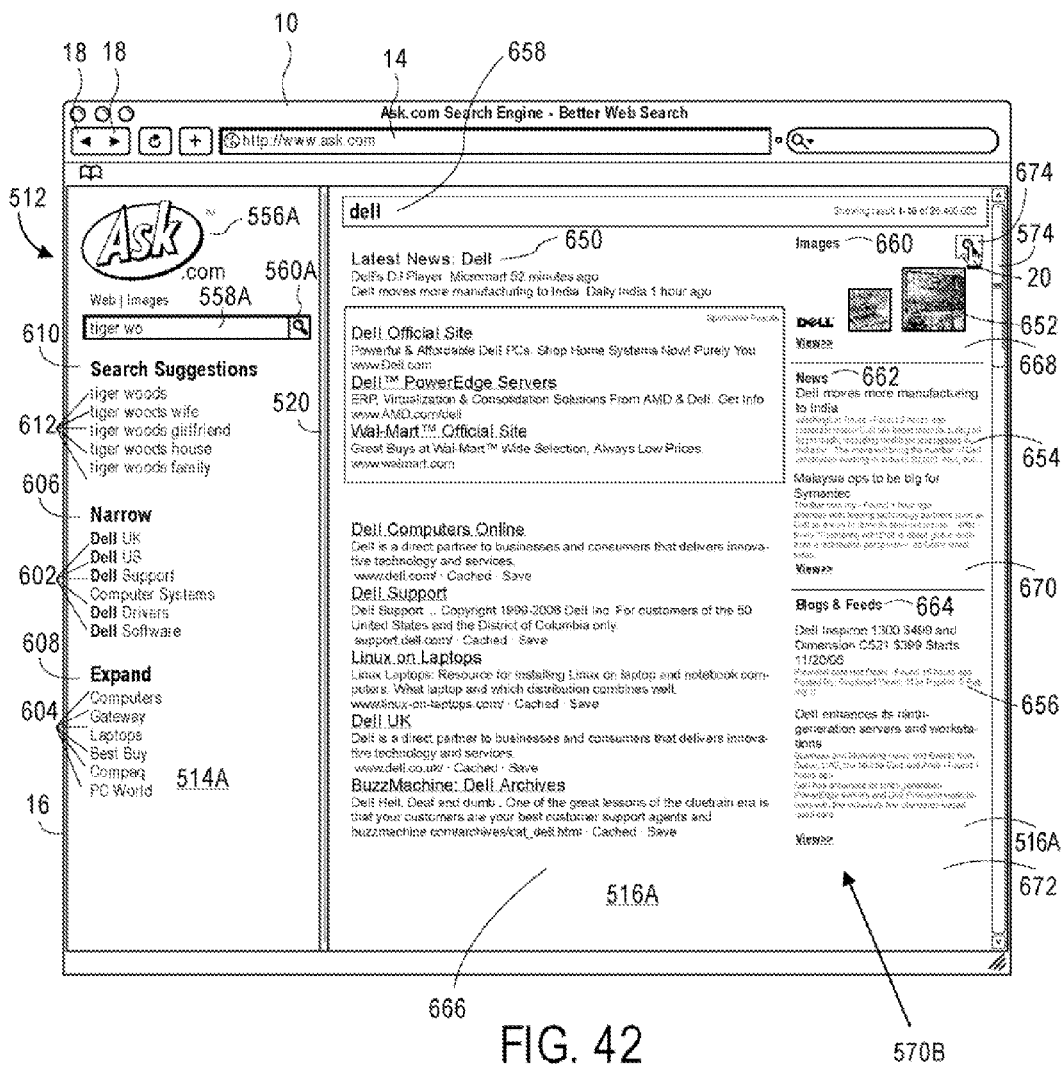
FIG. 42 is a view similar to FIG. 40D after a cursor is moved into a category area of a content area to bring a search icon within the category area into view.

Referring to FIG. 42, the content 570B includes search results 650, 652, 654, and 656 that are responsive to a search query entered in the search box 558A in the view of FIG. 38. The content 570B also includes a plurality of headings 658, 660, 662, and 664. The content area 516A can be divided up into a plurality of substantially rectangular category areas 666, 668, 670, and 672. The category area 666 includes the heading 658 and the search results 650. Similarly, the category area 668 includes the heading 660 and the search results 652, the category area 670 includes the heading 662 and the search results 654, and the category area 672 includes the heading 664 and the search results 656.

Each one of the search results 650, 652, 654, and 656 is for a separate category. The search results 652 in this example are images from an image database among the search databases 216 in FIG. 15. The search results 650, 654, and 656 are general Internet search results, "News" search results, and "Blogs & Feeds" search results, respectively, and from respective ones of the databases 216 and 218 in FIG. 15.

When comparing FIGS. 42 and 40D, it can be seen that a cursor 20 is moved into the category area 668. By moving the cursor 20 into the category area 668, a search icon 674 becomes visible within, and in that manner associated with, the category area 668. Similar icons do not appear in any one of the category areas 666, 670, or 672.

Figure 43:
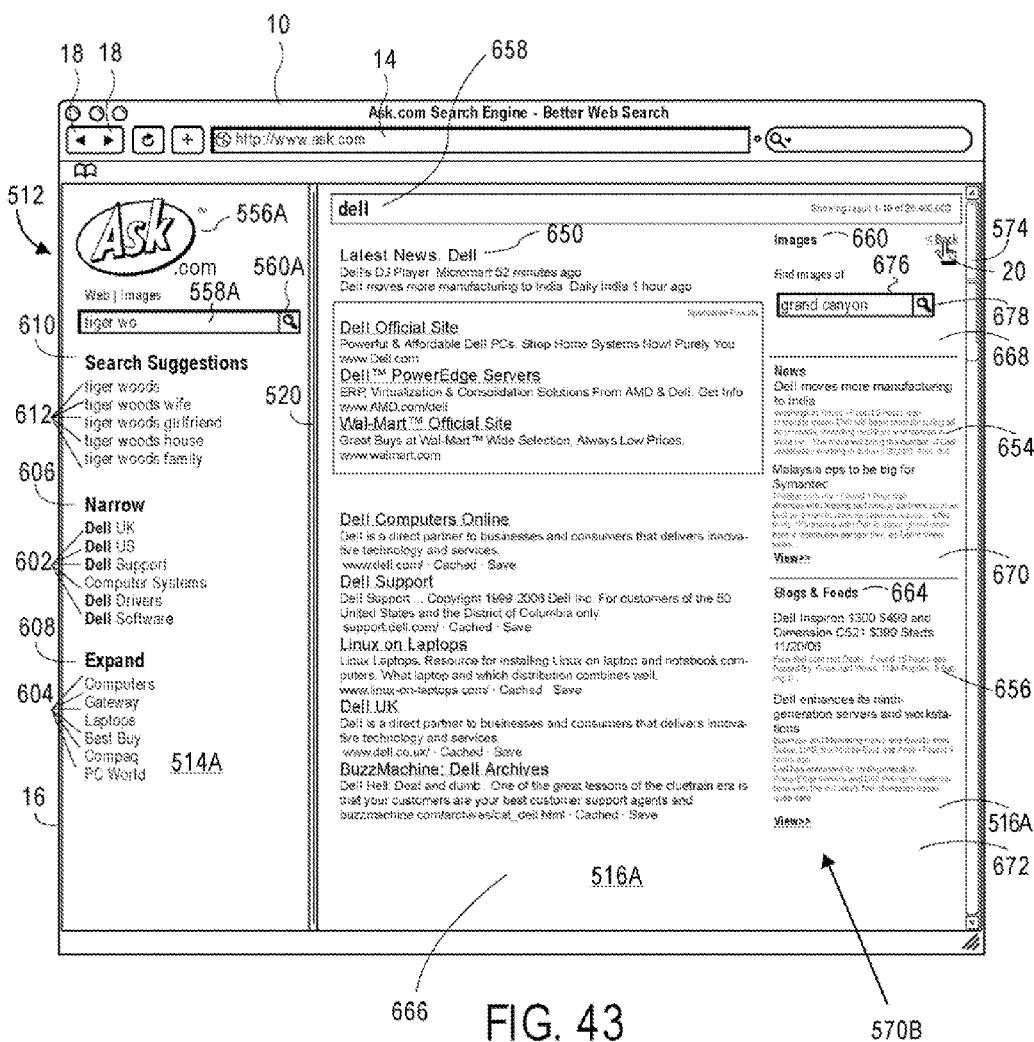
FIG. 43 is a view similar to FIG. 42, after the search icon is selected to open a search box and search button within the category area.

FIG. 43 illustrates the user interface 512 after selection of the search icon 674 in FIG. 42. The search results 652 of FIG. 42 are removed from the category area 668. A search box 676 and a search button 678 appear within the category area 668. A user can enter a category-specific search query within the search box 676. The user can then select the search button 678 or press "Enter" on a keyboard. The content 570B then fades out of view and is replaced with new content (not shown). The new content includes primarily category-specific search results. In the present example, the category-specific search results are images responsive to the category-specific search query entered into the search box 676 of FIG. 43. The content within the search area 514A is also replaced to match the category-specific search query entered into the search box 676.

Figure 44:
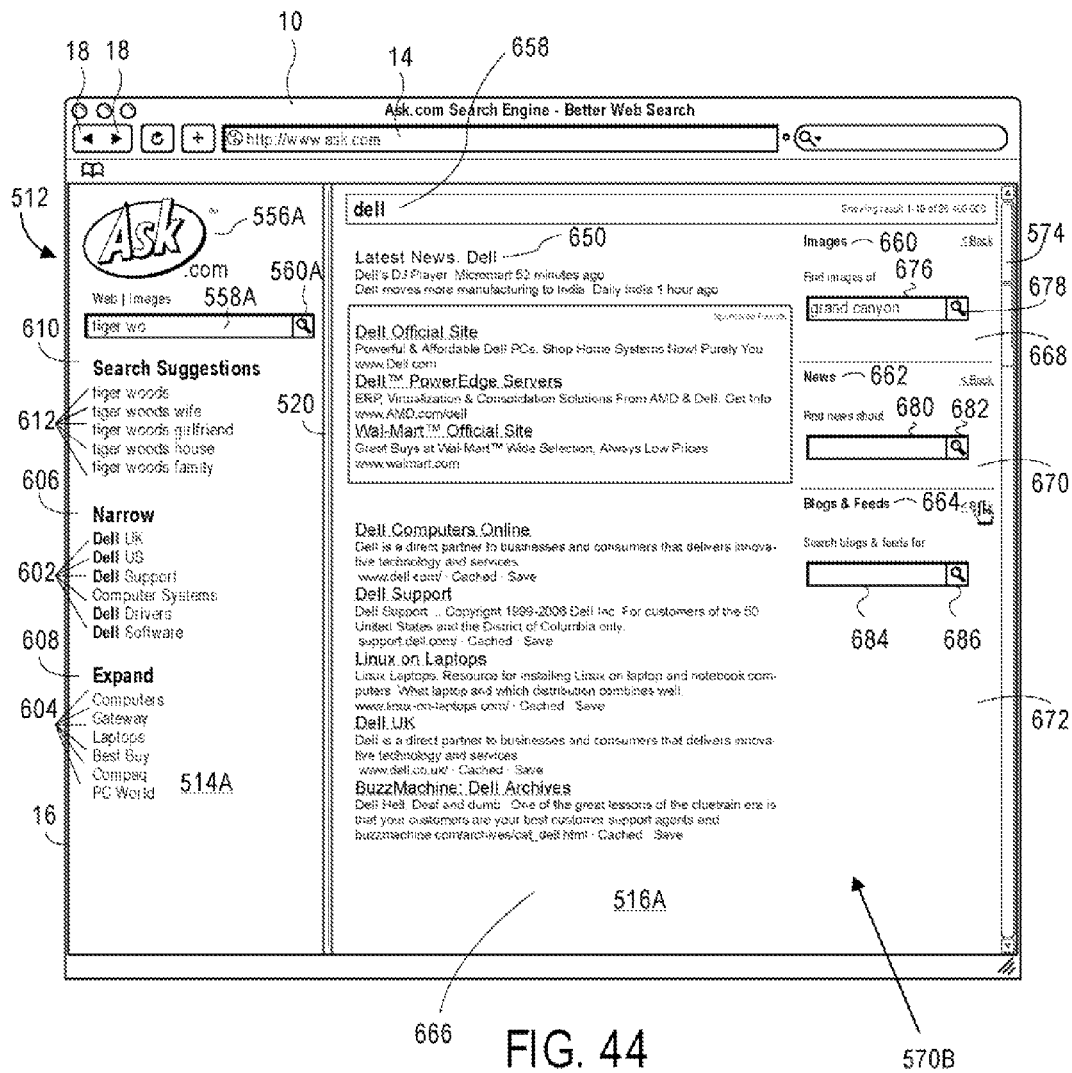
FIG. 44 is a view similar to FIG. 43, after the cursor is moved into further category areas and further search boxes and search buttons are brought into view.
Figure 46:
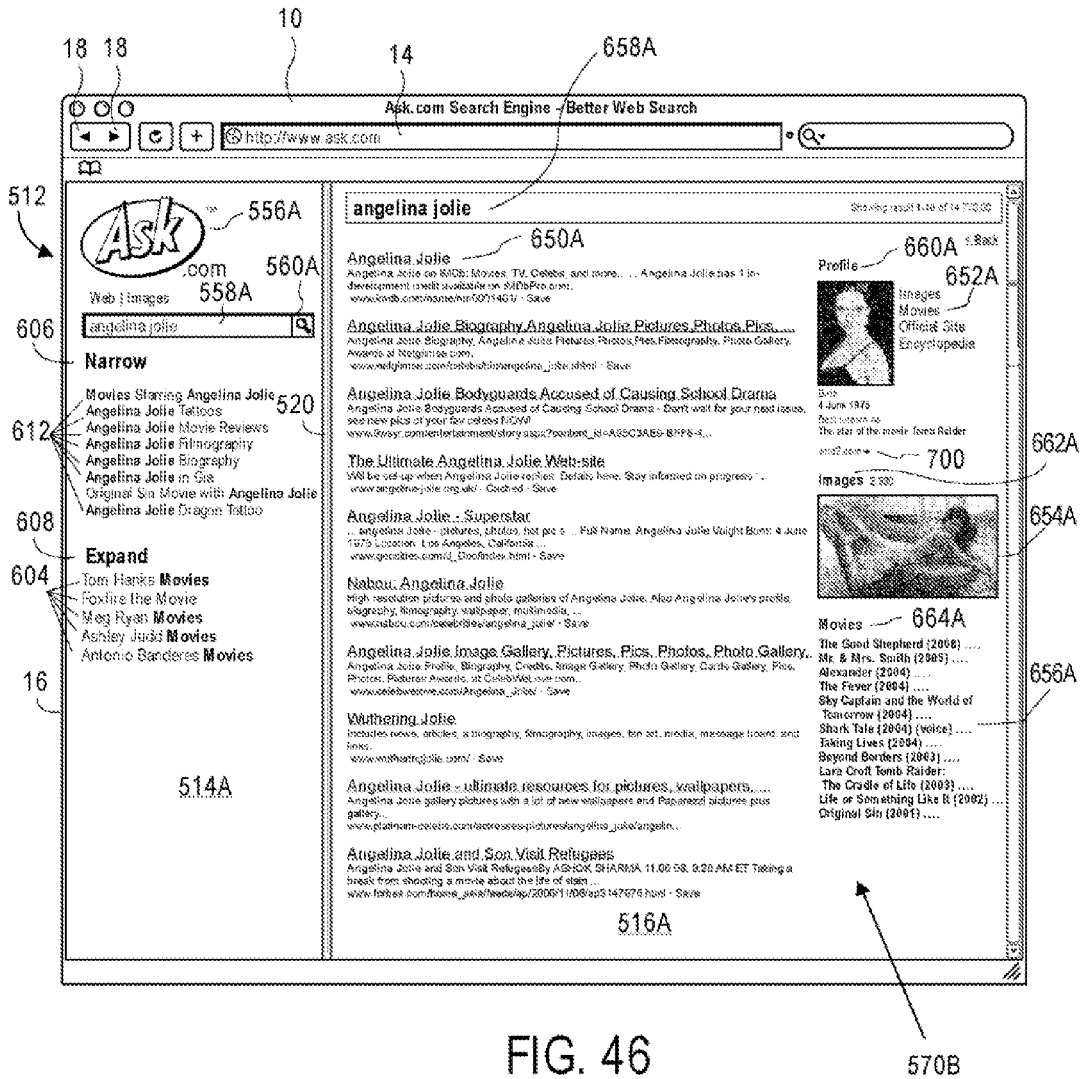
FIG. 46 is a view of the user interface after a first search is conducted, and specifically illustrating a source-selection link for one category of the search results.

FIG. 44 illustrates the user interface 512 when a category-specific search is not conducted using the search box 676 and, instead, the cursor 20 is used to open an additional search box 680 and search button 682 within the category area 670, and is used to open a search box 684 and search button 686 within the category area 672. As shown in FIG. 46, a category-specific search query can, for example, be entered into the search box 680. After entering of the category-specific search query within the search box 680, a user can either select the search button 682 or press "Enter" on a keyboard to receive category-specific search results, in the present example, "News" search results.

Figure 45:
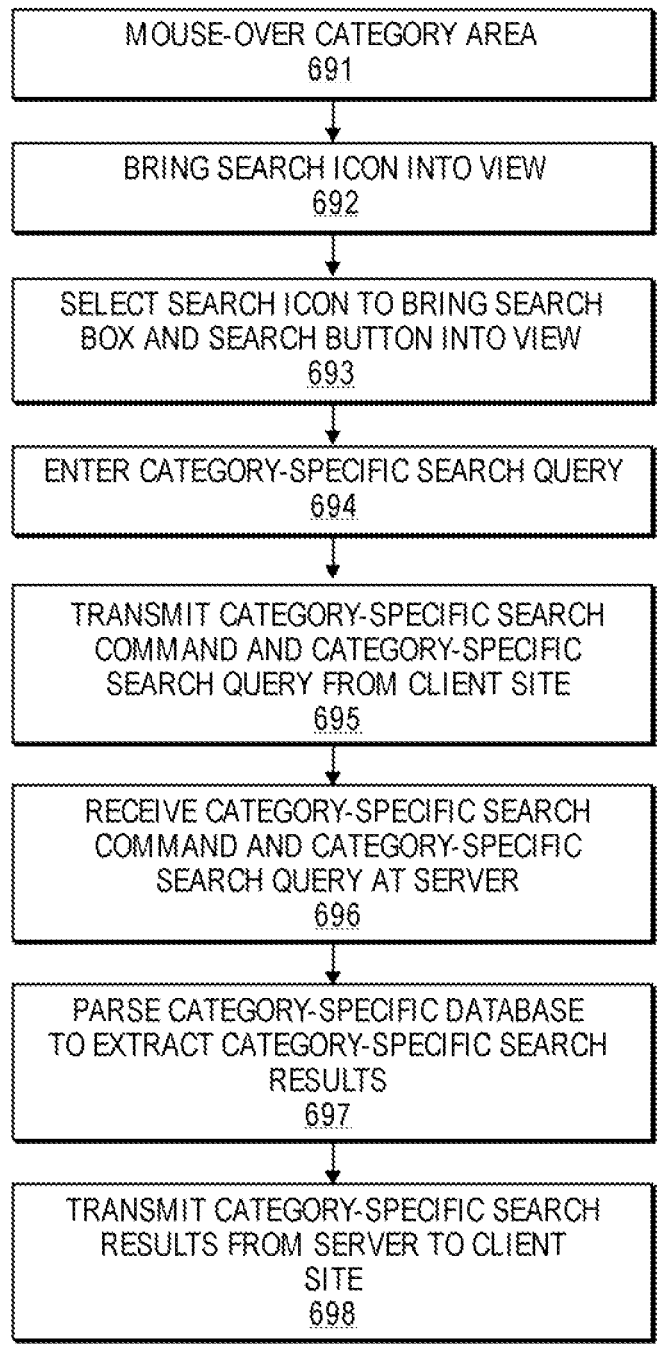
FIG. 45 is a flow chart illustration server and client interaction to conduct a search within a category using the interface in the views of the FIG. 43 or 44.

FIG. 45 illustrates client and server interaction corresponding to the process for FIG. 43. The flow chart of FIG. 45 may directly follow after the flow chart of FIG. 41. At Step 691, a user mouses over a category area, e.g., the category area 668, with the cursor 20. At Step 692, the search icon 674 is automatically brought into view. At Step 693, the user selects the search icon 674 to bring the search box 676 and the search button 678 into view. At Step 694, the user enters a category-specific search query into the search box 676. In Step 695, after selecting the search button 678 or pressing "Enter" on a keyboard, a category-specific search command and the category-specific search query are transmitted from the client site. At Step 696, the server receives the category-specific search command and the category-specific search query. At Step 697, the server parses the category-specific database 216 or 218 in FIG. 15 to extract category-specific search results. In Step 698, the server transmits the category-specific search results from the server to the client site.

FIG. 46 illustrates the user interface 512 after conducting a search, in the present example by entering the search query "angelina jolie" with the user interface, for example in the view shown in FIG. 31. As with the view in FIG. 42 of the user interface 512, the view in FIG. 46 has a plurality of categories 650A, 652A, 654A, and 656A under respective headings 658A, 660A, 662A, and 664A. A source-selection link 700 is located within the same category area as the search results 652A under the heading 660A "Profile." The source-selection link 700 is in this manner associated with the search results 652A under the heading 660A. The source-selection link 700 is selectable by positioning a cursor over the source-selection link 700 and clicking a button on a mouse.

Figure 47:
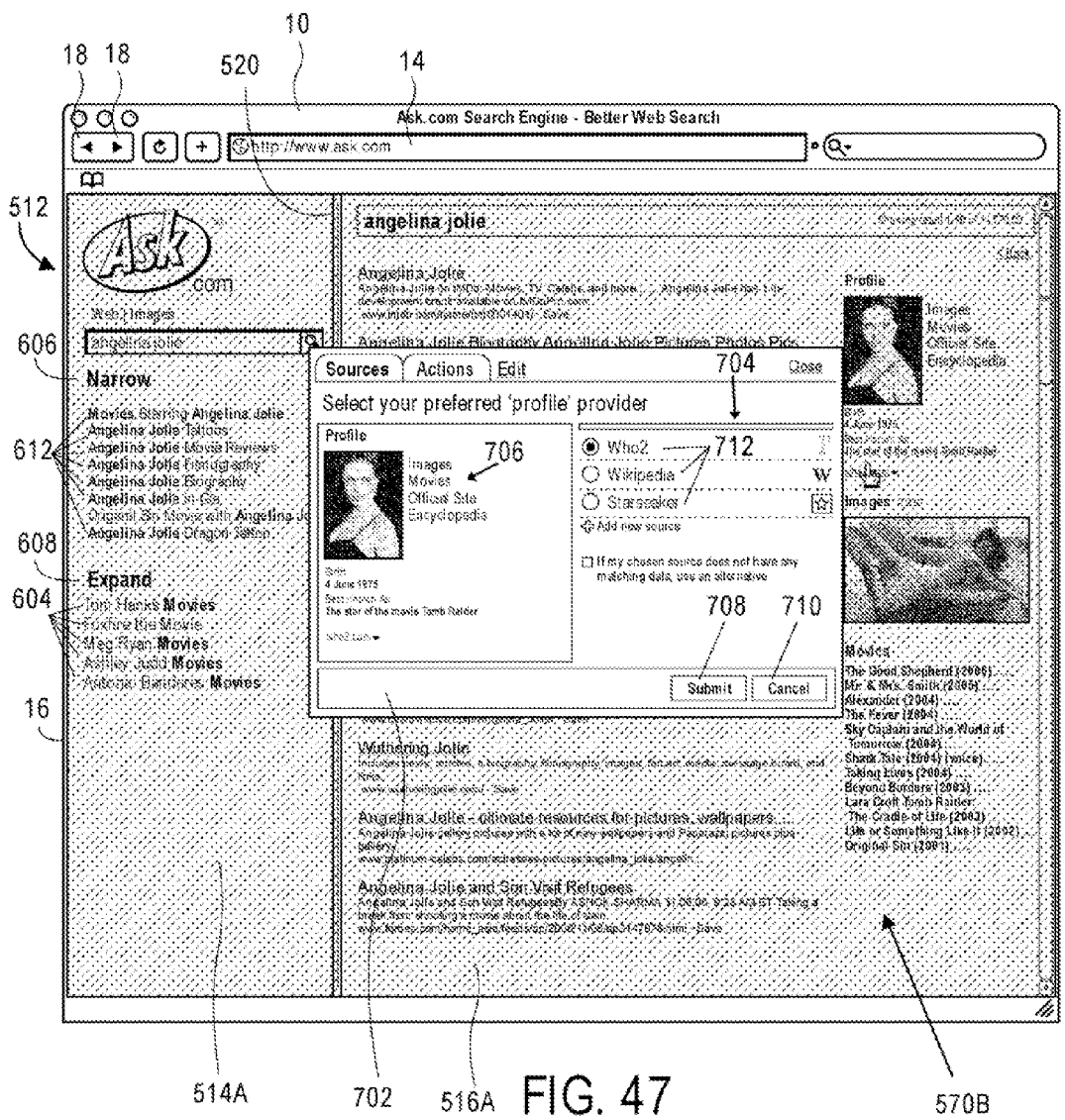
FIG. 47 is a view similar to FIG. 46, after the source-selection link is selected and a source-selection area opens.
Figure 48:
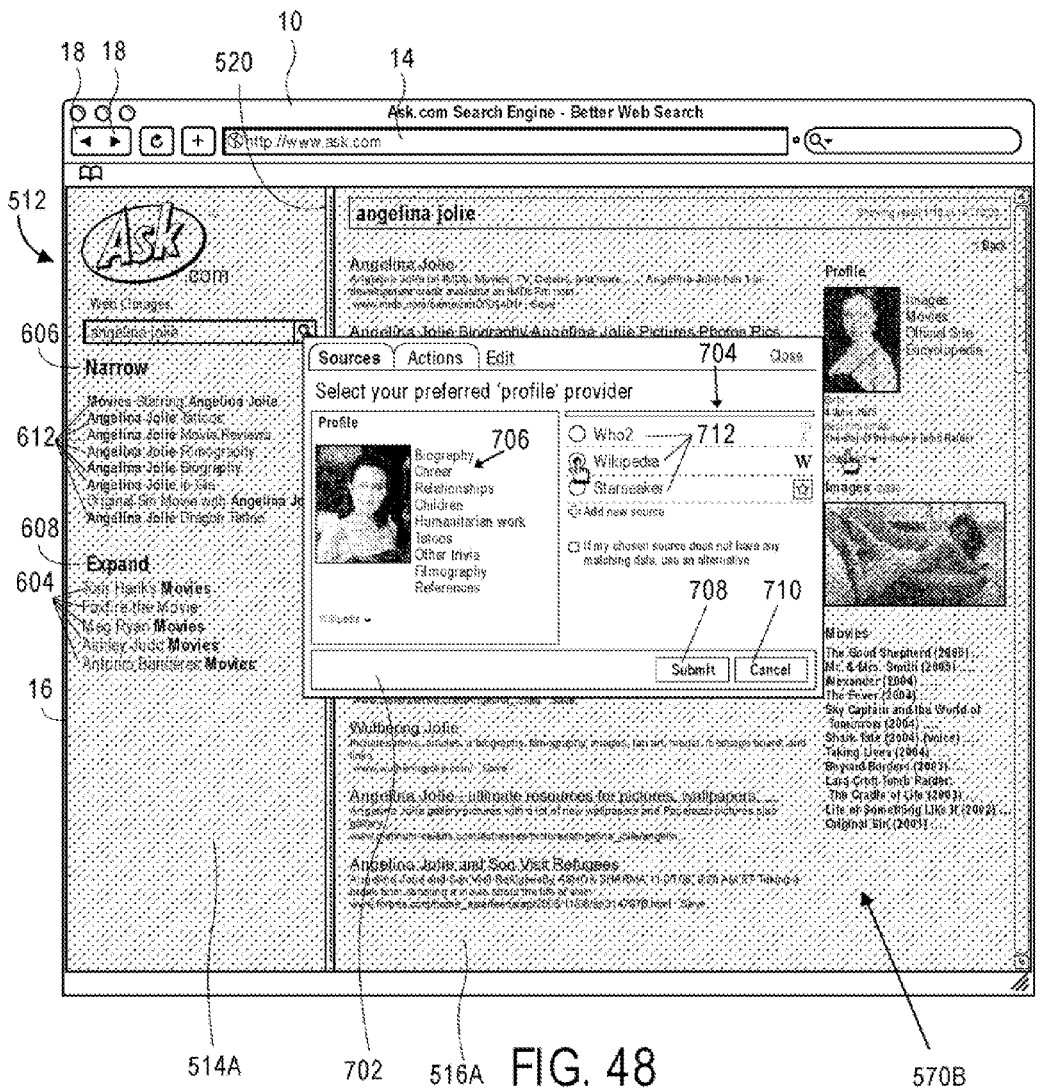
FIG. 48 is a view similar to FIG. 47, after a source is selected.

FIG. 47 illustrates the user interface 512 after selecting the source-selection link 700 in the view of FIG. 46. The content area 516A and the search area 514A are grayed out, and a source-selection area 702 opens. The source-selection area 702 is a window that is smaller than and located within a window of the user interface 512. The source-selection area 702 includes a source selector 704, a source preview 706, a "Submit" button 708, and a "Cancel" button 710. The source selector 704 has a plurality of sources 712 that are listed below one another. In the view of FIG. 48, the first source at the top is selected, and the source preview 706 displays a preview of content from the selected source 712 at the top.

Referring now to FIG. 48, a user can select another one of the sources 712, in the present example, the source second from the top. The source preview 706 replaces the preview of FIG. 47 with a preview of the source 712 second from the top. The viewer can then either select the "Cancel" button 710 to return the user interface to the view shown in FIG. 46, or select the "Submit" button 708 to change from the first source 712 listed at the top to the source 712 second from the top.

Figure 49:
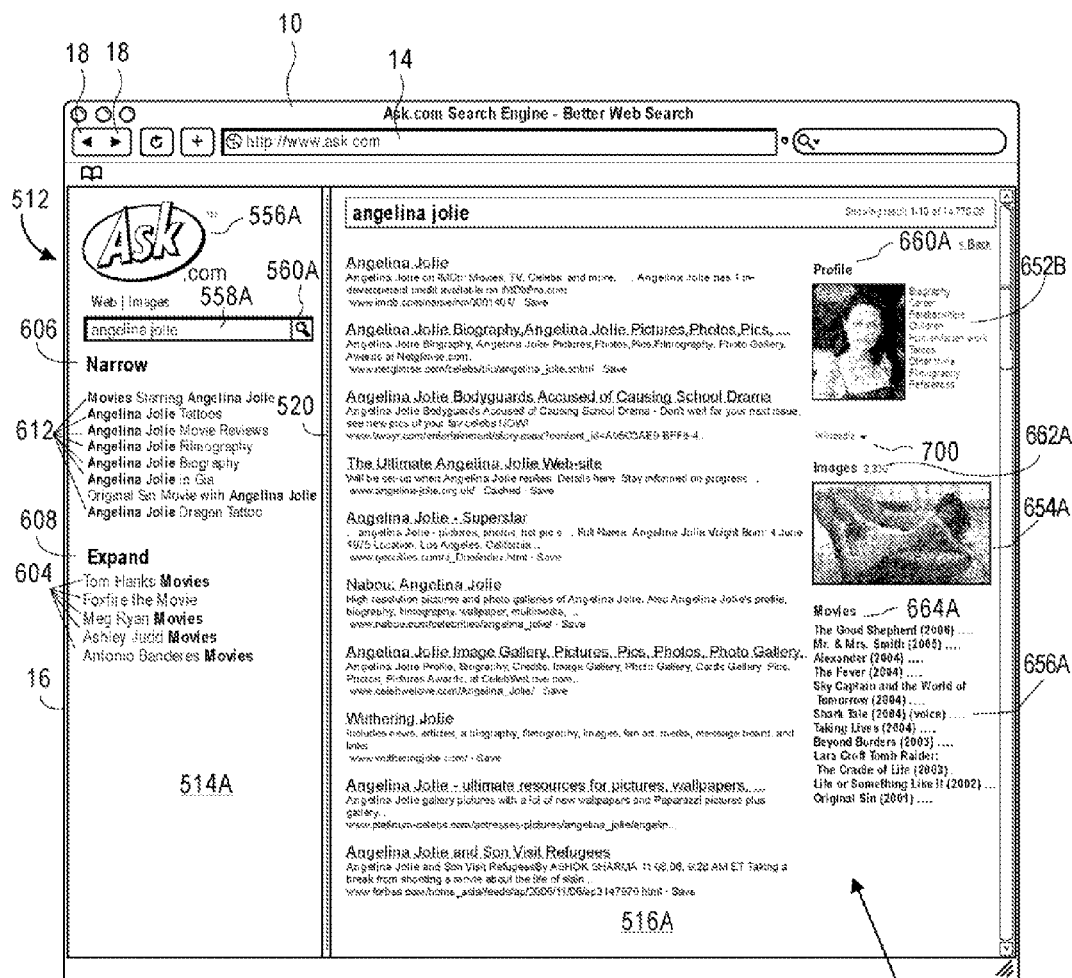
FIG. 49 is a view similar to FIG. 46, after a "Submit" button is selected in FIG. 48 to update search results within the category.

FIG. 49 shows a view of the user interface 512 after selecting the "Submit" button 708 in FIG. 48. When comparing FIGS. 59 and 46, it can be seen that the name on the source selection link 700 has been changed from the name of the source 712 at the top in FIG. 47 to the name of the source second from the top. It can also be seen that the search results 652A in FIG. 46 corresponding to the source preview 706 in FIG. 47 have been replaced with search results 652B shown in the source preview 706 in FIG. 48.

A user can then conduct a subsequent search, for example by entering the name of the actress "Madonna" in the search box 558A. The content within the content window 516A will then be replaced with search results corresponding to "Madonna." Moreover, search results under a heading "Profile" will automatically be from the source 712 second from the top in FIG. 47, and a source selector will be displayed with the same name as the source selection link 700 shown in the view of FIG. 49.

Figure 50:
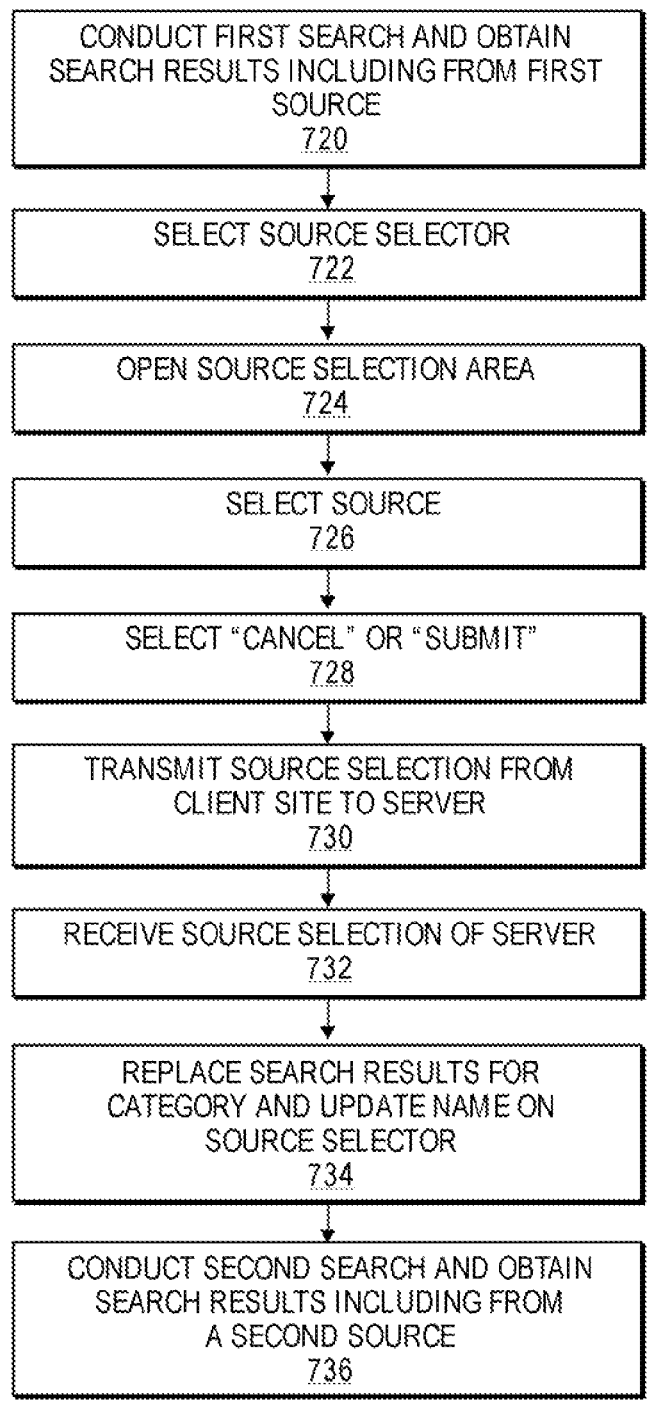
FIG. 50 is a flow chart illustrating server and client interaction to conduct a first search, change a source of search results for one category, and conduct a subsequent search.

FIG. 50 illustrates client and server interaction during a preliminary search to obtain the search results in the view of FIG. 46, subsequently to change the source as described with reference to FIGS. 47 through 49, and thereafter when conducting a subsequent search.

At Step 720, a first search is conducted to obtain search results including from a first source, as discussed with reference to FIGS. 46 and 31. In Step 722, the source selection link 700 is selected. In Step 724, the source-selection area 702 opens. In Step 726, a user selects one of the sources 712. In Step 728, the user can either select the "Cancel" button 710 or the "Submit" button 708. In Step 730, the source selection is transmitted from the client site to the server. In Step 732, the source selection is received at the server. In Step 734, the server replaces the search results 652A in FIG. 46 with the search results 652B in FIG. 49, i.e., for the same category, and updates the name of the source selection link 700 from the name shown in FIG. 46 to the name shown in FIG. 49. In Step 736, the user can then conduct a subsequent search and obtain search results 712 including search results from the second source selected in the view of FIG. 48.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A user interface, comprising:
   a plurality of views;
   a plurality of view links in each view, each being selectable to open a respective one of the views; and
   a respective search box in each one of the views, wherein the views are asynchronously generated such that at least one component is asynchronously created from substantially the exact same code and is located in substantially the same location in each one of the views.

2. The user interface of claim 1, wherein the search box is in substantially the same location in each one of the views.

3. The user interface of claim 1, wherein the view links are substantially in the same location in each one of the views.

4. The user interface of claim 3, wherein the search view links are located vertically below one another.

5. The user interface of claim 1, further comprising:
   a search button in substantially the same location in each view.

6. The user interface of claim 1, further comprising:
   a component in substantially the same location in each view.

7. The user interface of claim 6, wherein the component is a logo.

8. The user interface of claim 6, wherein the component is text.

9. A method of interfacing with a client site, comprising:
   transmitting a first view of a plurality of views from a server site to the client site, including a first search box and a first plurality of view links, each view link being selectable to open a respective view of the plurality of views;
   receiving a view link command, wherein one of the search view links of the first plurality of view links in the first view is selected; and
   in response to the search view link command, asynchronously presenting a second view to the client site, including a search box and a second plurality of view links, each view link of the second plurality of view links being selectable to open a respective one of the views, wherein at least one component is asynchronously created from substantially the exact same code and is located in substantially the same location in each one of the views.

10. The method of claim 9, wherein the search box is in substantially the same location in each one of the views.

11. The method of claim 9, wherein the search view links are substantially in the same location in each one of the views.

12. The method of claim 11, wherein the search view links are located vertically below one another.

13. The method of claim 9, further comprising:
a search button in substantially the same location in each view.

14. The method of claim 9, further comprising:
a component in substantially the same location in each view.

15. The method of claim 14, wherein the component is a logo.

16. The method of claim 14, wherein the component is text.

17. A computer-readable medium, having a set of instructions stored thereon, which, when executed by a processor of a computer carries out a method of interfacing with a client site, comprising:
transmitting a first view of a plurality of views from a server site to the client site, including a first search box and a first plurality of view links, each view link being selectable to open a respective view of the plurality of views;
receiving a view link command, wherein one of the search view links of the first plurality of view links in the first view is selected; and
in response to the search view link command, asynchronously presenting a second view to the client site, including a search box and a second plurality of view links, each view link of the second plurality of view links being selectable to open a respective one of the views, wherein at least one component is asynchronously created from substantially the exact same code and is located in substantially the same location in each one of the views.

18. The computer-readable medium of claim 17, wherein the search box is in substantially the same location in each one of the views.

19. The computer-readable medium of claim 17, wherein the search view links are substantially in the same location in each one of the views.

20. The computer-readable medium of claim 19, wherein the search view links are located vertically below one another.

21. The computer-readable medium of claim 17, further comprising:
a search button in substantially the same location in each view.

22. The computer-readable medium of claim 17, further comprising:
a component in substantially the same location in each view.

23. The computer-readable medium of claim 22, wherein the component is a logo.

24. The computer-readable medium of claim 22, wherein the component is text.

* * * * *